US012564219B2

(12) United States Patent
Tucker et al.

(10) Patent No.: US 12,564,219 B2
(45) Date of Patent: Mar. 3, 2026

(54) NON-COMBUSTIBLE SMOKING SYSTEMS, DEVICES AND ELEMENTS THEREOF

(71) Applicant: Altria Client Services LLC, Richmond, VA (US)

(72) Inventors: Christopher S. Tucker, Midlothian, VA (US); Barry Smith, Hopewell, VA (US); Ed Cadieux, Mechanicsville, VA (US); David Bennett, Richmond, VA (US); Raquel Olegario, Richmond, VA (US); San Li, Midlothian, VA (US); Georgios Karles, Richmond, VA (US); Richard Jupe, Richmond, VA (US); Peter Lipowicz, Midlothian, VA (US); Benjamin Ragland, Providence Force, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/519,406

(22) Filed: Nov. 27, 2023

(65) Prior Publication Data

US 2024/0090572 A1 Mar. 21, 2024

Related U.S. Application Data

(60) Continuation of application No. 17/225,317, filed on Apr. 8, 2021, now Pat. No. 11,877,595, which is a
(Continued)

(51) Int. Cl.
*A24F 40/30* (2020.01)
*A24F 40/40* (2020.01)
(Continued)

(52) U.S. Cl.
CPC .............. *A24F 40/30* (2020.01); *A24F 40/40* (2020.01); *H05B 1/0244* (2013.01); *A24F 40/10* (2020.01);
(Continued)

(58) Field of Classification Search
CPC .......... A24F 40/10; A24F 40/20; A24F 40/30; A24F 40/40; H05B 1/0244; H05B 2203/021
See application file for complete search history.

(56) References Cited

U.S. PATENT DOCUMENTS 4,393,884 A 7/1983 Jacobs
4,708,151 A 11/1987 Shelar
(Continued)

FOREIGN PATENT DOCUMENTS

CA 2925645 A1 4/2015
CN 1283326 C 11/2006
(Continued)

OTHER PUBLICATIONS

Chinese Office Action for Chinese Application No. 202110358775.6 and English translation thereof dated Nov. 8, 2023.
(Continued)

*Primary Examiner* — Abdullah A Riyami
*Assistant Examiner* — Thang H Nguyen
(74) *Attorney, Agent, or Firm* — Harness, Dickey & Pierce, P.L.C.

(57) ABSTRACT

At least one example embodiment provides a non-combustible smoking system or kit, comprising: a cartridge having a first end and a second end; and a tobacco containing section having a third end and a fourth end. The cartridge includes: a pre-vapor formulation reservoir element and a pre-vapor heating element coupled to the pre-vapor formulation reservoir element. The tobacco containing section
(Continued)

includes a tobacco housing and a tobacco heating element. The first end of the cartridge is configured to be connected to the fourth end of the tobacco containing section, and the second end of the cartridge is configured to be connected to the third end of the tobacco containing section.

25 Claims, 42 Drawing Sheets

Related U.S. Application Data division of application No. 16/299,557, filed on Mar. 12, 2019, now Pat. No. 10,986,874, which is a continuation of application No. 15/391,926, filed on Dec. 28, 2016, now Pat. No. 10,433,585.

(51) Int. Cl.
*A24F 40/46* (2020.01)
*A24F 40/465* (2020.01)
*H05B 1/02* (2006.01)
*A24F 40/10* (2020.01)
*A24F 40/20* (2020.01)

(52) U.S. Cl.
CPC ........ *A24F 40/20* (2020.01); *H05B 2203/021* (2013.01)

(56) References Cited

U.S. PATENT DOCUMENTS 4,714,082 A 12/1987 Banerjee et al.
4,756,318 A 7/1988 Clearman et al.
4,771,796 A 9/1988 Myer
4,776,353 A 10/1988 Lilja et al.
4,793,365 A 12/1988 Sensabaugh, Jr. et al.
4,854,331 A 8/1989 Banerjee et al.
4,911,181 A 3/1990 Vromen et al.
4,917,128 A 4/1990 Clearman et al.
4,947,874 A 8/1990 Brooks et al.
4,961,438 A 10/1990 Korte
5,020,548 A 6/1991 Farrier et al.
5,033,483 A 7/1991 Clearman et al.
5,042,509 A 8/1991 Banerjee et al.
5,060,666 A 10/1991 Clearman et al.
5,060,671 A 10/1991 Counts et al.
5,065,776 A 11/1991 Lawson et al.
5,067,499 A 11/1991 Banerjee et al.
5,076,292 A 12/1991 Sensabaugh, Jr. et al.
5,080,114 A 1/1992 Rudolph et al.
5,159,942 A 11/1992 Brinkley et al.
5,235,992 A 8/1993 Sensabaugh, Jr.
5,240,016 A 8/1993 Nichols et al.
5,293,883 A 3/1994 Edwards
5,388,594 A 2/1995 Counts et al.
5,433,224 A 7/1995 Luke et al.
5,505,214 A 4/1996 Collins et al.
5,595,706 A 1/1997 Sikka et al.
5,692,525 A 12/1997 Counts et al.
6,234,167 B1 * 5/2001 Cox ........................ A24F 40/70 128/200.14
6,532,965 B1 3/2003 Abhulimen et al.
7,726,320 B2 * 6/2010 Robinson ................ A24F 40/40 131/194
7,845,359 B2 12/2010 Montaser
8,079,371 B2 12/2011 Robinson et al.
8,479,747 B2 7/2013 O'Connell
8,528,569 B1 9/2013 Newton
8,678,012 B2 3/2014 Li et al.
8,678,013 B2 3/2014 Crooks et al.
8,714,161 B2 5/2014 Liu
8,833,364 B2 9/2014 Buchberger
8,881,737 B2 11/2014 Collett et al.
8,893,724 B2 11/2014 Woodcock et al.
8,899,238 B2 12/2014 Robinson et al.
8,997,753 B2 4/2015 Li et al.
9,004,073 B2 4/2015 Tucker et al.
9,010,335 B1 4/2015 Scatterday
9,078,473 B2 7/2015 Worm et al.
9,167,852 B2 10/2015 Xiu
9,271,528 B2 * 3/2016 Liu ...................... A61M 11/042
9,289,014 B2 3/2016 Tucker et al.
9,357,803 B2 6/2016 Egoyants et al.
9,462,830 B2 10/2016 Liu
9,510,623 B2 12/2016 Tucker et al.
9,554,598 B2 1/2017 Egoyants et al.
9,609,893 B2 4/2017 Novak, III et al.
9,609,894 B2 4/2017 Abramov et al.
9,648,908 B1 5/2017 Rinehart et al.
9,668,523 B2 6/2017 Tucker et al.
9,675,117 B2 * 6/2017 Li ........................... A24F 40/60
9,730,473 B2 * 8/2017 Shinkawa ................ A24D 3/17
9,877,516 B2 1/2018 Tucker et al.
9,974,334 B2 5/2018 Dooly et al.
9,980,523 B2 5/2018 Abramov et al.
9,999,256 B2 6/2018 Abramov et al.
10,165,797 B2 1/2019 Chen et al.
10,226,073 B2 3/2019 Bless et al.
10,375,996 B2 8/2019 Aoun et al.
10,543,323 B2 * 1/2020 Buchberger ......... A61M 11/042
10,645,976 B2 5/2020 Bless et al.
2005/0172976 A1 8/2005 Newman et al.
2007/0102013 A1 5/2007 Adams et al.
2008/0092912 A1 4/2008 Robinson et al.
2009/0314299 A1 12/2009 Kilpatrick
2010/0020006 A1 1/2010 Otani
2010/0200006 A1 * 8/2010 Robinson .............. A24F 40/485 131/194
2011/0036363 A1 2/2011 Urtsev et al.
2012/0060853 A1 3/2012 Robinson et al.
2012/0199146 A1 8/2012 Marangos
2012/0260927 A1 10/2012 Liu
2013/0014772 A1 1/2013 Liu
2013/0081642 A1 4/2013 Safari
2013/0160764 A1 6/2013 Liu
2013/0160765 A1 6/2013 Liu
2013/0160780 A1 6/2013 Matsumoto et al.
2013/0167853 A1 7/2013 Liu
2013/0192615 A1 8/2013 Tucker et al.
2013/0192616 A1 8/2013 Tucker et al.
2013/0192617 A1 8/2013 Thompson
2013/0192622 A1 * 8/2013 Tucker ..................... H05B 3/44 131/329
2013/0192623 A1 8/2013 Tucker et al.
2013/0220315 A1 8/2013 Conley et al.
2013/0255675 A1 10/2013 Liu
2013/0319407 A1 12/2013 Liu
2013/0319439 A1 12/2013 Gorelick et al.
2013/0333700 A1 12/2013 Buchberger
2014/0000638 A1 1/2014 Sebastian et al.
2014/0036688 A1 2/2014 Stassinopoulos et al.
2014/0060527 A1 3/2014 Liu
2014/0060554 A1 3/2014 Collett et al.
2014/0060556 A1 3/2014 Liu
2014/0096781 A1 4/2014 Sears et al.
2014/0096782 A1 4/2014 Ampolini et al.
2014/0123989 A1 5/2014 LaMothe
2014/0144453 A1 5/2014 Capuano et al.
2014/0166028 A1 6/2014 Fuisz et al.
2014/0166029 A1 6/2014 Weigensberg et al.
2014/0190496 A1 7/2014 Wensley et al.
2014/0190503 A1 7/2014 Li et al.
2014/0202472 A1 7/2014 Levitz et al.
2014/0253144 A1 9/2014 Novak, III et al.
2014/0261486 A1 9/2014 Potter et al.
2014/0261487 A1 9/2014 Chapman et al.
2014/0261488 A1 9/2014 Tucker
2014/0261489 A1 9/2014 Cadieux et al.
2014/0261490 A1 9/2014 Kane
2014/0283825 A1 9/2014 Buchberger
2014/0299125 A1 10/2014 Buchberger
2014/0305448 A1 10/2014 Zuber et al.
2014/0305454 A1 10/2014 Rinker et al.

(56) References Cited

U.S. PATENT DOCUMENTS

2014/0355969 A1 12/2014 Stern
2014/0366898 A1 12/2014 Monsees et al.
2015/0013697 A1 1/2015 Mironov
2015/0013698 A1 1/2015 Woodcock et al.
2015/0027454 A1 1/2015 Li et al.
2015/0027455 A1 1/2015 Peleg et al.
2015/0027457 A1 1/2015 Janardhan et al.
2015/0027459 A1 1/2015 Collett et al.
2015/0027469 A1 1/2015 Tucker et al.
2015/0040930 A1 2/2015 Robinson et al.
2015/0047656 A1 2/2015 Robinson et al.
2015/0053220 A1 2/2015 Levy et al.
2015/0059787 A1 3/2015 Qiu
2015/0114409 A1 4/2015 Brammer et al.
2015/0122277 A1 5/2015 Frobisher et al.
2015/0128968 A1 5/2015 Chapman et al.
2015/0136155 A1 5/2015 Verleur et al.
2015/0136158 A1 5/2015 Stevens et al.
2015/0164147 A1 6/2015 Verleur et al.
2015/0196059 A1* 7/2015 Liu ........................ A24F 40/30 392/394
2015/0201674 A1 7/2015 Dooly et al.
2015/0282527 A1 10/2015 Henry, Jr.
2015/0282529 A1 10/2015 Li et al.
2015/0305405 A1* 10/2015 Fang .................... A61M 15/06 131/329
2015/0335070 A1 11/2015 Sears et al.
2015/0374035 A1 12/2015 Sanchez et al.
2016/0007648 A1 1/2016 Sutton et al.
2016/0007649 A1 1/2016 Sampson et al.
2016/0044963 A1* 2/2016 Saleem ................ A61M 15/06 131/328
2016/0073695 A1 3/2016 Sears et al.
2016/0100633 A1* 4/2016 Gao .................... H05B 1/0244 131/329
2016/0120224 A1 5/2016 Mishra et al.
2016/0157525 A1 6/2016 Tucker et al.
2016/0206003 A1 7/2016 Yamada et al.
2016/0206004 A1 7/2016 Shinkawa et al.
2016/0309788 A1* 10/2016 Hawes ............. A61M 15/0065
2016/0324216 A1* 11/2016 Li ........................ A24F 40/485
2016/0353803 A1 12/2016 Fang
2016/0360785 A1* 12/2016 Bless ..................... A24F 40/40
2017/0020200 A1 1/2017 Robinson et al.
2017/0049152 A1 2/2017 Liu
2017/0065000 A1 3/2017 Sears et al.
2017/0071251 A1* 3/2017 Goch .................... A24F 40/485
2017/0135399 A1* 5/2017 Gavrielov ................ H05B 3/06
2017/0251722 A1* 9/2017 Kobal ..................... A24F 40/42
2017/0258134 A1* 9/2017 Kane ........................ H05B 3/56
2017/0258137 A1* 9/2017 Smith ..................... A24F 40/42
2017/0265524 A1* 9/2017 Cadieux ............... H05B 1/0252
2017/0367403 A1* 12/2017 Karles ................. D03D 15/283
2018/0007971 A1 1/2018 Plojoux et al.
2018/0092400 A1* 4/2018 Sahin .................... A24F 40/485
2018/0116282 A1* 5/2018 Dendy ..................... H05B 3/03
2018/0146713 A1 5/2018 Robinson et al.
2018/0177233 A1* 6/2018 Tucker .................... A24F 40/40
2019/0159522 A1 5/2019 Bless et al.
2019/0230993 A1 8/2019 Buchberger
2021/0030061 A1 2/2021 Sahin et al.

FOREIGN PATENT DOCUMENTS

CN 101116542 A 2/2008
CN 101277623 A 10/2008
CN 201127292 Y 10/2008
CN 101557728 A 10/2009
CN 102264420 A 11/2011
CN 102655773 A 9/2012
CN 102813278 A 12/2012
CN 103054196 A 4/2013
CN 103179869 A 6/2013
CN 203087527 U 7/2013
CN 103491815 A 1/2014
CN 203618787 U 6/2014
CN 104219973 A 12/2014
CN 104244749 A 12/2014
CN 104254356 A 12/2014
CN 104284606 A 1/2015
CN 204146321 U 2/2015
CN 104397878 A 3/2015
CN 104540404 A 4/2015
CN 204466906 U 7/2015
CN 104853632 A 8/2015
CN 105163611 A 12/2015
CN 105963833 A 9/2016
CN 106231937 A 12/2016
CN 111990695 A 11/2020
DE 202014001718 U1 5/2015
EA 019736 5/2014
EA 019736 B1 5/2014
EP 3632490 A1 4/2020
EP 3562336 B1 3/2023
GB 2513627 A 11/2014
JP 2008-286510 A 11/2008
JP 2010-506594 A 3/2010
JP 2010206594 A 9/2010
JP 2015-506170 A 3/2015
JP 2017-511703 A 4/2017
JP 2016571476 4/2017
KR 10-1991-0002388 2/1991
KR 10-1993-0000048 1/1993
KR 10-1999-0037661 A 5/1999
KR 10-2012-0053521 A 5/2012
KR 10-2014-0125822 A 10/2014
RU 94815 U1 6/2010
RU 103281 U1 4/2011
RU 2509516 C2 3/2014
TW 201406307 A 2/2014
WO WO-9748293 A1 12/1997
WO WO-2006048774 A1 5/2006
WO WO-2008/108889 A1 9/2008
WO 2012/027350 A2 3/2012
WO WO-2014/004648 A1 1/2014
WO WO-2014116974 A1 7/2014
WO WO-2014/207719 A1 12/2014
WO 2015/000974 A1 1/2015
WO 2015/038981 A2 3/2015
WO 2015046420 A1 4/2015
WO WO-2015/046385 A1 4/2015
WO WO-2015/128499 A1 9/2015
WO WO-2015/179388 A1 11/2015
WO WO-2015197852 A2 12/2015
WO WO-2016024083 A1 2/2016

OTHER PUBLICATIONS

Chinese Office Action for Chinese Application No. 202010730881.8 and English translation thereof mailed Nov. 4, 2023.

European Office Action for Application No. 19205550.7, dated Apr. 3, 2024.

U.S. Office Action for U.S. Appl. No. 17/398,466, dated Mar. 1, 2024.

Chinese Office action for Application No. 202010730885.6, dated Apr. 27, 2024, with English Translation included herewith.

International Search Report and Written Opinion issued Mar. 19, 2018 in International Application No. PCT/EP2017/084705.

"How to Brew Your Own Tobacco E-Liquids," Vape Squad, http://www.vapesquad.com/how-to-brew-your-own-tobacco-e-liquids/, Jun. 20, 2013.

"Mixing of e-liquids," Naturally Extracted Tobacco, LLC, http://www.naturally-extracted-tobacco.com/Mixing-s/1822.htm, Jul. 6, 2013.

"Marlboro HeatStick," http://www.dailymail.co.uk/news/article-2671505/Philip-Morris-Intl-sell-Marlboro-HeatSticks.html, Jun. 26, 2014.

"White, Black 350MAH Dry Herb Vaporizers/Wax Oil Vaporier with LCD Screen," E-Cig Mechanical Mods, http://www.ecigmechanicalmods.com/sale-3013923-white-black-350mah-dry-herb-vaporizers-wax-oil-vaporizer-with-lcs-screen.html, Jun. 26, 2015.

(56) References Cited

OTHER PUBLICATIONS

"Dry Herb Vaporizer used for e-solid/Tobacco/herbs eGO electronic cigarette," HongKong Chiamey Enterprise, http://elite-electronic-cigarettes.sell.curiousexpeditions.org/iz537e0d6-dry-herb-vaporizer-uder-for-e-solid-tobacco-herbs-ego-electronic-cigarette-images, Jun. 26, 2015.
"New 10g E-Solid Tobacco Flavor Solid Electronic Cigarette Oil," eliquidtrade, Aug. 31, 2014.
International Search Report and Written Opinion dated Sep. 30, 2016 issued in International Application No. PCT/US2016/030957.
International Search Report and Written Opinion dated Feb. 14, 2017 issued in International Application No. PCT/EP2016/079344.
International Preliminary Report on Patentability dated Nov. 7, 2017 issued in International Application No. PCT/US2016/030957.
U.S. Office Action for corresponding U.S. Appl. No. 15/391,926 mailed May 25, 2018.
International Search Report dated Aug. 2, 2016 issued in International Application No. PCT/US2016/030957.
Non-Final Office Action issued Sep. 27, 2018 in U.S. Appl. No. 15/147,454.
European Communication issued Oct. 16, 2018 in European Application No. 16725284.0.
U.S. Notice of Allowance for corresponding U.S. Appl. No. 15/391,926 mailed Dec. 19, 2018.
International Preliminary Report on Patentability issued Dec. 14, 2018 in International Application No. PCT/EP2017/084705.
Final Office Action issued Apr. 2, 2019 in U.S. Appl. No. 15/147,454.
Eurasian Official Notification issued Apr. 18, 2019 in Eurasian Patent Application No. 201792210.
U.S. Notice of Allowance for corresponding U.S. Appl. No. 15/391,926 mailed May 20, 2019.
European Office Action mailed Jun. 17, 2019 in European Application No. 16802118.6.
European Office Action mailed Jun. 17, 2019 in European Application No. 16805093.8.
Chinese Office Action and English translation thereof dated Sep. 9, 2019.
Extended European Search report issued on Feb. 13, 2020 in European Application No. 19205550.7.
Russian Notice of Allowance and Search Report dated Jan. 30, 2020 issued in Russian Patent Application No. 2018123174/12(036715).
Extended European Search Report dated Mar. 12, 2020 issued in European Patent Application No. 19205549.9-1122.
Non-Final Office Action issued Dec. 2, 2019 in U.S. Appl. No. 15/147,454.
Japanese Office Action dated Mar. 2, 2020 issued in corresponding Japanese Application No. 2018-546764.
Office Action and Search Report issued Mar. 18, 2020 in Russian Application No. 2018122814.
Russian Office Action dated Mar. 18, 2020 issued in Russian Patent Application No. 2018122814. English translation provided.
Russian Search Report dated Mar. 18, 2020 issued in Russian Patent Application No. 2018122814. English translation provided.
Ukrainean Office Action dated Apr. 7, 2020 issued in Ukrainean Patent Application No. a201710730. English translation provided.
Chinese Office Action dated May 15, 2020 issued in Chinese Patent Application No. 201680026260.3. English translation provided.
Decision to Grant dated May 26, 2020 issued in Russian Patent Application No. 2018122814. English translation provided.
Russian Notice of Allowance dated May 25, 2020 issued in corresponding Russian Patent Application No. 2018122814/14(036083). English translation has been provided.
Japanese Office Action dated Jun. 9, 2020 issued in corresponding Japanese Application No. 2017-557358.
Final Office Action issued Jun. 10, 2020 in U.S. Appl. No. 15/147,454.
Japanese Office Action dated Jun. 9, 2020 issued in corresponding Japanese Patent Application No. 2017-557358. English translation has been provided.
Office Action issued May 20, 2020 in Chinese Patent Application No. 201680064436.4.
Office Action issued May 20, 2020 in Chinese Patent Application No. 201680064434.5.
Written Opinion of the international Preliminary Examining Authority dated Nov. 7, 2017 issued in corresponding International Application No. PCT/EP2016/079344.
European Communication issued Jul. 21, 2020 in European Application No. 17823175.9.
First Office Action issued Jul. 29, 2020 in Israel Application No. 255240.
Final Office Action issued on Sep. 2, 2020 in U.S. Appl. No. 15/147,454.
Communication pursuant to Article 94(3) EPC issued Oct. 27, 2020 in European Application No. 17 823175.9.
Notice of Grounds for Rejection issued Nov. 9, 2020 in Japanese Application No. P 2018-546764.
Notice of Grounds for Rejection dated Nov. 16, 2020 issued in Japanese Patent Application No. P2018-546765.
U.S. Office Action dated Jun. 25, 2020 issued in co-pending U.S. Appl. No. 16/299,557.
Non-Final Office Action issued Jun. 25, 2020 in U.S. Appl. No. 16/299,557.
Notice of Allowance issued Jan. 8, 2021 in U.S. Appl. No. 16/299,557.
U.S. Notice of Allowance dated Jan. 8, 2021 issued in co-pending U.S. Appl. No. 16/299,557.
Notice of Allowance issued Apr. 21, 2021 in U.S. Appl. No. 15/147,454.
First Official Notification issued Jul. 19, 2021 in Israeli Patent Application No. 279264.
First Official Notification issued Jul. 19, 2021 in Israeli Patent Application No. 279263.
Decision to Grant issued Sep. 13, 2021 in Japanese Application No. 2018-546764.
Office Action issued Aug. 27, 2021 in Chinese Application No. 201780075252.2.
Decision on Grant and Search Report issued Sep. 28, 2021 in Russian Application No. 2019120820.
Communication pursuant to Article 94(3) EPC issued Nov. 9, 2021 in European Application No. 17 823 175.9.
English translation of Japanese Office Action mailed Jan. 4, 2022.
Chinese Office Action and English translation thereof dated Feb. 10, 2022 for Chinese Patent Application No. 201780075252.2.
Chinese Office Action and English translation thereof dated May 12, 2022.
European Communication Pursuant to Article 94(3) mailed Aug. 18, 2022 issued in European Patent Application No. 19 205 550.7-1212.
European Intention to Grant mailed Sep. 27, 2022.
Japanese Decision to Grant and English translation thereof dated Oct. 11, 2022.
Chinese Rejection Decision for corresponding Application No. 201780075252.2, dated Jan. 12, 2023, and English Translation included.
Korean Office Action for corresponding Application No. 10-2019-7016963, dated Feb. 14, 2023, with English translation included herewith.
U.S. Office Action for U.S. Appl. No. 17/225,317, dated Feb. 28, 2023.
Chinese Office Action for Application No. 202010730881.8, dated Mar. 22, 2023, with English Translation.
Korean Office Action for Application No. 10-2017-7035249, dated Apr. 12, 2023.
Japanese Notice of Allowance for corresponding Application No. 2021-185202, dated Apr. 27, 2023, with English translation.
Chinese Office action for Application No. 202010730885.6, dated Apr. 7, 2023, with English Translation included herewith.
Korean Notice of Allowance for corresponding Application No. 10-2019-7016963, dated Apr. 25, 2023, with English translation included herewith.
Mexican Office Action for Application No. MX/a/2019/007580, dated Apr. 25, 2023.
Korean Office Action for Application No. 10-2018-7013323, dated Jul. 14, 2023, with English Translation.
U.S. Notice of Allowance for U.S. Appl. No. 17/225,317, dated Aug. 15, 2023.

(56) References Cited

OTHER PUBLICATIONS

Korean Office Action and English translation thereof dated Aug. 8, 2023.
Korean Notice of Allowance and English translation thereof dated Oct. 17, 2023.
Korean Notice of Allowance for Korean Application No. 10-2018-7013478 and English translation thereof mailed Jan. 26, 2024.
Chinese Office Action for Chinese Application No. 202010730881.8 and English translation thereof mailed Feb. 1, 2024.
Ukrainian Office Action for Application No. a202003705, dated Oct. 14, 2024, with English translation.
Ukrainian Office Action for Application No. a202003711, dated Oct. 14, 2024, with English translation.
European Notice of Allowance for Application No. 19205550.7, dated Nov. 18, 2024.
Korean Office Action for Application No. 1020247000996, dated Dec. 11, 2024, with English translation.
Malaysian Office Action for Application No. PI2022001904, dated Apr. 11, 2025.
Malaysian Office Action for Application No. PI2022001916, dated Apr. 11, 2025.
U.S. Office Action for U.S. Appl. No. 17/398,466, dated May 28, 2025.
U.S. Notice of Allowance for U.S. Appl. No. 17/398,466, dated Sep. 24, 2025.
Partial Eurpoean Search Report for Application No. 25170019.1, dated Aug. 1, 2025.
Korean Notice of Allowance for Application No. 1020247000996, dated Jul. 15, 2025.
Extended European Search Report for European Application No. 25170019.1 mailed Oct. 23, 2025.
European Search Report for European Application No. 2517019 mailed Nov. 26, 2025.

* cited by examiner

2904

NON-COMBUSTIBLE SMOKING SYSTEMS, DEVICES AND ELEMENTS THEREOF

CROSS-REFERENCE TO RELATED APPLICATIONS

This application is a Continuation of U.S. application Ser. No. 17/225,317, filed on Apr. 8, 2021, which is a Divisional of U.S. application Ser. No. 16/299,557, filed on Mar. 12, 2019, which is a Continuation of U.S. application Ser. No. 15/391,926, filed on Dec. 28, 2016, the entire contents of each of which are incorporated herein by reference.

BACKGROUND

Field

At least some example embodiments relate generally to non-combustible smoking systems, non-combustible smoking devices, and/or elements thereof.

Related Art

Electronic vaping devices are used to vaporize a pre-vapor formulation into a vapor. These electronic vaping devices may be referred to as e-vaping devices. E-vaping devices include a heater, which vaporizes the pre-vapor formulation to produce the vapor. The e-vaping device may include several e-vaping elements including a power source, a cartridge or e-vaping tank including the heater and a reservoir capable of holding the pre-vapor formulation.

SUMMARY

At least one example embodiment provides a non-combustible smoking system comprising: a cartridge having a first end and a second end; and a tobacco containing section having a third end and a fourth end. The cartridge includes: a pre-vapor formulation reservoir element configured to contain a pre-vapor formulation material; and a pre-vapor heating element coupled to the pre-vapor formulation reservoir element, the pre-vapor heating element configured to heat at least a portion of the pre-vapor formulation material to generate a vapor, and to provide the vapor to a first channel through the cartridge. The tobacco containing section includes: a tobacco housing configured to contain tobacco, and to provide an aroma to a second channel through the tobacco containing section; and a tobacco heating element configured to heat at least a portion of the tobacco to generate the aroma. The first end of the cartridge is configured to be connected to the fourth end of the tobacco containing section, and the second end of the cartridge is configured to be connected to the third end of the tobacco containing section.

At least one example embodiment provides a non-combustible smoking kit comprising: a cartridge having a first end and a second end; and a tobacco containing section having a third end and a fourth end. The cartridge includes: a pre-vapor formulation reservoir element configured to contain a pre-vapor formulation material; and a pre-vapor heating element coupled to the pre-vapor formulation reservoir element, the pre-vapor heating element configured to heat at least a portion of the pre-vapor formulation material to generate a vapor, and to provide the vapor to a first channel through the cartridge. The tobacco containing section includes: a tobacco housing configured to contain tobacco, and to provide an aroma to a second channel through the tobacco containing section; and a tobacco heating element configured to heat at least a portion of the tobacco to generate the aroma. The first end of the cartridge is configured to be connected to the fourth end of the tobacco containing section, and the second end of the cartridge is configured to be connected to the third end of the tobacco containing section.

The non-combustible smoking system (or, alternatively, kit) may further include: a mouthpiece configured to be selectively connected to one of the first end of the cartridge and the third end of the tobacco containing section; and a power section configured to be selectively connected to one of the second end of the cartridge and the fourth end of the tobacco containing section.

The tobacco housing may include: an outer housing extending in a longitudinal direction; and an inner tube in the outer housing, the inner tube extending in the longitudinal direction to define at least a portion of the second channel, the outer housing and the inner tube defining a space to contain the tobacco.

According to at least some example embodiments, the tobacco heating element may be: a coil that extends around the inner tube; a plurality of ceramic coil heaters positioned in the second channel; a single ceramic coil heater positioned in the second channel; or a mesh heater assembly extending around the inner tube. The mesh heater assembly may include a mesh heater covered in a fiber glass shield.

The pre-vapor heating element and the tobacco heating element may be electrically connected in parallel with one another when the first end of the cartridge is connected to the fourth end of the tobacco containing section, and when the second end of the cartridge is connected to the third end of the tobacco containing section.

The cartridge may further include a first male connector at the first end and a first female connector at the second end. The first male connector may have a first electrode portion, and the first female connector may have a second electrode portion. The first electrode portion and the second electrode portion may be connected via a first electrical lead.

The tobacco containing section may include a second male connector at the third end and a second female connector at the fourth end. The second male connector may have a third electrode portion, and the second female connector may have a fourth electrode portion. The third electrode portion and the fourth electrode portion may be connected via a second electrical lead. The first male connector may be connected to the second female connector, and the first female connector may be connected to the second male connector.

The tobacco containing section may include a male connector at the third end and a female connector at the fourth end. The male connector may have a first electrode portion, and the female connector may have a second electrode portion. The first electrode portion and the second electrode portion may be connected via an electrical lead.

The non-combustible smoking system (or, alternatively, kit) may further include: a power section configured to be selectively connected to one of the second end of the cartridge and the fourth end of the tobacco containing section; wherein the power section may be further configured to supply power concurrently to the pre-vapor heating element and the tobacco heating element when connected to the second end of the cartridge and when the power section is connected to the fourth end of the tobacco containing section.

The non-combustible smoking system (or, alternatively, kit) may further include a mouthpiece configured to be selectively connected to one of the first end of the cartridge and the third end of the tobacco containing section.

At least one other example embodiment provides a non-combustible smoking device including a cartridge. The cartridge includes: a housing having a first connector at a first end and a second connector at a second end, a first electrode portion of the first connector electrically connected to a second electrode portion of the second connector via an electrical lead; a pre-vapor formulation reservoir element within the housing, and between the first and second connector, the pre-vapor formulation reservoir element configured to contain a pre-vapor formulation material; and a pre-vapor heating element within the housing, and positioned between the first and second connectors, the pre-vapor heating element electrically connected to the first electrode portion of the first connector and to a third electrode portion of the first connector, and the pre-vapor heating element configured to heat at least a portion of the pre-vapor formulation material to generate a vapor, and to provide the vapor to a channel through the cartridge.

The non-combustible smoking element may further include: a power section configured to be connected to the cartridge via the first connector, the power section configured to supply power to the pre-vapor heating element when connected to the cartridge; and a mouthpiece configured to be connected to the cartridge via the second connector.

The non-combustible smoking element may further include: a tobacco containing section; a power section; and a mouthpiece. The power section, the tobacco containing section, the cartridge and the mouthpiece may be connected in series with one another. The cartridge may be configured to be selectively positioned (i) between the power section and the tobacco containing section, and (ii) between the tobacco containing section and the mouthpiece.

At least one other example embodiment provides a non-combustible smoking element including a tobacco containing section. The tobacco containing section includes: an outer housing having a first connector at a first end and a second connector at a second end, a first electrode portion of the first connector electrically connected to a second electrode portion of the second connector via an electrical lead; a tobacco housing within the outer housing, the tobacco housing configured to contain tobacco and to provide an aroma to a channel through the tobacco containing section; and a tobacco heating element electrically connected to the first electrode portion of the first connector and to a third electrode portion of the first connector, the tobacco heating element configured to heat at least a portion of tobacco to generate the aroma.

The non-combustible smoking element may further include: a power section configured to be connected to the tobacco containing section via the first connector, the power section configured to supply power to the tobacco heating element when connected to the tobacco containing section; and a mouthpiece configured to be connected to the tobacco containing section via the second connector.

The non-combustible smoking element may further include: a cartridge; a power section; and a mouthpiece. The power section, the tobacco containing section, the cartridge and the mouthpiece may be connected in series with one another; and the tobacco containing section may be configured to be selectively positioned (i) between the power section and the cartridge, and (ii) between the cartridge and the mouthpiece.

At least one other example embodiment provides a non-combustible smoking device including: a cartridge having a first end and a second end; a tobacco containing section having a third end and a fourth end; a power section; and a mouthpiece. The cartridge includes: a pre-vapor formulation reservoir element configured to contain a pre-vapor formulation material; and a pre-vapor heating element coupled to the pre-vapor formulation reservoir element, the pre-vapor heating element configured to heat at least a portion of the pre-vapor formulation material to generate a vapor, and to provide the vapor to a first channel through the cartridge. The tobacco containing section includes: a tobacco housing configured to contain tobacco, and to provide an aroma to a second channel through the tobacco containing section; and a tobacco heating element configured to heat at least a portion of the tobacco to generate the aroma. The power section, the tobacco containing section, the cartridge and the mouthpiece are configured to be connected in series with one another in a first configuration and a second configuration.

In the first configuration, the mouthpiece is engaged with the third end of the tobacco containing section, the fourth end of the tobacco containing section is engaged with the first end of the cartridge, and the second end of the cartridge is engaged with the power section; and In the second configuration, the mouthpiece is engaged with the first end of the cartridge, the second end of the cartridge is engaged with the third end of the tobacco containing section, and the fourth end of the tobacco containing section is engaged with the power section.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1A:
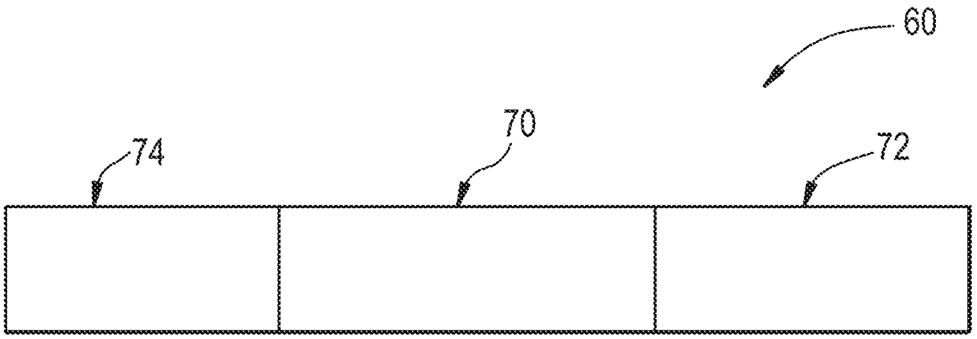
FIGS. 1A-1B illustrate a non-combustible smoking device including a tobacco element, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, elements, regions, layers and/or sections, these elements, elements, regions, layers, and/or sections should not be limited by these terms. These terms are only used to distinguish one element, element, region, layer, or section from another region, layer, or section. Thus, a first element, element, region, layer, or section discussed below could be termed a second element, element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or elements, but do not preclude the presence or addition of one or more other features, integers, steps, operations, elements, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Example embodiments may be described herein with regard to anodes (or anode portions) and cathodes (or cathode portions). However, as discussed herein anodes and cathodes may be collectively referred to as electrodes. Similarly, anode portions and cathode portions may be collectively referred to as electrode portions.

FIG. 1A illustrates a non-combustible smoking device 60 according to an example embodiment. The non-combustible smoking device 60 includes a replaceable cartridge (or first section) 70, a reusable fixture (or second section) 72 and a tobacco containing section (or third section) 74.

Figure 1B:
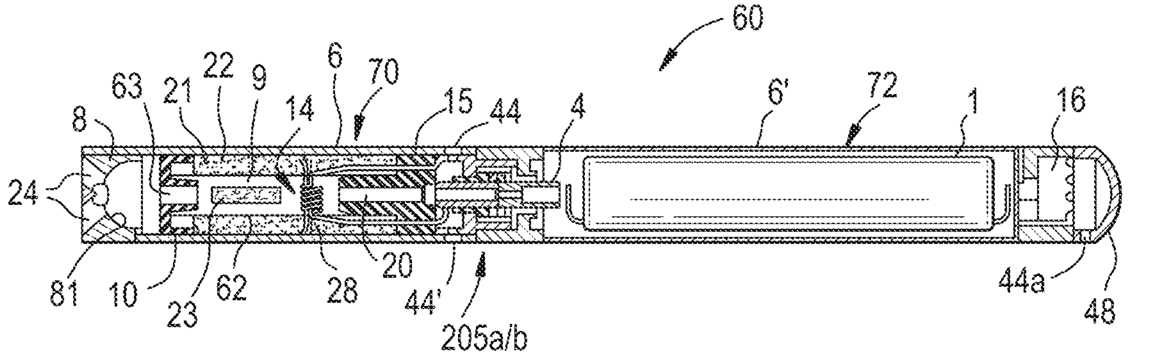

FIG. 1B illustrates a cross-sectional view of the non-combustible smoking device 60 according to an example embodiment. The non-combustible smoking device 60 comprises a replaceable cartridge (or first section) 70 and a reusable fixture (or second section) 72, which are coupled together at a connection **205*a/b* (e.g., 205*a* is a male threaded connection on cartridge 70, and 205*b* is a female threaded connection on reusable fixture 72) or by other convenience such as a snug-fit, detent, clamp and/or clasp. The first section 70 includes an outer tube 6 (or housing) extending in a longitudinal direction and an inner tube 62 coaxially positioned within the outer tube or housing 6. The inner tube 62 defines an outer air passage (or channel) 9. Within the outer air passage 9 and downstream from a heater 14 is a tobacco element 23. The tobacco element 23** may be in a porous aluminum tube or processed/shaped in a porous form.

The term "tobacco element" may refer to any tobacco plant material including tobacco leaf, tobacco plug, reconstituted tobacco, compressed tobacco rod, shaped, or powder, for example.

The tobacco element 23 may also be wrapped in tobacco such as a tobacco sheet, a reconstituted tobacco leaf or a cigar wrapper.

The second section 72 can also include an outer tube 6' (or housing) extending in a longitudinal direction. In an alternative embodiment, the outer tube 6 and 6' can be a single tube housing both the first section 70 and the second section 72 and the entire non-combustible smoking device 60 can be disposable.

The non-combustible smoking device 60 can also include a central air passage 20 defined in part by the inner tube 62 and an upstream seal 15. Moreover, the non-combustible smoking device 60 includes a pre-vapor formulation supply reservoir 22. The pre-vapor formulation supply reservoir 22 comprises a pre-vapor formulation material and optionally a pre-vapor formulation storage medium 21 operable to store the pre-vapor formulation material therein.

In an embodiment, the pre-vapor formulation supply reservoir 22 is contained in an outer annulus between the outer tube 6 and the inner tube 62. The annulus is sealed at an upstream end by the seal 15 and by a pre-vapor formulation gasket 10 at a downstream end so as to prevent leakage of the pre-vapor formulation material from the pre-vapor formulation supply reservoir 22.

In an embodiment, a heater 14 is also contained in the inner tube 62 downstream of and in spaced apart relation to the portion of central air passage 20 defined by the seal 15. The heater 14 can be in the form of a wire coil, a planar body, a ceramic body, a single wire, a cage of resistive wire or any other suitable form. In other example embodiments, the heater 14 can be made of a sheet metal with two pieces bent into a semicircle and interlaced together. In other example embodiments, the heater 14 may be a serpentine heater placed inside a wick (e.g., wick 28), a mesh heater, a flat plate heater, a Wismec Theorem heater with NotchCoil™, a spiral heater, a ceramic heating film, a curled heater and/or a platinum heater.

A wick 28 is in communication with the pre-vapor formulation material in the pre-vapor formulation supply reservoir 22 and in communication with the heater 14 such that the wick 28 disposes pre-vapor formulation material in proximate relation to the heater 14. The wick 28 may be constructed of a fibrous and flexible material. The wick 28 may include at least one filament having a capacity to draw a pre-vapor formulation. For example, the wick 28 may comprise a bundle of filaments which may include glass (or ceramic) filaments. In another embodiment, a bundle comprising a group of windings of glass filaments, for example, three of such windings, all which arrangements are capable of drawing pre-vapor formulation via capillary action via interstitial spacing between the filaments.

A power supply 1 in the second section 72 may be operably connected to the heater 14 (as described below) to apply voltage across the heater 14. The non-combustible smoking device 60 also includes at least one air inlet 44 operable to deliver air to the central air passage 20 and/or other portions of the inner tube 62.

Figure 2A:
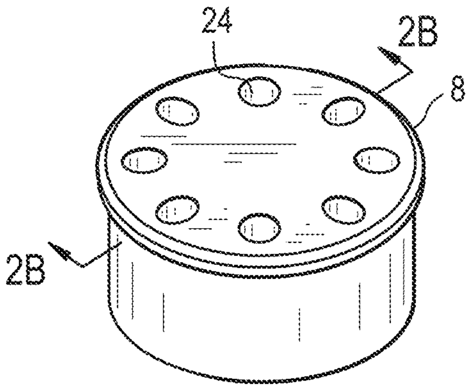
FIG. 2A is a perspective view of a mouth-end insert for use with the non-combustible smoking device of FIG. 1A, in accordance with an example embodiment.
Figure 2B:
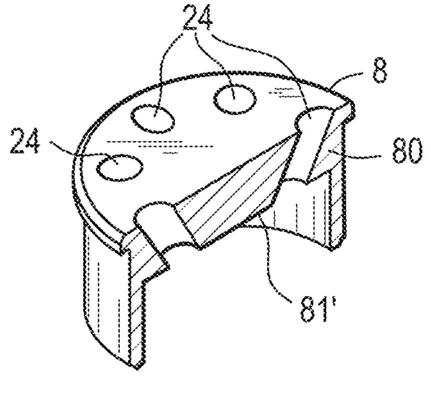
FIG. 2B is a cross-sectional view along line B-B of the mouth-end insert of FIG. 2A, in accordance with an example embodiment.

As shown in FIGS. 1-2B, the non-combustible smoking device 60 further includes a mouth-end insert 8 having at least two off-axis, diverging outlets 24. The mouth-end insert 8 is in fluid communication with the central air passage 20 via the interior of inner tube 62 and a central passage 63, which extends through the gasket 10.

Moreover, the heater 14 extends in a direction transverse to the longitudinal direction and heats the pre-vapor formulation material to a temperature sufficient to vaporize the pre-vapor formulation material and form a vapor. In other embodiments, the heater 14 may be arranged in another manner such as in the longitudinal direction.

The vapor then flows into the tobacco element 23 upon an applying a negative pressure on the mouth-end insert 8. The heater 14 may be a set distance from the tobacco element 23 or contacting the tobacco element 23 such that the heater 14 heats the tobacco element 23 during application of a negative pressure. For example, the heater 14 may be ten (10) millimeters or less from the tobacco element 23. The heater 14 may be arranged to produce a temperature of 50 degrees Celsius at the mouth-end insert 8. Moreover, the heater 14 may heat the tobacco element 23 to a temperature between 50 and 200 degrees Celsius and heat the pre-vapor formulation at 400 degrees Celsius.

The heater 14 warms the tobacco element 23, but does not burn the tobacco. Thus, the warming of the tobacco element 23 may be referred to as non-combustible. Because the section 70 includes the tobacco element 23 and the heater 14, the section 70 may be referred to as a non-combustible smoking element.

Referring to FIG. 1, the wick 28, pre-vapor formulation supply reservoir 22 and mouth-end insert 8 are contained in the cartridge 70 and the power supply 1 is contained in the second section 72. In one embodiment, the first section (the cartridge) 70 is disposable and the second section (the fixture) 72 is reusable. The sections 70, 72 can be attached by a threaded connection 205, as described above, whereby the downstream section 70 can be replaced when the pre-vapor formulation supply reservoir 22 is used up. Having a separate first section 70 and second section 72 provides a number of advantages. First, if the first section 70 contains the at least one heater 14, the pre-vapor formulation supply reservoir 22 and the wick 28, all elements which are potentially in contact with the pre-vapor formulation are disposed of when the first section 70 is replaced. Thus, there will be no cross-contamination between different mouth-end inserts 8, for example, when using different pre-vapor formulation materials. Also, if the first section 70 is replaced at suitable intervals, there is little chance of the heater becoming clogged with pre-vapor formulation. Optionally, the first section 70 and the second section 72 are arranged to lock together when engaged.

In an embodiment, the at least one air inlet 44 includes one or two air inlets 44, 44'. Alternatively, there may be three, four, five or more air inlets. If there is more than one air inlet 44, 44', the air inlets 44, 44' are located at different locations along the non-combustible smoking device 60. For example, as shown in FIG. 1, an air inlet **44*a* can be positioned at the upstream end of the non-combustible smoking device 60 adjacent a sensor 16 such that the sensor 16 supplies power to the heater 14 upon sensing an application of a negative pressure. Air inlet 44*a* should communicate with the mouth-end insert 8 so that a draw upon the mouth-end insert activates the sensor 16. The air from the air inlet 44*a* can then flow along the power supply 1 and to the central air passage 20 in the seal 15 and/or to other portions of the inner tube 62 and/or outer tube 6. At least one additional air inlet 44, 44' can be located adjacent and upstream of the seal 15 or at any other desirable location. Altering the size and number of air inlets 44, 44' can also aid in establishing the resistance to draw of the non-combustible smoking device 60**.

In an embodiment, the heater 14 is arranged to communicate with the wick 28 and to heat the pre-vapor formulation material contained in the wick 28 to a temperature sufficient to vaporize the pre-vapor formulation material and form a vapor.

The heater 14 may be a wire coil surrounding wick 28. Examples of suitable electrically resistive materials include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater 14 comprises at least one material selected from the group consisting of stainless steel, copper, copper alloys, nickel-chromium alloys, superalloys and combinations thereof. In an embodiment, the heater 14 is formed of nickel-chromium alloys or iron-chromium alloys. In one embodiment, the heater 14 can be a ceramic heater having an electrically resistive layer on an outside surface thereof.

In another embodiment, the heater 14 may be constructed of an iron-aluminide (e.g., FeAl or $Fe_3Al$), such as those described in commonly owned U.S. Pat. No. 5,595,706 to Sikka et al. filed Dec. 29, 1994, or nickel aluminides (e.g., $Ni_3Al$). Use of iron-aluminides is particularly advantageous in that they exhibit high resistivity. FeAl exhibits a resistivity of approximately 180 micro-ohms, whereas stainless steel exhibits approximately 50 to 91 micro-ohms. The higher resistivity lowers current draw or load on the power source (battery) 1.

In one embodiment, the heater 14 comprises a wire coil which at least partially surrounds the wick 28. In that embodiment, the wire may be a metal wire and/or the heater coil that extends partially along the length of the wick 28.

The heater coil may extend fully or partially around the circumference of the wick 28. In another embodiment, the heater coil is not in contact with the wick 28.

The heater 14 heats the pre-vapor formulation in the wick 28 by thermal conduction. Alternatively, heat from the heater 14 may be conducted to the pre-vapor formulation by means of a heat conductive element or the heater 14 may transfer heat to the incoming ambient air that is drawn through the non-combustible smoking device 60 during use, which in turn heats the pre-vapor formulation by convection.

In one embodiment, the wick comprises a ceramic material or ceramic fibers. As noted above, the wick 28 is at least partially surrounded by the heater 14. Moreover, in an embodiment, the wick 28 extends through opposed openings in the inner tube 62 such that end portions 29, 31 of the wick 28 are in contact with the pre-vapor formulation supply reservoir 22.

The wick 28 may comprise a plurality or bundle of filaments. In one embodiment, the filaments may be generally aligned in a direction transverse to the longitudinal direction of the non-combustible smoking device 60, but example embodiments are not limited to this orientation. In one embodiment, the structure of the wick 28 is formed of ceramic filaments capable of drawing the pre-vapor formulation via capillary action via interstitial spacing between the filaments to the heater 14. The wick 28 can include filaments having a cross-section which is generally cross-shaped, clover-shaped, Y-shaped or in any other suitable shape.

The wick 28 includes any suitable material or combination of materials. Examples of suitable materials are glass filaments and ceramic or graphite based materials. Moreover, the wick 28 may have any suitable capillarity to accommodate pre-vapor formulations having different physical properties such as density, viscosity, surface tension and vapor pressure. The capillary properties of the wick 28, combined with the properties of the pre-vapor formulation, ensure that the wick 28 is always wet in the area of the heater 14 to avoid overheating of the heater 14.

Instead of using a wick, the heater can be a porous material of sufficient capillarity and which incorporates a resistance heater formed of a material having a high electrical resistance capable of generating heat quickly.

In one embodiment, the wick 28 and the pre-vapor formulation storage medium 21 of the pre-vapor formulation supply reservoir 22 are constructed from an alumina ceramic. In another embodiment, the wick 28 includes glass fibers and the pre-vapor formulation storage medium 21 includes a cellulosic material or polyethylene terephthalate.

In an embodiment, the power supply 1 may include a battery arranged in the non-combustible smoking device 60 such that the anode is downstream of the cathode. An anode connector 4 contacts the downstream end of the battery. The heater 14 is connected to the battery by two spaced apart electrical leads.

The connection between the uncoiled, end portions 27, 27' (see FIG. 4) of the heater 14 and the electrical leads are highly conductive and temperature resistant while the heater 14 is highly resistive so that heat generation occurs primarily along the heater 14 and not at the contacts.

The battery may be a Lithium-ion battery or one of its variants, for example a Lithium-ion polymer battery. Alternatively, the battery may be a Nickel-metal hydride battery, a Nickel cadmium battery, a Lithium-manganese battery, a Lithium-cobalt battery or a fuel cell. In that case, the non-combustible smoking device 60 is usable until the energy in the power supply is depleted. Alternatively, the power supply 1 may be rechargeable and include circuitry allowing the battery to be chargeable by an external charging device. In that case, the circuitry, when charged, provides power for a desired (or alternatively a pre-determined) number of applications of negative pressure, after which the circuitry must be re-connected to an external charging device.

The non-combustible smoking device 60 also includes control circuitry including the sensor 16. The sensor 16 is operable to sense an air pressure drop and initiate application of voltage from the power supply 1 to the heater 14. The control circuitry can also include a heater activation light 48 operable to glow when the heater 14 is activated. In one embodiment, the heater activation light 48 comprises a heater activation light (e.g., a light emitting diode (LED)) 48 and is at an upstream end of the non-combustible smoking device 60 so that the heater activation light 48 takes on the appearance of a burning coal during an application of a negative pressure. Moreover, the heater activation light 48 can be arranged to be visible to the adult tobacco consumer. In addition, the heater activation light 48 can be utilized for e-vaping system diagnostics. The light 48 can also be configured such that the adult tobacco consumer can activate and/or deactivate the light 48 for privacy, such that the light 48 would not activate during vaping if desired.

The at least one air inlet **44*a* is located adjacent the sensor 16, such that the sensor 16 senses air flow indicative of a negative pressure and activates the power supply 1 and the heater activation light 48 to indicate that the heater 14** is working.

A control circuit is integrated with the sensor 16 and supplies power to the heater 14 responsive to the sensor 16, for example, with a maximum, time-period limiter.

Alternatively, the control circuitry may include a manually operable switch for an application of a negative pressure. The time-period of the electric current supply to the heater 14 may be pre-set depending on the amount of pre-vapor formulation desired to be vaporized. The control circuitry may be programmable for this purpose. Alternatively, the circuitry may supply power to the heater as long as the sensor 16 detects a pressure drop.

When activated, the heater 14 heats a portion of the wick 28 surrounded by the heater for less than about 10 seconds, more preferably less than about 7 seconds. Thus, the power cycle can range in period from about 2 seconds to about 10 seconds (e.g., about 3 seconds to about 9 seconds, about 4 seconds to about 8 seconds or about 5 seconds to about 7 seconds).

In an embodiment, the pre-vapor formulation supply reservoir 22 includes the pre-vapor formulation storage medium 21 containing pre-vapor formulation material. In FIG. 1, the pre-vapor formulation supply reservoir 22 is contained in an outer annulus between inner tube 62 and outer tube 6 and between stopper 10 and the seal 15. Thus, the pre-vapor formulation supply reservoir 22 at least partially surrounds the central air passage 20 and the heater 14 and the wick 28 extend between portions of the pre-vapor formulation supply reservoir 22.

The pre-vapor formulation storage medium 21 may be a fibrous material comprising cotton, polyethylene, polyester, rayon and/or combinations thereof. The fibers may have a diameter ranging in size from about 6 microns to about 15 microns (e.g., about 8 microns to about 12 microns or about 9 microns to about 11 microns). The pre-vapor formulation storage medium 21 may be a sintered, porous or foamed material. Also, the fibers may be sized to be irrespirable and can have a cross-section which has a y shape, cross shape, clover shape or any other suitable shape.

In another example embodiment, the pre-vapor formulation storage medium 21 may be a tobacco filler or tobacco slurry.

Also, the pre-vapor formulation material has a boiling point suitable for use in the non-combustible smoking device 60. If the boiling point is too high, the heater 14 will not be able to vaporize the pre-vapor formulation in the wick 28. However, if the boiling point is too low, the pre-vapor formulation may vaporize without the heater 14 being activated.

A pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerine and propylene glycol.

The pre-vapor formulation may include a tobacco element including volatile tobacco flavor compounds which are released upon heating. When the tobacco element is in the pre-vapor formulation the physical integrity of the tobacco element is preserved. For example, the tobacco element may be 2-30% by weight in the pre-vapor formulation.

For example, the tobacco element may be in the form of a sheet or shreads and is added after the pre-vapor formulation is added to the pre-vapor formulation storage medium 21.

In operation, with non-combustible smoking device 60 in an assembled configuration, a negative pressure may be applied on the mouth-end insert 8. This negative pressure may cause an internal pressure drop inside non-combustible smoking device 60 that may cause an inlet air flow to enter device 60 via air inlets 44/44'. The internal pressure drop may also cause an internal pressure drop within section 72 as air is drawn through air inlet 44*a* (via an air flow path traveling through section 72). The internal pressure drop formed in section 72 may be sensed by sensor 16. The sensor 16 may then operate to close an electrical circuit that includes the power supply 1. In turn, electrical leads carry an electrical current to heater 14 in order to energize the heater 14. The energized heater 14 in turn heats and vaporizes the pre-vapor formulation material that is drawn toward the heater 14 via the wick 28.

Figure 3:
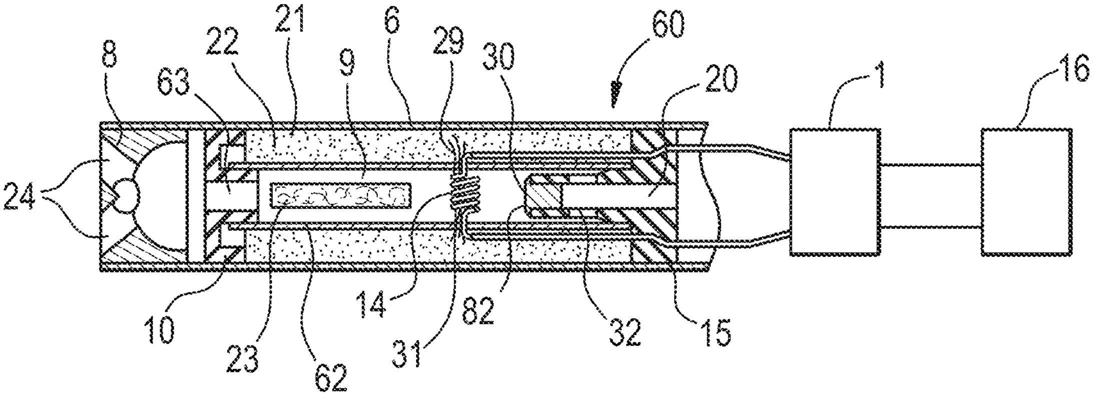
FIG. 3 is a cross-sectional view of an embodiment wherein a non-combustible smoking device includes an air flow diverter, in accordance with an example embodiment.

The pre-vapor formulation material is transferred from the pre-vapor formulation supply reservoir 22 and/or pre-vapor formulation storage medium 21 in proximity of the heater 14 by capillary action in the wick 28. In one embodiment, the wick 28 has a first end portion 29 and a second opposite end portion 31 as shown in FIG. 3. The first end portion 29 and the second end portion 31 extend into opposite sides of the pre-vapor formulation storage medium 21 for contact with pre-vapor formulation material contained therein. The heater 14 at least partially surrounds a central portion of the wick 28 such that when the heater 14 is activated, the pre-vapor formulation in the central portion of the wick 28 is vaporized by the heater 14 to vaporize the pre-vapor formulation material and form the vapor. Due to a negative pressure being applied, the vapor flows from the heater 14, through the tobacco element 23 and out of the mouth-end insert 8.

The vapor may elute tobacco elements into the flow stream. Some thermal reactions may also be present between the vapor and the tobacco element.

One advantage of an embodiment is that the pre-vapor formulation material in the pre-vapor formulation supply reservoir 22 is protected from oxygen (because oxygen cannot generally enter the pre-vapor formulation storage portion via the wick) so that the risk of degradation of the pre-vapor formulation material is significantly reduced. Moreover, in some embodiments in which the outer tube 6 is not clear, the pre-vapor formulation supply reservoir 22 is protected from light so that the risk of degradation of the pre-vapor formulation material is significantly reduced. Thus, a high level of shelf-life and cleanliness can be maintained.

As shown in FIGS. 2A and 2B, the mouth-end insert 8, includes at least two diverging outlets 24 (e.g., 3, 4, 5 or more). The outlets 24 of the mouth-end insert 8 are located at ends of off-axis passages 80 and are angled outwardly in relation to the longitudinal direction of the non-combustible smoking device 60 (i.e., divergently). As used herein, the term “off-axis” denotes at an angle to the longitudinal direction of the non-combustible smoking device 60. Also, the mouth-end insert (or flow guide) 8 may include outlets uniformly distributed around the mouth-end insert 8 so as to substantially uniformly distribute the vapor during use. Thus, the vapor moves in different directions as compared to e-vaping devices having an on-axis single orifice which directs the vapor to a single location.

In addition, the outlets 24 and off-axis passages 80 are arranged such that droplets of unvaporized pre-vapor formulation carried in the vapor impact interior surfaces 81 at mouth-end insert and/or interior surfaces of the off-axis passages such that the droplets are removed or broken apart. In an embodiment, the outlets of the mouth-end insert are located at the ends of the off-axis passages and are angled at 5 to 60 degrees with respect to the central axis of the outer tube 6 so as to more completely distribute vapor during use and to remove droplets.

Preferably, each outlet has a diameter of about 0.015 inch to about 0.090 inch (e.g., about 0.020 inch to about 0.040 inch or about 0.028 inch to about 0.038 inch). The size of the outlets 24 and off-axis passages 80 along with the number of outlets can be selected to adjust the resistance to draw (RTD) of the non-combustible smoking device 60, if desired.

As shown in FIG. 1, an interior surface 81 of the mouth-end insert 8 can comprise a generally domed surface. Alternatively, as shown in FIG. 2B, the interior surface 81' of the mouth-end insert 8 can be generally cylindrical or frustroconical, with a planar end surface. The interior surface is substantially uniform over the surface thereof or symmetrical about the longitudinal axis of the mouth-end insert 8. However, in other embodiments, the interior surface can be irregular and/or have other shapes.

The mouth-end insert 8 is integrally affixed within the tube 6 of the section 70. Moreover, the mouth-end insert 8 may be formed of a polymer selected from the group consisting of low density polyethylene, high density polyethylene, polypropylene, polyvinylchloride, polyetheretherketone (PEEK) and combinations thereof. The mouth-end insert 8 may also be colored if desired.

In an embodiment, the non-combustible smoking device 60 also includes various embodiments of an air flow diverter or air flow diverter means. The air flow diverter is operable to manage air flow at or about around the heater so as to abate a tendency of drawn air to cool the heater, which could otherwise lead to diminished vapor output.

Figure 4:
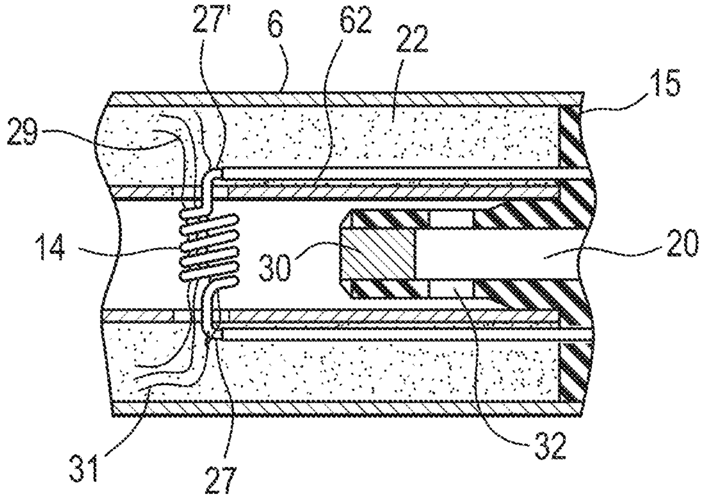
FIG. 4 is an enlarged view of the air flow diverter of the non-combustible smoking device of FIG. 3, in accordance with an example embodiment.

In one embodiment, as shown in FIGS. 3-4, the non-combustible smoking device 60 can include an air flow diverter comprising an impervious plug 30 at a downstream end 82 of the central air passage 20 in seal 15. The central air passage 20 is an axially extending central passage in seal 15 and inner tube 62. The seal 15 seals the upstream end of the annulus between the outer and inner tubes 6, 62. The air flow diverter may include at least one radial air channel 32 directing air from the central air passage 20 outward toward the inner tube 62 and into the outer air passage 9 defined between an outer periphery of a downstream end portion of the seal 15 and the inner wall of inner tube 62.

The diameter of the bore of the central air passage 20 is substantially the same as the diameter of the at least one radial air channel 32. Also, the diameter of the bore of the central air passage 20 and the at least one radial air channel 32 may range from about 1.5 mm to about 3.5 mm (e.g., about 2.0 mm to about 3.0 mm). Optionally, the diameter of the bore of the central air passage 20 and the at least one radial air channel 32 can be adjusted to control the resistance to draw of the non-combustible smoking device 60. In use, the air flows into the bore of the central air passage 20, through the at least one radial air channel 32 and into the outer air passage 9 such that a lesser portion of the air flow is directed at a central portion of the heater 14 so as to reduce or minimize the aforementioned cooling effect of the airflow on the heater 14 during heating cycles. Thus, incoming air is directed away from the center of the heater 14 and the air velocity past the heater is reduced as compared to when the air flows through a central opening in the seal 15 oriented directly in line with a middle portion of the heater 14.

Figure 5:
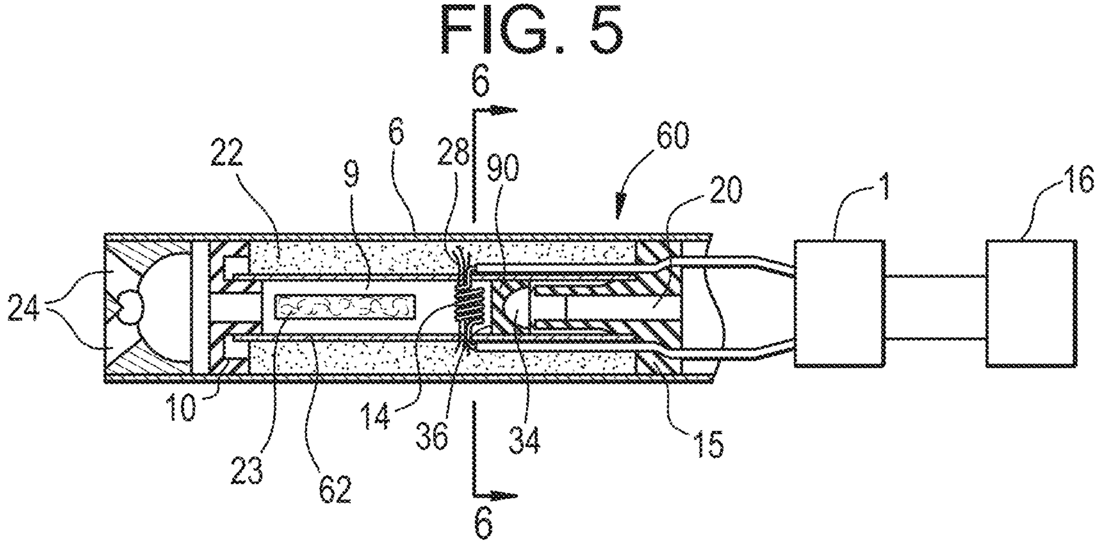
FIG. 5 is a cross-sectional view of an embodiment wherein a non-combustible smoking device includes an air flow diverter, in accordance with an example embodiment.
Figure 6:
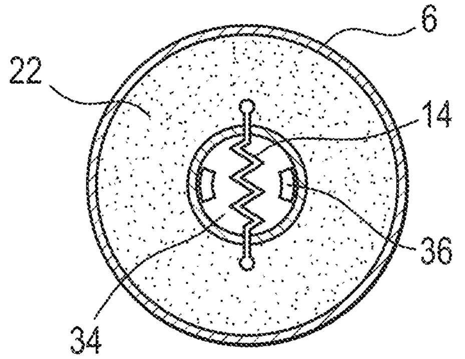
FIG. 6 is a cross-sectional view along line A-A of the non-combustible smoking device of FIG. 6, in accordance with an example embodiment.

In another embodiment, as shown in FIGS. 5-6, the air flow diverter can be in the form of a disc 34 positioned between the downstream end of seal 15 and the heater 14. The disc 34 includes at least one orifice 36 in a transverse wall at a downstream end of an outer tubular wall 90. The at least one orifice 36 may be off-axis so as to direct incoming air outward towards the inner wall of tube 62. During an application of a negative pressure, the disc 34 is operable to divert air flow away from a central portion of the heater 14 so as to counteract the tendency of the airflow to cool the heater as a result of a strong or prolonged negative pressure. Thus, the heater 14 is substantially reduced or prevented from cooling during heating cycles so as to reduce or prevent a drop in the amount of vapor produced during an application of a negative pressure.

Figure 7:
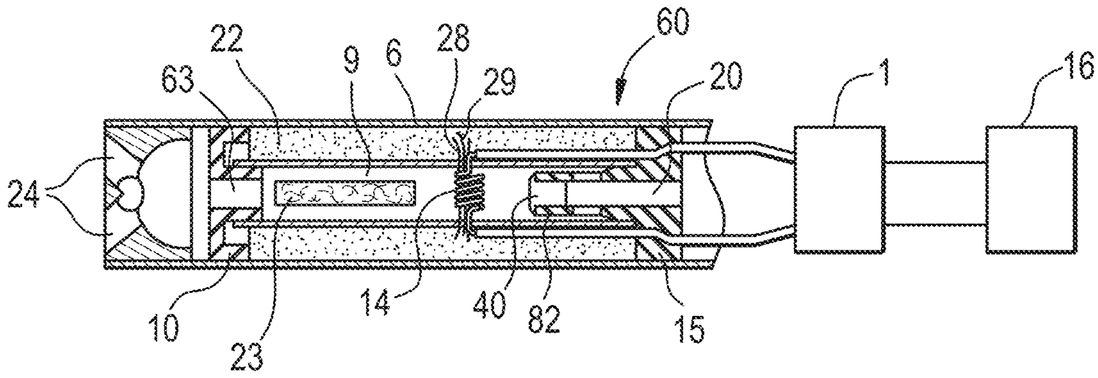
FIG. 7 is a cross-sectional view of an embodiment wherein a non-combustible smoking device includes an air flow diverter, in accordance with an example embodiment.

In yet another embodiment, as shown in FIG. 7, the air flow diverter comprises a frustroconical section 40 extending from the downstream end 82 of a shortened central air passage 20. By shortening the central air passage 20 as compared to other embodiments, the heater 14 is positioned farther away from the central air passage 20 allowing the air flow to decelerate before contacting the heater 14 and lessen the tendency of the air flow to cool the heater 14. Alternatively, the heater 14 can be moved closer to the mouth-end insert 8 and farther away from the central air passage 20 to allow the air flow time and/or space sufficient to decelerate to achieve the same cooling-abatement effect.

The addition of the frustroconical section 40 provides a larger diameter bore size which can decelerate the air flow so that the air velocity at or about the heater 14 is reduced so as to abate the cooling effect of the air on the heater 14 during negative pressure cycles. The diameter of the large (exit) end of the frustroconical section 40 ranges from about 2.0 mm to about 4.0 mm, and preferably about 2.5 mm to about 3.5 mm.

The diameter of the bore of the central air passage 20 and the diameter of the smaller and/or larger end of the frustroconical section 40 can be adjusted to control the resistance to draw of the non-combustible smoking device 60.

The air flow diverter of the various embodiments channels the air flow by controlling the air flow velocity (its speed and/or the direction of the air flow). For example, the air flow diverter can direct air flow in a particular direction and/or control the speed of the air flow. The air flow speed may be controlled by varying the cross sectional area of the air flow route. Air flow through a constricted section increases in speed while air flow through a wider section decreases speed.

The outer tube 6 and/or the inner tube 62 may be formed of any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK), ceramic, and polyethylene. In one embodiment, the material is light and non-brittle.

Figure 8:
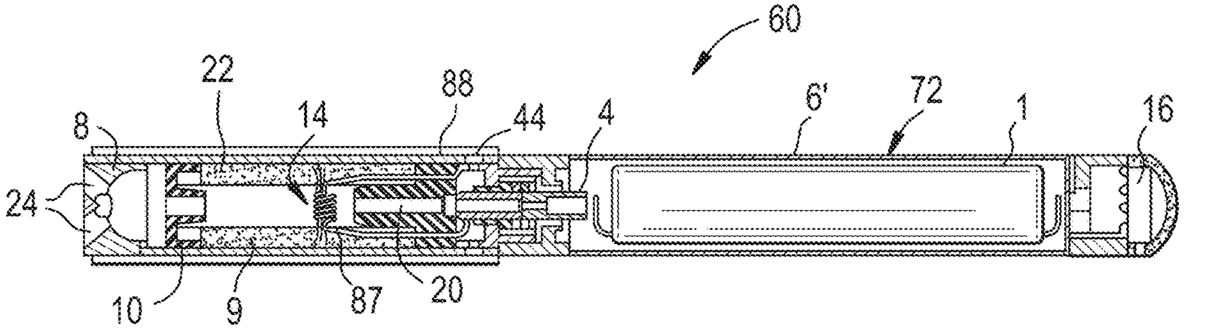
FIG. 8 is a cross-sectional view of a non-combustible smoking device and further including a sleeve assembly, in accordance with an example embodiment.

As shown in FIG. 8, the non-combustible smoking device 60 can also include a sleeve assembly 87 removably and/or rotatably positioned about the outer tube 6 adjacent the first section 70 of the non-combustible smoking device 60. Moreover, the sleeve assembly 87 insulates at least a portion of the first section 70 so as to maintain the temperature of the vapor prior to delivery to the adult tobacco consumer. In an embodiment, the sleeve assembly 87 is rotatable about the non-combustible smoking device 60 and includes spaced apart slots 88 arranged transversely about the sleeve assembly such that the slots 88 line up with the air inlets 44 in the first section 70 to allow air to pass into the non-combustible smoking device 60 when a negative pressure is applied on the non-combustible smoking device 60. Before or during vaping, the adult tobacco consumer can rotate the sleeve assembly 87 such that the air inlets 44 are at least partially blocked by the sleeve assembly 87 so as to adjust the resistance to draw and/or ventilation of the non-combustible smoking device 60.

The sleeve assembly 87 is made of silicone or other pliable material so as to provide a soft mouthfeel to the adult tobacco consumer. However, the sleeve assembly 87 may be formed in one or more pieces and can be formed of a variety of materials including plastics, metals and combinations thereof. In an embodiment, the sleeve assembly 87 is a single piece formed of silicone. The sleeve assembly 87 may be removed and reused with other non-combustible smoking devices or can be discarded along with the first section 70. The sleeve assembly 87 may be any suitable color and/or can include graphics or other indicia.

Figure 9:
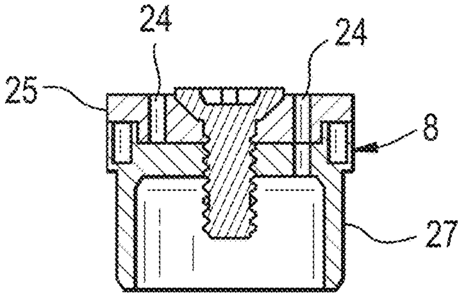
FIG. 9 is a cross-sectional view of a second embodiment of a mouth-end insert for use with a non-combustible smoking device, in accordance with an example embodiment.
Figure 10:
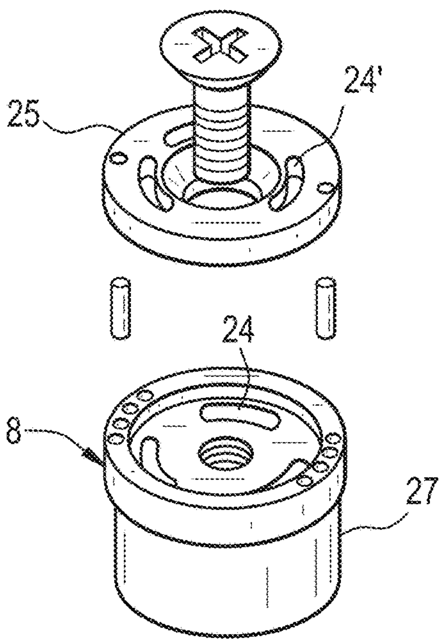
FIG. 10 is an exploded view of the mouth-end insert of FIG. 9, in accordance with an example embodiment.

As shown in FIGS. 9-10, in an alternative embodiment, the non-combustible smoking device can include a mouth-end insert 8 having a stationary piece 27 and a rotatable piece 25. Outlets 24, 24' are located in each of the stationary piece 27 and the rotatable piece 25. One or more of the outlets 24, 24' align as shown to allow vapor to enter an adult tobacco consumer's mouth. However, the rotatable piece 25 can be rotated within the mouth-end insert 8 so as to at least partially block one or more of the outlets 24 in the stationary piece 27. Thus, the amount of vapor output may be varied with each application of a negative pressure. The outlets 24, 24' can be formed in the mouth-end insert 8 such that the outlets 24, 24' diverge.

In another embodiment, the air flow diverter comprises the addition of a second wick element adjacent to but just upstream of the heater 14. The second wick element diverts portions of the air flow about the heater 14.

While FIGS. 1, 3, 5 and 7-8 illustrate a tobacco element in an outer air passage, example embodiments are not limited thereto.

Figure 11A:
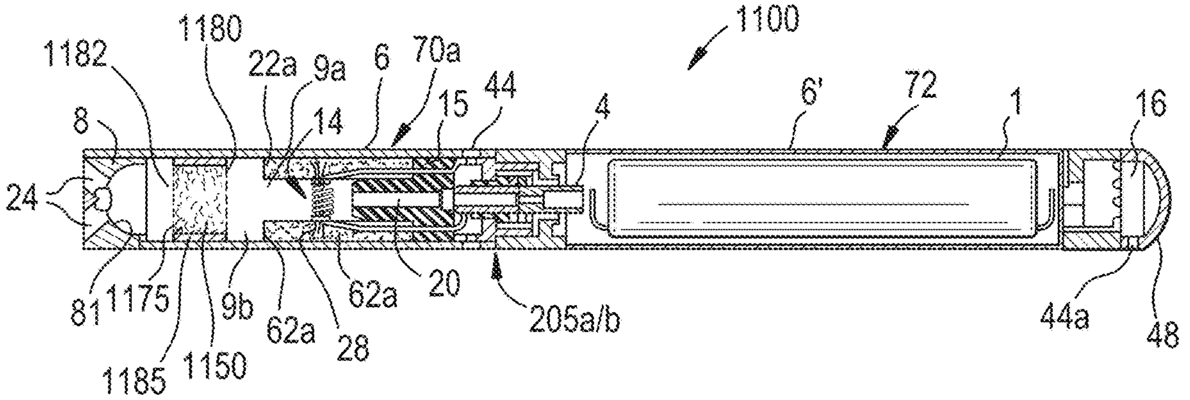
FIGS. 11A-11B illustrate example embodiments of a non-combustible smoking device including a tobacco element.

FIG. 11A illustrates an example embodiment of a non-combustible smoking device 1100 including a tobacco element 1150. The non-combustible smoking device 1100 is similar to the non-combustible smoking device 60. Thus, for the sake of brevity, only the differences will be described.

The non-combustible smoking device 1100 includes a pre-vapor formulation supply reservoir 22*a*. The pre-vapor formulation supply reservoir 22*a* is the same as the pre-vapor formulation supply reservoir 22 except the pre-vapor formulation supply reservoir 22*a* is shorter in the longitudinal direction.

A first section 70*a* includes the outer tube 6 (or housing) extending in a longitudinal direction and an inner tube 62*a* coaxially positioned within the outer tube or housing 6. The inner tube 62*a* defines a first outer air passage 9*a*. The first outer air passage 9*a* opens to a second outer air passage 9*b*.

An end of the inner tube 62*a* and the mouth-end insert 8 defines the second outer air passage 9*b*. In other words, the outer tube 6 may define a diameter in the latitudinal direction of the second outer air passage 9*b*. As shown, the diameter in the latitudinal direction of the second outer air passage 9*b* is larger than a diameter in the latitudinal direction of the first outer air passage 9*a*.

Within the second outer air passage 9*b* is the tobacco element 1150. The tobacco element 1150 may be inserted into the second outer air passage 9*b* by removing the mouth-end insert 8 and inserting the tobacco element 1150 into the second outer air passage 9*b*, for example.

The tobacco element 1150 may be a tobacco plug which refers to a compressed form of tobacco including, but not limited to tobacco strands, rolled tobacco or filler. The tobacco plug may be wrapped in natural tobacco, reconstituted sheet tobacco or aluminum, for example. While only one tobacco plug is illustrated, it should be understood that a plurality of tobacco plugs may be used. Fibrous segments (e.g., cellulose acetate, other synthetic fibers, or natural fibers) may be placed between the plurality of tobacco plugs.

For example, a cylindrical housing 1185 holds tobacco. The cylindrical housing 1185 may be made of aluminum, for example. The cylindrical housing 1185 has an outer diameter that fits with the diameter of the outer air passage 9*b*. Along the longitudinal axis of the housing 6, mesh screens 1175 and 1180 fit at ends of the cylindrical housing 1185 to enclose the tobacco in the cylindrical housing 1185. As shown in FIG. 11A, the mesh screens 1175 and 1180 include openings 1182 to allow air to pass from one end of the cylindrical housing through the tobacco and out of the end of the cylindrical housing 1185 closest to the mouth-end insert 8.

The tobacco element 1150 is arranged in such a way to allow the vapor generated by the heater 14 to pass through the tobacco. For example, the tobacco element 1150 may be spaced a first distance from the mouth-end insert 8 and a second distance from the pre-vapor formulation supply reservoir 22. The first distance and the second distance may be the same or different.

Due to a negative pressure being applied, the vapor flows from the heater 14, through the tobacco element 1150 and out of the mouth-end insert 8. The heater 14 may be a set distance from the tobacco element 1150 or contacting the tobacco element 1150 such that the heater 14 heats the tobacco to a temperature (as described above) during an application of a negative pressure. In an example, the heater 14 may be 1-5 mm from the tobacco element 1150.

Figure 11B:
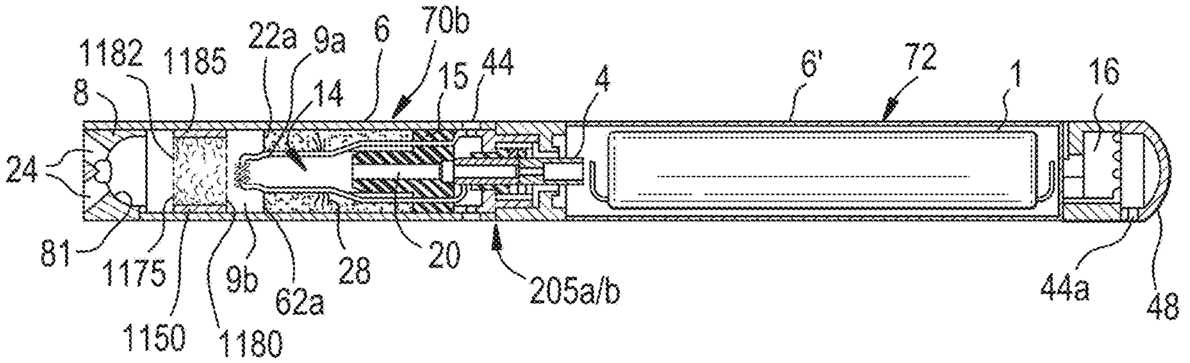

While the inner tube 62*a* is shown as extending past the heater 14 in the longitudinal direction to the mouth-end insert 8, it should be understood that the heater 14 may be arranged to extend into the second outer air passage 9*b*. As a result, the tobacco element 1150 may be spaced apart from the heater 14 or in contact with the heater 14, such as shown FIG. 11B. In FIG. 11B, the heater 14 is in the second outer passage 9*b* of a section 70*b*. Thus, pre-vapor formulation supply reservoir 11*a*, the heater 14 and the tobacco element 1150 are sequentially arranged.

While the gasket 10 is not illustrated, the non-combustible smoking device 11 may include the gasket 10.

Figure 12:
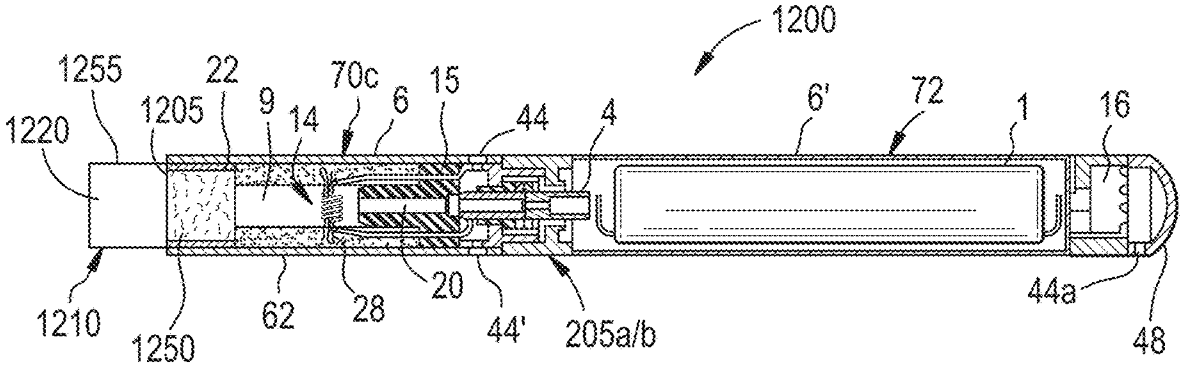
FIG. 12 illustrates an example embodiment of a non-combustible smoking device.

FIG. 12 illustrates an example embodiment of a non-combustible smoking device 1200. FIG. 12 illustrates an example embodiment of a non-combustible smoking device 1200 including a tobacco element 1250. The non-combustible smoking device 1200 is similar to the non-combustible smoking device 60 except a section 70*c* does not include the mouth-end insert 8, the tobacco element 23 and the gasket 10 and the non-combustible smoking device 1200 further includes an insert 1210. Thus, for the sake of brevity, only the differences will be described.

By removing the mouth-end insert 8 and the gasket 10, the non-combustible smoking device 1200 includes a receiving area 1205 fitted to receive a tobacco insert 1210. The receiving area 1205 is defined by the outer tube 6 and an end of the pre-vapor formulation supply reservoir 22.

The tobacco insert 1210 may be a cigarette or cigar. For example, the tobacco insert may be a filtered cigarette, a non-filtered cigarette, a cigarillo, a filter tipped cigar filter, a tipped cigar or an untipped cigar/cigarillo, for example. However, example embodiments are not limited thereto.

The tobacco insert 1210 is a detachable insert. In the example shown in FIG. 12, the tobacco insert 1210 may be a cigarette or a portion of a cigarette. The tobacco insert 1210 includes a filter 1220 and a tobacco element 1250. In example embodiments where the tobacco insert is an untipped cigar/cigarillo, the tobacco insert does not include a filter.

Tipping paper 1255 may overlap the filter 1220 and the tobacco element 1250. The tipping paper 1255 may cover surface areas of the tobacco insert 1210 that extend in along the outer tube 6. Thus, the tipping paper 1255 provides stiffness to the tobacco insert 1210, permitting easier insertion to the receiving area 1205. An aluminum foil may also be used to contain the tobacco element 1250, with or without additional tipping paper.

The position of the heater 14 is not limited to the position shown in FIG. 12A. For example, the heater 14 may be positioned at the end of the outer air passage 9 such that the heater 14 is closer to the tobacco element 1250 and/or in contact with the tobacco element 1250. In another example embodiment, the heater 14 may protrude out of the outer air passage 9 in the same manner as shown in FIG. 11B.

The heater 14 may be a set distance from the tobacco element 1250 or contacting the tobacco element 1250 such that the heater 14 heats the tobacco element 1250 to a temperature (as described above) during an application of a negative pressure.

In operation, with non-combustible smoking device 1200 in an assembled configuration, a negative pressure may be applied on the tobacco insert 1210. The negative pressure may cause an internal pressure drop inside non-combustible smoking device 1200 that may cause an inlet air flow to enter the device 1200 via air inlets 44/44'. The internal pressure drop may also cause an internal pressure drop within section 72 as air is drawn through air inlet 44*a* (via an air flow path traveling through section 72). The internal pressure drop formed in section 72 may be sensed by sensor 16. The sensor 16 may then operate to close an electrical circuit that includes the power supply 1. In turn, electrical leads carry an electrical current to heater 14 in order to energize the heater 14. The energized heater 14 in turn heats and vaporizes a portion of the pre-vapor formulation that is drawn toward the heater 14 via the wick 28.

Pre-vapor formulation material is transferred from the pre-vapor formulation supply reservoir 22 and/or pre-vapor formulation storage medium 21 in proximity of the heater 14 by capillary action in the wick 28. When the heater 14 is activated, the pre-vapor formulation in the central portion of the wick 28 is vaporized by the heater 14 to vaporize the pre-vapor formulation material and form vapor. Due to a negative pressure being applied, the vapor flows from the heater 14, through the tobacco element 1250 and out of the filter 1220.

In the example shown in FIG. 12, the filter 1220 may be a cellulose acetate (CA) filter. CA filter elements, such as triacetin, can be eluted into vapor. Vapor phase nicotine and other volatile elements in vapor can be reduced by a presence of tobacco.

Figure 13A:
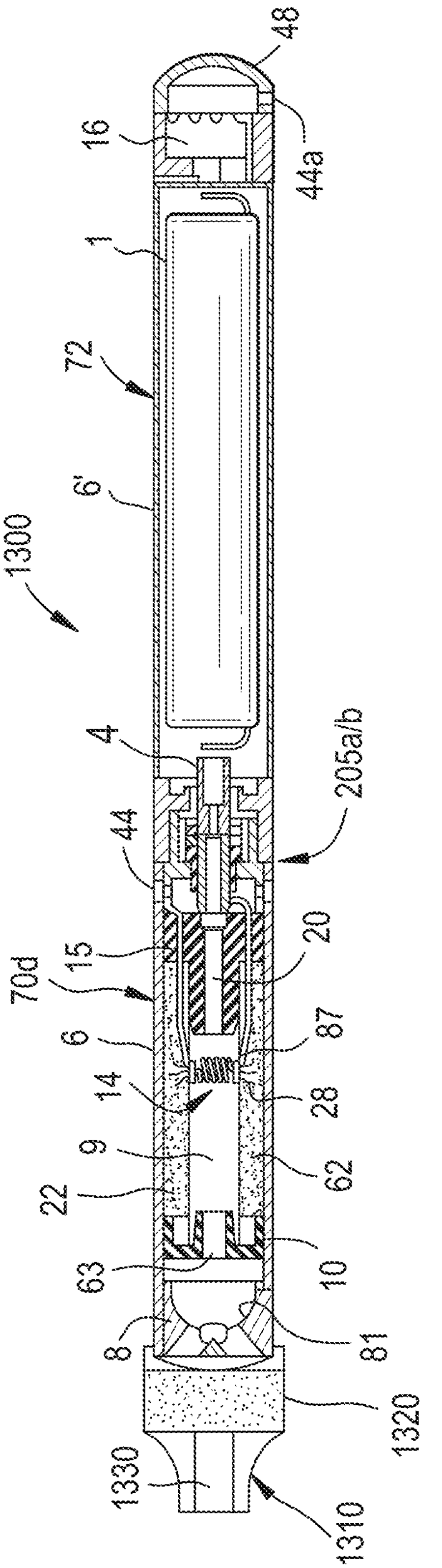
FIGS. 13A-13B illustrate example embodiments of a non-combustible smoking device including a tobacco element.

FIG. 13A illustrates an example embodiment of a non-combustible smoking device 1300.

The non-combustible smoking device 1300 is similar to the non-combustible smoking device 60 except a section 70*d* does not include the tobacco element 23 and the non-combustible smoking device 1300 further includes a detachable mouthpiece 1310. Thus, for the sake of brevity, only the differences will be described.

The detachable mouthpiece 1310 includes a tobacco element 1320. The tobacco element 1320 may be contained in a plug or bag, and attached to the inside of mouthpiece 1310. The detachable mouthpiece 1310 fits over a portion the outer tube 6 to form a seal between the detachable mouthpiece and the section 70*d*. The detachable mouthpiece 1310 may form the seal by sliding onto the outer tube 6 or having a connection mechanism (e.g., male/female) to connect to the outer tube 6.

In operation, with non-combustible smoking device 1300 in an assembled configuration, a negative pressure may be applied on the detachable mouthpiece 1310. Due to a negative pressure being applied, the vapor flows from the heater 14, through the mouth-end insert 8, into the tobacco element 1320 and out of the detachable mouthpiece 1310 through an air passage 1330.

The heater 14 may be a set distance from the tobacco element 1320 or contacting the tobacco element 1320 such that the heater 14 heats the tobacco element 1320 to a temperature (as described above) during an application of a negative pressure.

Figure 13B:
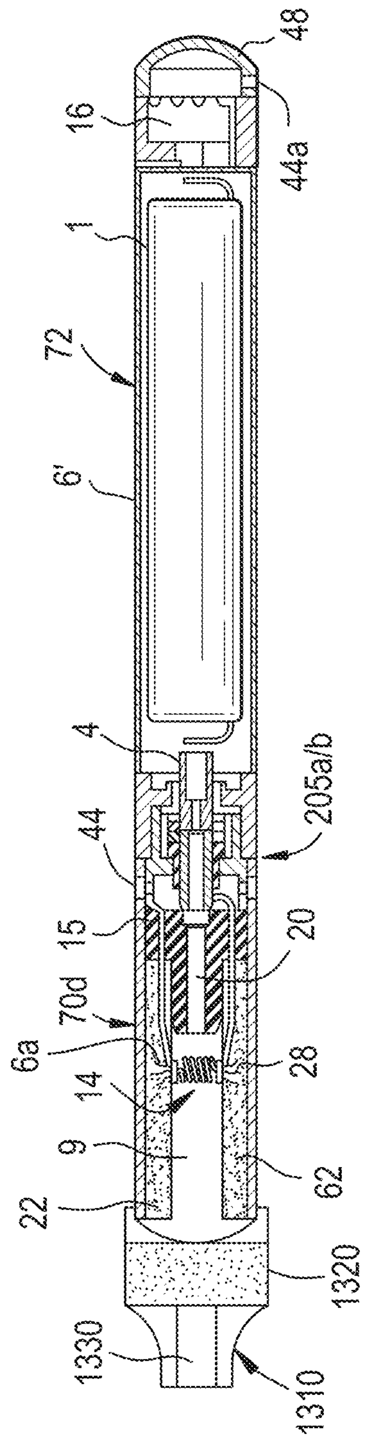

In another example embodiment, the mouth-end insert 8 and the gasket 10 may be omitted such as shown in FIG. 13B. In the embodiment shown in FIG. 13B, a tube 6*a* is shorter than the tube 6, of FIG. 13A.

In other example embodiments, the tobacco element may be in the pre-vapor formulation supply reservoir and/or function as the pre-vapor formulation storage medium.

Figure 14B:
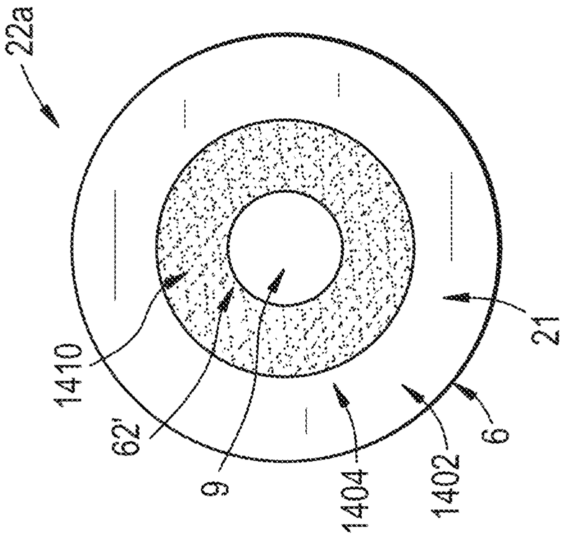
FIGS. 14A-B illustrate an example embodiment of a pre-vapor formulation supply reservoir.
Figure 14A:
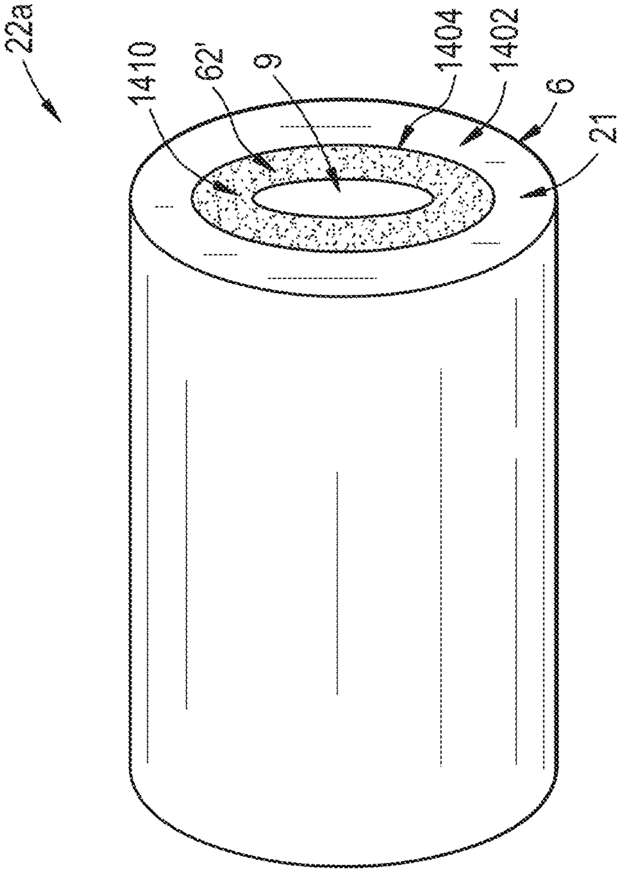

For example, FIGS. 14A-B illustrate an example embodiment of a pre-vapor formulation supply reservoir. A pre-vapor formulation supply reservoir 22*a* may be used as the pre-vapor formulation supply reservoir 22.

As shown, the pre-vapor formulation supply reservoir 22*a* includes a pre-vapor formulation 1402, an intermediate tube 1404, a tobacco element 1410 and an inner tube 62'. The inner tube 62' defines the air passage 9 and may include a metal grid, screen or mesh, for example.

In another example embodiment, the inner tube 62' may be the inner tube 62 may be formed of any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK), ceramic, and polyethylene.

The intermediate tube 1404 may include a glass fiber. The pre-vapor formulation 1402 is between the intermediate tube 1404 and the outer tube 6 and may be in the pre-vapor formulation storage medium 21.

The tobacco element 1410 is between the inner tube 62' and the intermediate tube 1404. The tobacco element 1410 may be tobacco sheet, shreds, powder, beads or a sponge, for example. The inner tube 62' may include extenders protruding into the tobacco to help heat transfer.

In operation, a negative pressure may be applied to the non-combustible smoking device, which activates the heater 14, as described above. The heater heats the pre-vapor formulation 1402 to form a vapor and the vapor flows from the heater 14, through the tobacco element 1410 and into the air passage 9.

As a result, the tobacco element 1410 is exposed to heat from the vapor and from the heater 14. Therefore, a tobacco aroma is imparted on the vapor.

In an example embodiment, an amount of tobacco element (e.g., filler) in the non-combustible smoking device may produce about a same number of applications of a negative pressure as a cigarette. Alternatively, the amount of tobacco element may produce a fixed number of applications of a negative pressure.

In an example embodiment, the tobacco element may have nicotine removed.

Example embodiments described in FIGS. 1-14B may be combined to utilize a tobacco element in more than one location. For example, a first tobacco element can be combined with the pre-vapor formulation in the pre-vapor formulation supply reservoir and a second tobacco element may be in the passage 9. In other example embodiment, a first tobacco element can be combined with the pre-vapor formulation in the pre-vapor formulation supply reservoir and a second tobacco element may be a tobacco plug in the second outer air passage 9*b*. In another example embodiment, a first tobacco element can be combined with the pre-vapor formulation in the pre-vapor formulation supply reservoir and a second tobacco element may be in an insert or detachable mouthpiece. In another example embodiment, a first tobacco element can be in the passage 9 and a second tobacco element may be in an insert or detachable mouthpiece.

Example embodiments provide a non-combustible smoking device having a heater that heats a pre-vapor formulation and may provide heat to a tobacco element. More specifically, the non-combustible smoke device according to example embodiments exposes a vapor to a tobacco element and/or exposes a pre-vapor formulation to a tobacco element. When the tobacco element is in the pre-vapor formulation the physical integrity of the tobacco element is preserved.

In other example embodiments, a non-combustible smoke device can be a pod device or tank device that exposes a vapor to a tobacco element and/or exposes a pre-vapor formulation to a tobacco element.

While a single heater is described with reference to FIGS. 1-14B, example embodiments may include a multiple heater non-combustible smoking device. A first heater may be the heater 14 to vaporize the pre-vapor formulation and a second heater may be used to heat the tobacco element. The second heater may penetrate the tobacco element.

Figure 15A:
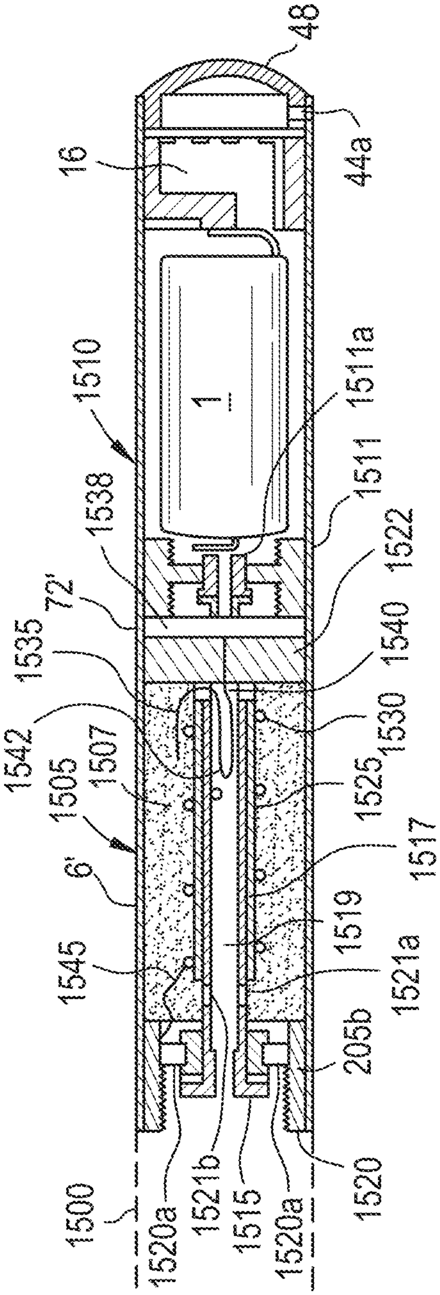
FIGS. 15A-B illustrates an example embodiment of a non-combustible smoking device having a plurality heaters.
Figure 15B:
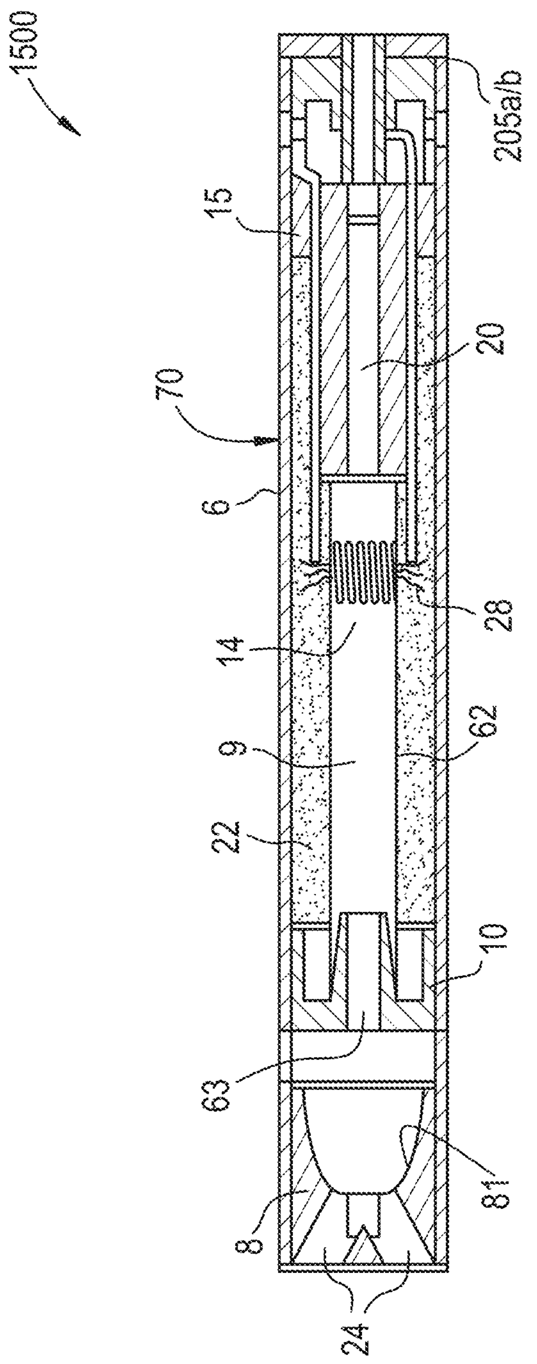

For example, FIGS. 15A-15B illustrates an example embodiment of a non-combustible smoking device having a plurality heaters.

In FIG. 15A, a first section 1500 may be similar to the first section 70, shown in FIG. 1, without the tobacco element 23. FIG. 15B illustrates the first section 1500. Since the first section 1500 is the same as the first section 70 without the tobacco element 23, for sake of brevity, the first section 1500 is not described in further detail.

As shown in FIG. 15A, a second section 72' of the non-combustible smoking device includes a tobacco housing 1505 and a power housing 1510. The tobacco housing 1505 and the power housing 1510 may be separate cartridges that are connected together by a connecting portion 1511. The connecting portion 1511 may be the same as the threaded connection 205.

The tobacco housing 1505 houses tobacco 1507 and is configured to allow an aroma from the tobacco 1507 to flow into the first section 1500.

The tobacco housing includes the connector **205*b*, which has an anode portion 1515 and a cathode portion 1520. The anode portion 1515 includes an annular section 1517 that extends longitudinally in the tobacco housing 1505. The anode portion 1515 includes two holes 1521*a* and 1521*b* to allow air to flow into the tobacco 1507 and a channel 1519 when a negative pressure is applied on the mouth-end insert 8. Both the anode portion 1515 and the cathode portion 1520 include an electrically conductive material such as plated brass or stainless steel. The channel 1519 is defined in part by the anode portion 1515 in the longitudinal direction. A filter 1522 is located at one end of the channel 1519 and another end of the channel 1519 is open to the first section 1500. The filter 1522 may include cellulous acetate, glass fiber, ceramic, cotton, or any chemically inert porous material. As a result, the channel 1519 provides a path for air to flow into the tobacco 1507**.

A fibrous sleeve 1525 covers at least a portion of the annular portion 1517 of the anode portion 1515. The fibrous sleeve 1525 may be a cellulosic material or polyethylene terephthalate and may extend from ends of the holes **1521*a*, 1521*b* to the filter 1522. The fibrous sleeve 1525 aids in controlling the temperature by absorbing heat emitted from a coiled heater 1530. The fibrous sleeve 1525 may be fiber glass or any material that is chemically inert and not electrically conductive. The fibrous sleeve 1525 electrically separates the heater 1530 and the anode portion 1515**.

A coiled heater 1530 wraps around the fibrous sleeve 1525 in the longitudinal direction and heats the tobacco when power is supplied to the heater 1530 from the power supply 1. The heater 1530 may heat the tobacco and not burn it. For example, the heater 1530 may operate at around 190° C. or could be varied based on a power supply control. The heater 1530 heats the tobacco 1507 to generate a tobacco aroma.

To receive power from the power supply 1, the heater 1530 is attached to the anode portion 1515 and the cathode portion 1520. More specifically, an anode of the power supply 1 is connected to an anode portion **1511*a* of the connecting portion 1511 which is connected to a battery connector 1538. The anode portion 1515 is connected to the battery connector by a wire 1540. While the wire 1540 is illustrated as passing through the filter 1540, the wire may pass between the filter 1540 and the outer tube 6'. The heater 1530 is connected to the anode portion 1515 by a wire 1535. The wire 1540 and 1535 form a soldered connection 1542 on the anode portion 1515**.

In addition, the heater 1530 is soldered to wire 1545 which is connected to the cathode portion 1520. The wire 1545 may be connected to the cathode portion 1520 by, for example, spot welding or soldering the two electrical leads of the heater 252. It should be understood that connections should not be limited to soldering or spot welding. Where soldering is used welding may be used instead and vice versa.

Figure 16:
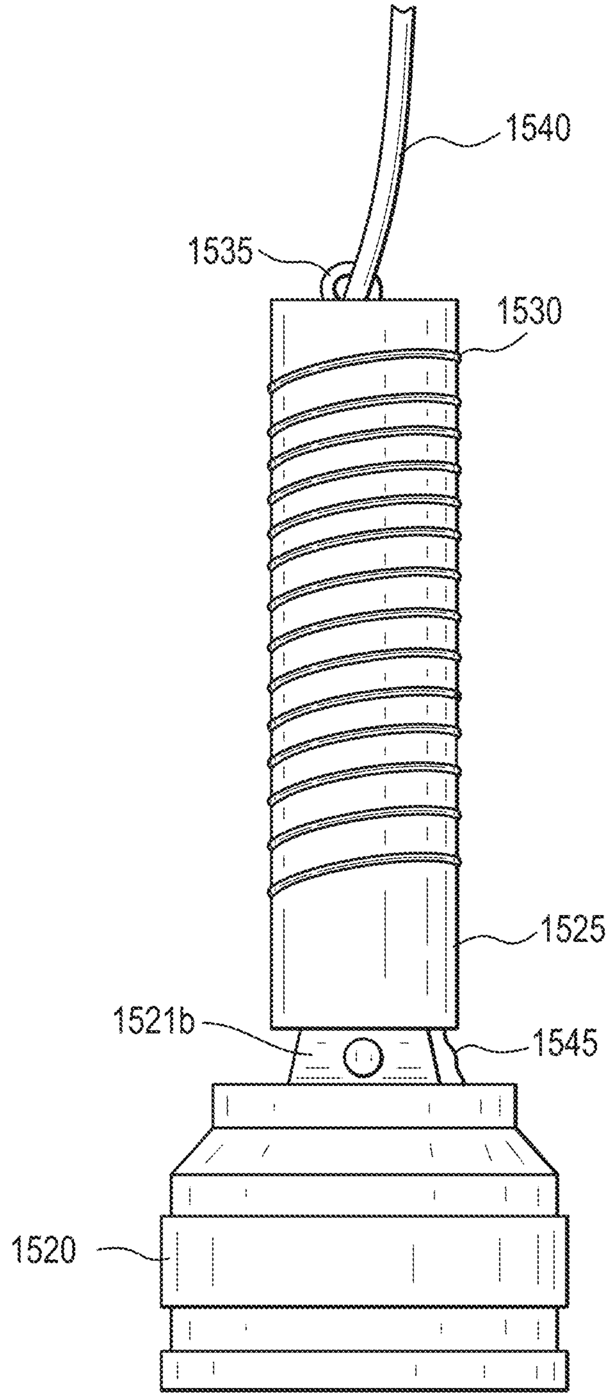
FIG. 16 illustrates a top view of a coiled heater shown in FIG. 15A.

FIG. 16 illustrates a top view of the coiled heater 1530 surrounding the fibrous sleeve 1525. As shown, the coiled heater 1530 wraps around the fibrous sleeve 1525. The wire 1540 extends from the annular section 1517 of the anode portion 1515 past the fibrous sleeve 1525 to the battery connector 1538. Moreover, the sleeve 1525 extends to the hole **1521*b* of the anode portion 1515**.

Referring back to FIG. 15A, the cathode portion 1520 includes holes **1520*a***.

Figure 17:
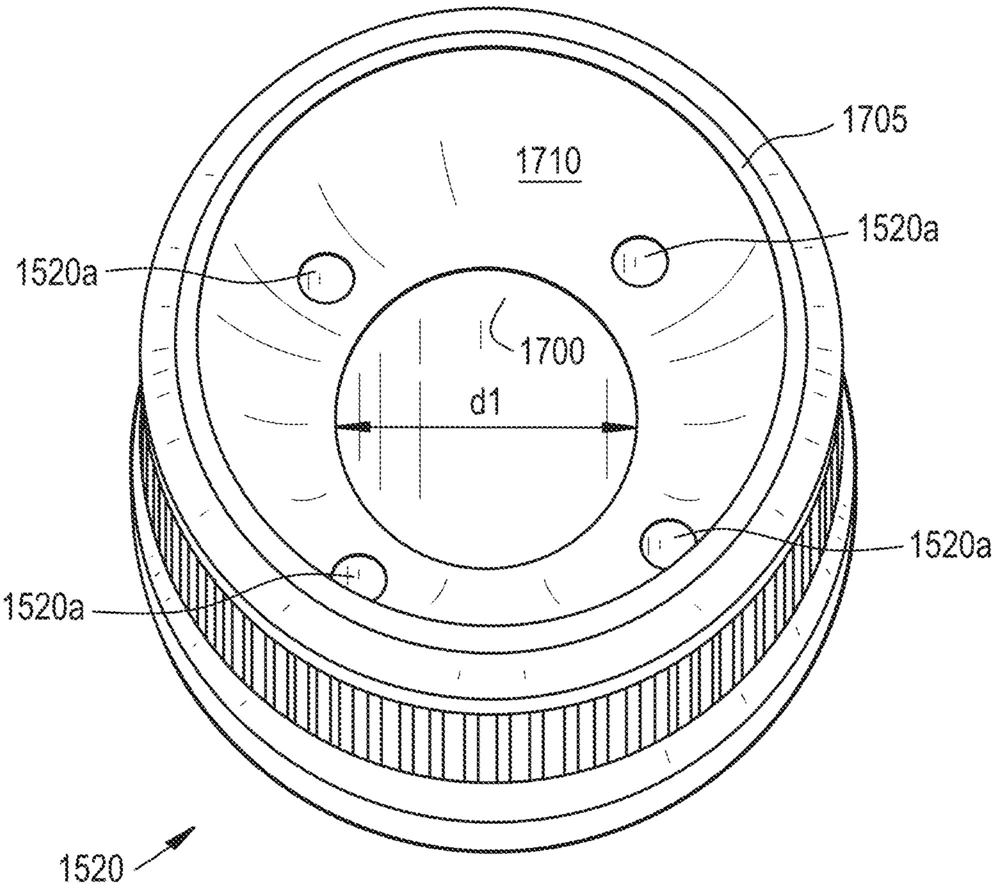
FIG. 17 illustrates a top view of a cathode portion shown in FIG. 15A.

FIG. 17 illustrates a top view of the cathode portion 1520, according to an example embodiment. As shown, the cathode portion 1520 includes four holes **1520*a*. While four holes 1520*a* are illustrated, it should be understood that greater than or less than four holes may be used. Moreover, an inner surface 1700** has a diameter d1 that defines a receiving area for the anode portion.

The cathode portion 1520 includes an upper circular area 1705 and a lower circular area 1710. The holes **1520*a* are spaced approximately 90 degrees from each other and extend through the lower circular area 1710 to provide airways between the tobacco housing 1505 and the first section 1500**.

More specifically, when a negative pressure is applied on the mouth-end insert 8, air flows through the channel 1519 as well as through the tobacco 1507 and the holes **1520*a*. The air flowing through the channel 1519 into the section 1500 will also have tobacco aroma due to the air flow path provided by the holes 1521*a* and 1521*b* in the anode portion 1515**.

Figure 18:
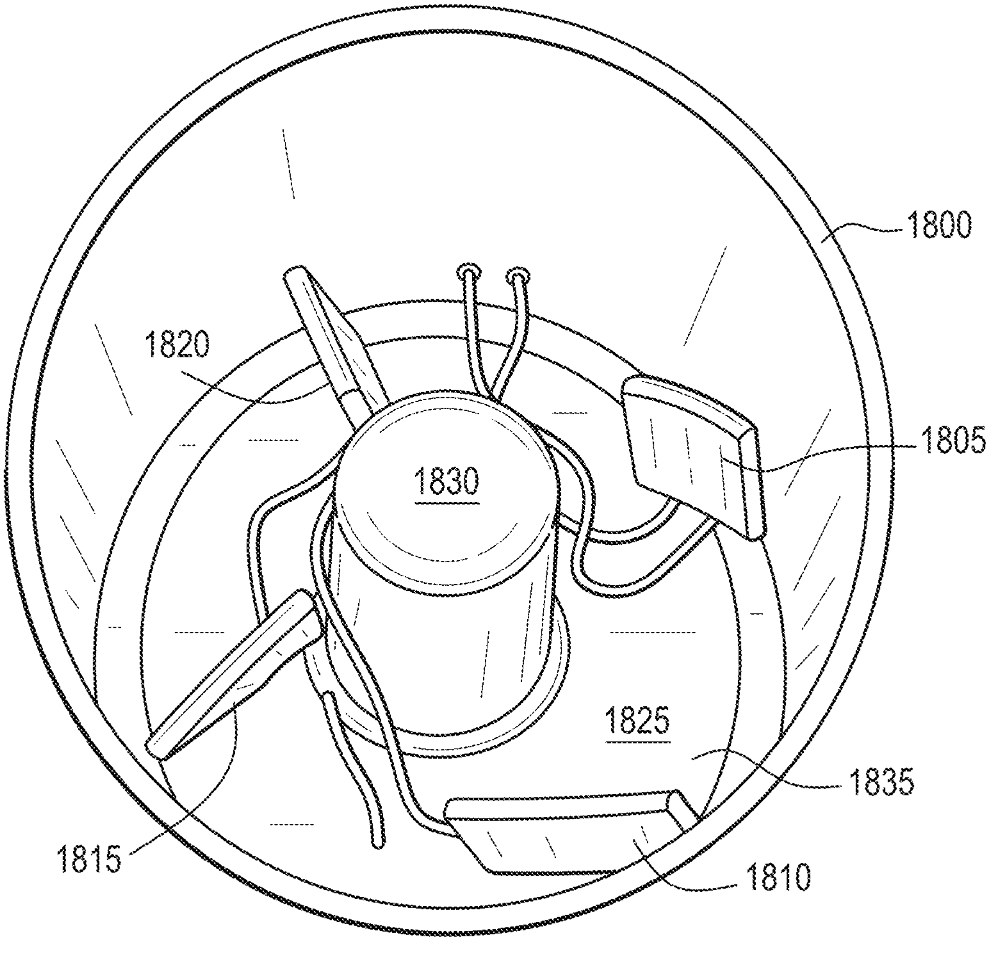
FIG. 18 illustrates a tobacco housing for a non-combustible smoking device according to an example embodiment.

FIG. 18 illustrates a tobacco housing for a non-combustible smoking device according to an example embodiment. As shown in FIG. 18, a tobacco housing 1800 includes a tobacco receiving area 1825 and a protrusion 1830 extending from a surface 1835 of the tobacco receiving area 1825. The tobacco housing 1800 is cylindrical in shape and holds tobacco to be heated from heaters 1805, 1810, 1815 and 1820. The heaters 1805, 1810, 1815 and 1820 extend from the protrusion 1830 into the receiving area 1825. The tobacco housing 1800 may be upstream of a vapor generating area. Thus, the heaters 1805, 1810, 1815 and 1820 heat the tobacco to provide an aroma to the vapor generated downstream. The heaters 1805, 1810, 1815 and 1820 are connected to a power source such as the power supply 1.

Figure 19:
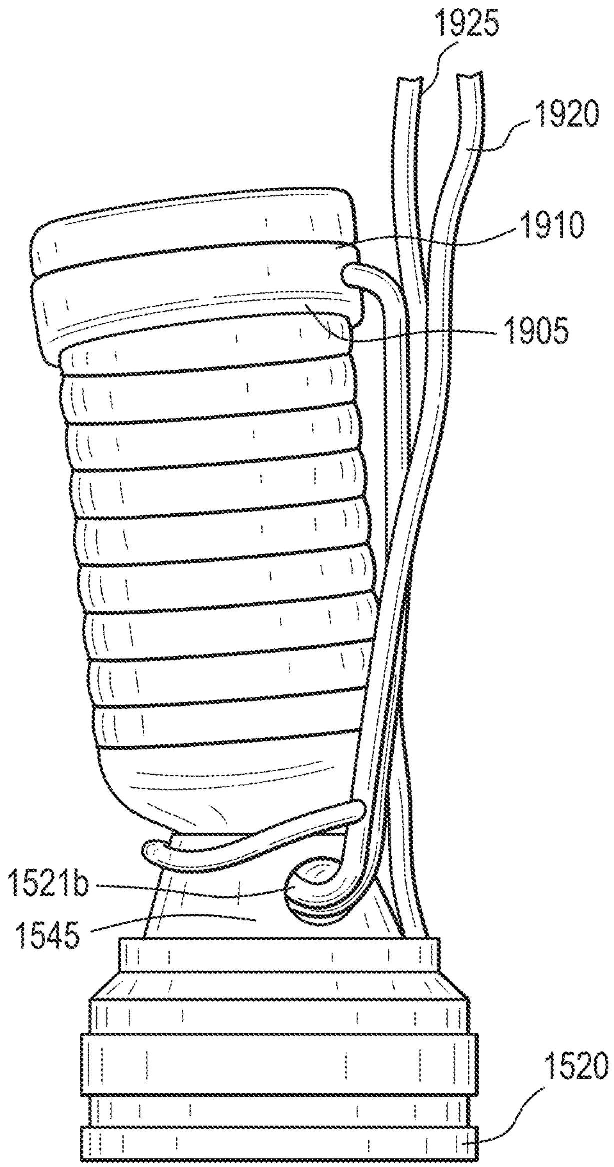
FIG. 19 illustrates another example embodiment of a non-combustible smoking device having a plurality heaters.

FIG. 19 illustrates another example embodiment of a non-combustible smoking device having a plurality heaters.

FIG. 19 illustrates a mesh heater 1905 covered in a fiber glass shield 1910 to help control the temperature. Tobacco is between the mesh heater 1905 and the fiber glass shield 1910. The mesh heater 1905 and fiber glass shield 1910 may be used instead of the tobacco heating arrangement illustrated in FIG. 15A. Thus, the fiber glass shield 1910 may abut the housing 6. The mesh heater 1905 is connected to the power supply 1 through anode and cathode wires 1920 and 1925. The mesh is coiled from the top to the bottom of the cartridge.

The non-combustible smoking devices according to example embodiments may be stored in various configurations.

Figure 20:
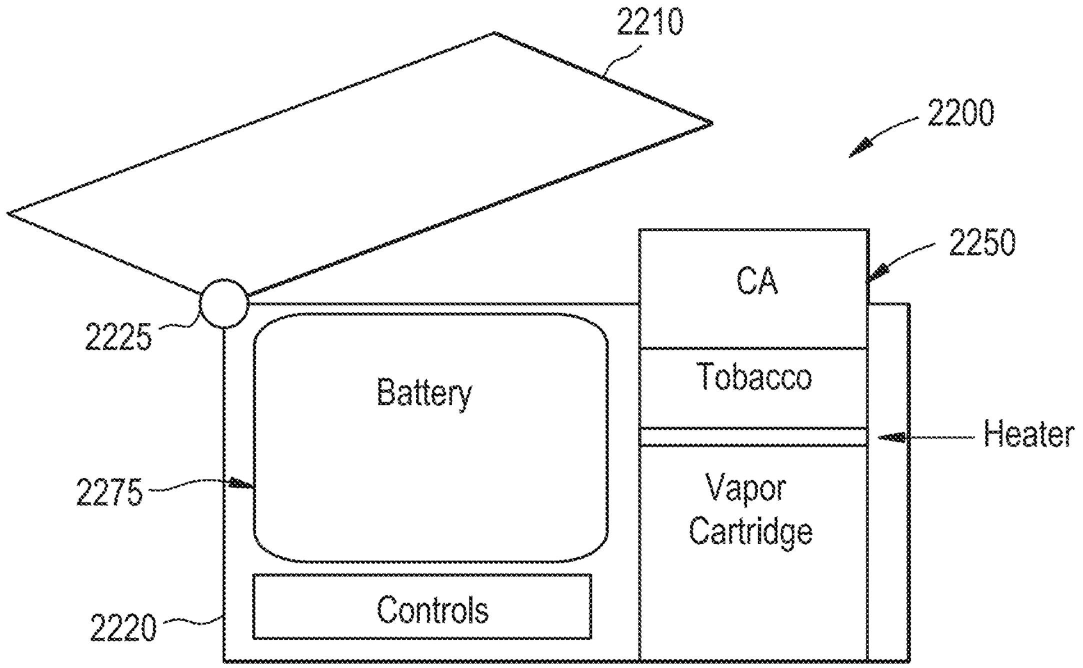
FIG. 20 illustrates a flip top container for a non-combustible smoking device according to an example embodiment.

FIG. 20 illustrates a flip top container for a non-combustible smoking device according to an example embodiment.

As shown, a flip top container 2200 includes a top 2210 and a bottom receiving portion 2220. The bottom receiving portion 2220 is arranged in a fashion such that a first section 2250 of a non-combustible smoking device and a second section 2275 of the non-combustible smoking device are arranged side-by-side. For example, the first section 2250 may be the section 70*c* and the second section 2275 may be the section 72. The top portion 2210 may pivot about a hinge 2225, allowing an adult tobacco consumer to open and close the flip top container 2200.

Figure 21:
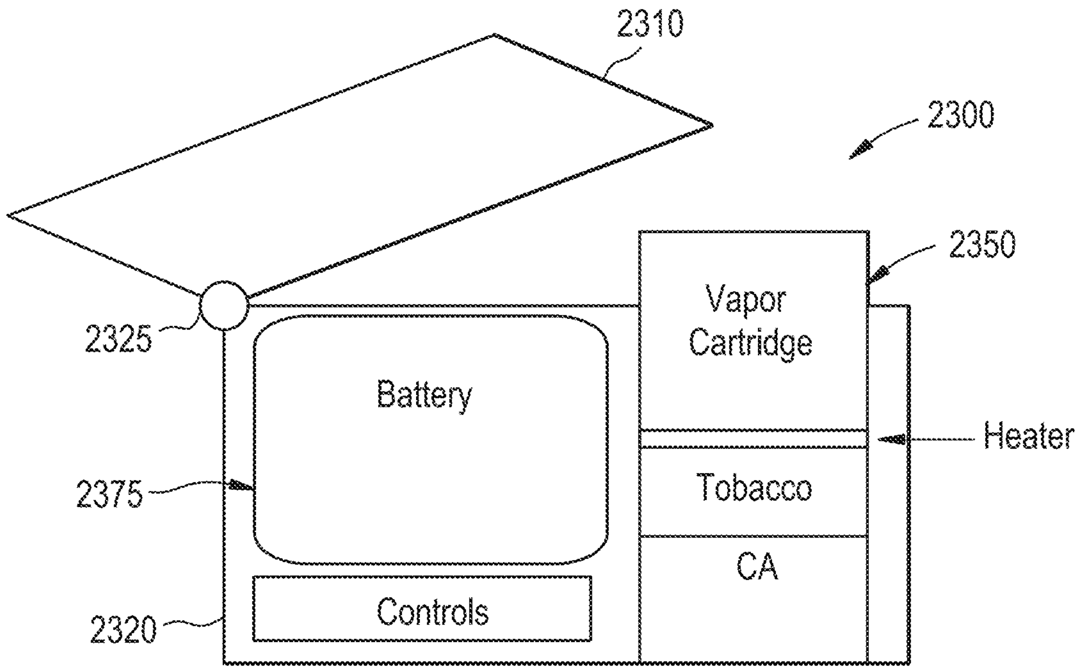
FIG. 21 illustrates a flip top container for a non-combustible smoking device according to another example embodiment.

FIG. 21 illustrates a flip top container for a non-combustible smoking device according to another example embodiment.

As shown, a flip top container 2300 includes a top 2310 and a bottom receiving portion 2320. The bottom receiving portion 2320 is arranged in a fashion such that a first section 2350 of a non-combustible smoking device and a second section 2375 of the non-combustible smoking device are arranged side-by-side. For example, the first section 2350 may be the section 70*c* and the second section 2375 may be the section 72. The top portion 2310 may pivot about a hinge 2325, allowing an adult tobacco consumer to open and close the flip top container 2300.

In other example embodiments, a non-combustible smoking device includes an inductive heater where a coil is outside of the tobacco and a reactive element is on a surface of the tobacco.

In other example embodiments, a temperature controller may be required to prevent over heating of the tobacco and prevent burning of the tobacco.

By utilizing a plurality of heaters, a coil heater and/or a mesh heater, the surface area of tobacco exposed to heat increases thereby generating a larger amount of vapor to an adult tobacco consumer.

Figure 22:
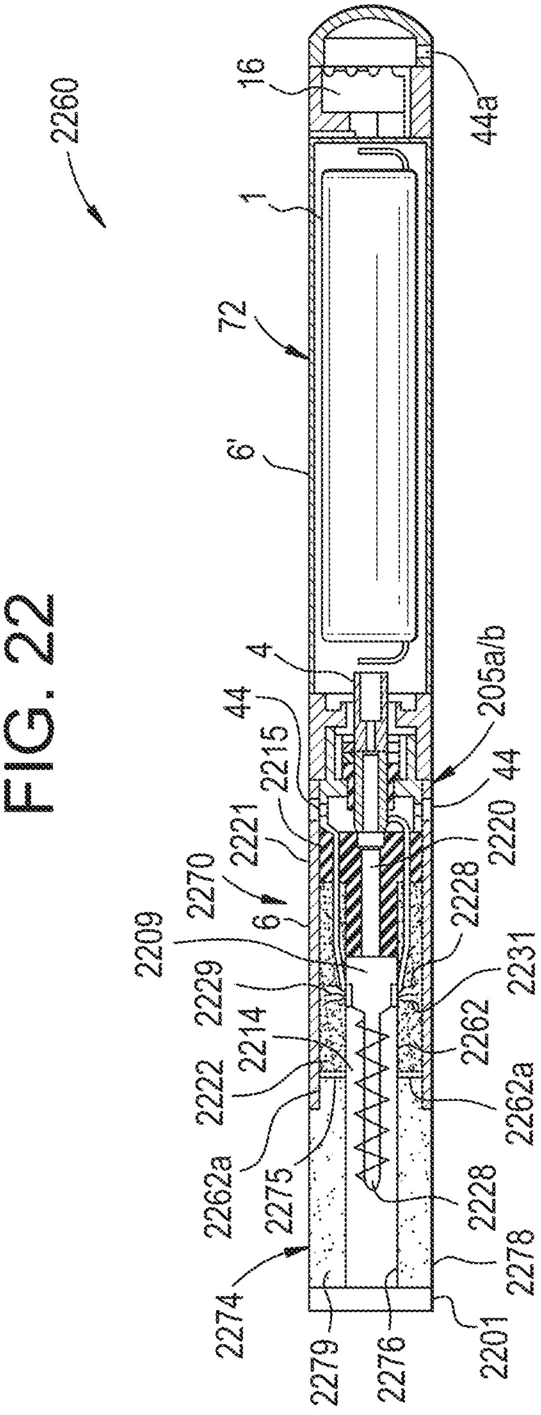
FIG. 22 is a cross-sectional view of the non-combustible smoking device of FIG. 1A.

FIG. 22 is a cross-sectional view of the non-combustible smoking device of FIG. 1A. As shown, the replaceable cartridge 2270 and the reusable fixture 72 are coupled together at the connection 205*a/b*. The reusable fixture 72 has been previously described. Therefore, the reusable fixture 72 will not be further described, for the sake of brevity.

The first section 2270 includes the outer tube 6 (or housing) extending in a longitudinal direction and an inner tube 2262 coaxially positioned within the outer tube or housing 6. The inner tube 2262 defines a portion of an outer air passage (or channel) 2209.

A portion 2275 of the tobacco containing section 2274 fits within a circumference defined by an inner portion of the outer tube 6 to create a frictional connection between the tobacco containing section 2274 and the cartridge 2270. Example embodiments are not limited to the frictional connection and other connections may be used. Thus, the tobacco containing section 2274 is a detachable insert.

The tobacco containing section 2274 includes an inner tube 2276 and an outer wall 7228. The inner tube 2276 of the tobacco containing section 2274 defines another portion of the outer air passage 2209. The outer wall 2278 and the inner tube 2276 define a space (annulus) therebetween.

Figure 26:
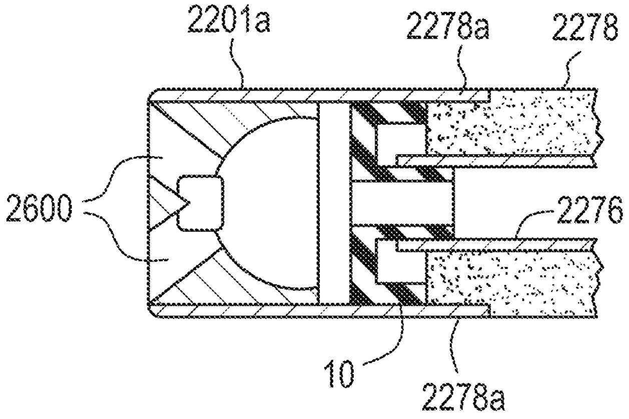
FIG. 26 illustrates an example embodiment of an end of the tobacco containing section of FIG. 22.
Figure 27:
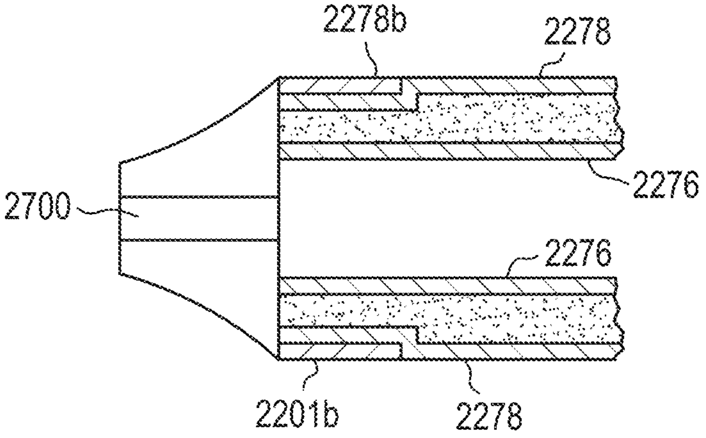
FIG. 27 illustrates an example embodiment of an end of the tobacco containing section of FIG. 22.
Figure 28:
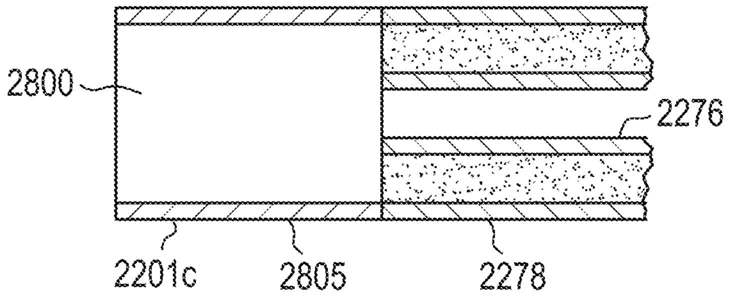
FIG. 28 illustrates an example embodiment of an end of the tobacco containing section of FIG. 22.

An end 2201 of the tobacco containing section 2274 may be a low efficiency cellulose acetate filter, a hollow acetate tube, or a plastic or wood mouthpiece. When the end 2201 is a plastic or wood mouthpiece, the end 2201 is shaped such that a portion of the outer wall 2278 fits within a circumference of the end 2201. FIGS. 26-28 illustrate example embodiments of the end 201.

Within the space between the outer wall 2278 and the inner tube 2276, the tobacco containing section 2274 includes a tobacco element 2279.

In addition, the inner tube 2276 and the outer wall 2278 may contain tipping paper, a tobacco plant material in any form including rolled natural or reconstituted tobacco leaf or sheet or from an annular piece made of tobacco filler or extruded tobacco in the shape of a sleeve. The inner tube 2276 and the outer wall 2278 may be made of the same or different materials.

In an example embodiment, the tobacco containing section 2274 may be a filtered cigarette, a non-filtered cigarette, a cigarillo, a filter tipped cigar filter, a tipped cigar or an untipped cigar/cigarillo, for example. However, example embodiments are not limited thereto. If the tobacco containing section 2274 is a shortened cigarette, the tobacco containing section 2274 may include a filter at the end 2201. In example embodiments where the tobacco insert is an untipped cigar/cigarillo, the tobacco insert does not include a filter.

The filter may be a low efficiency cellulose acetate (CA) filter. CA filter elements, such as triacetin, can be eluted into vapor. Vapor phase nicotine and other volatile elements in vapor can be reduced by a presence of tobacco.

A heater 2214 extends in a longitudinal direction from the inner tube 2262 into the inner tube 2276 in the outer air passage 2209.

The non-combustible smoking device 2260 can also include a central air passage 2220 defined in part by the inner tube 2262 and an upstream seal 2215. Moreover, the non-combustible smoking device 2260 includes a pre-vapor formulation supply reservoir 2222. The pre-vapor formulation supply reservoir 2222 comprises a pre-vapor formulation material and optionally a pre-vapor formulation storage medium 2221 operable to store the pre-vapor formulation material therein.

In an embodiment, the pre-vapor formulation supply reservoir 2222 is contained in an outer annulus between the outer tube 6 and the inner tube 2262. The annulus is sealed at an upstream end by the seal 2215. At a downstream end, the annulus is sealed by a gasket 2262*a*. The gasket 2262*a* may be a ring shaped gasket.

The gasket 2262*a* is placed on the pre-vapor formulation supply reservoir 2222 to seal the pre-vapor formulation in the pre-vapor formulation supply reservoir 2222 and prevent the tobacco element 2279 from mixing with the pre-vapor formulation.

In an embodiment, the heater 2214 is also contained in the inner tube 2262 downstream of and in spaced apart relation to the portion of central air passage 2220 defined by the seal 2215. The heater 2214 can be in the form of a wire coil, a planar body, a ceramic body, a single wire, a cage of resistive wire or any other suitable form.

A wick 2228 is in communication with the pre-vapor formulation material in the pre-vapor formulation supply reservoir 2222 and in communication with the heater 2214 such that the wick 2228 disposes pre-vapor formulation material in proximate relation to the heater 2214. The wick 2228 may be constructed of a fibrous and flexible material. The wick 2228 may include at least one filament having a capacity to draw a pre-vapor formulation. For example, the wick 2228 may comprise a bundle of filaments which may include glass (or ceramic) filaments. In another embodiment, a bundle comprising a group of windings of glass filaments, for example, three of such windings, all which arrangements are capable of drawing pre-vapor formulation via capillary action via interstitial spacing between the filaments.

The power supply 1 may be operably connected to the heater 2214 (for example, as described with respect to FIG. 1B) to apply voltage across the heater 2214. The non-combustible smoking device 2260 also includes at least one air inlet 44 operable to deliver air to the central air passage 2220 and/or other portions of the inner tube 2262.

Moreover, the heater 2214 extends in the longitudinal direction and heats the pre-vapor formulation material to a temperature sufficient to vaporize the pre-vapor formulation material and form a vapor when a negative pressure is applied to the end 2201. In other embodiments, the heater 2214 may be arranged in another manner such as in a direction transverse to the longitudinal direction.

The vapor then flows through the inner tube 2276 and into the tobacco element 2279 upon a negative pressure being applied at the end 2201 of the tobacco containing section 2274. The heater 2214 may be a set distance from the tobacco element 2279 such that the heater 2214 heats the tobacco element 2279 when a negative pressure is applied. For example, the heater 2214 may be ten (10) millimeters or less from the inner tube 2276.

The heater 2214 may extend into the tobacco containing portion 2274 between 5-20 millimeters. The heater 2214 may be arranged to produce a temperature of 50 degrees Celsius at the end 2201. Moreover, the heater 2214 may heat the tobacco element 2279 to a temperature between 50 and 200 degrees Celsius and heat the pre-vapor formulation at 300-350 degrees Celsius.

The heater 2214 warms the tobacco element 2279, but does not burn the tobacco. Thus, the warming of the tobacco element 2279 may be referred to as non-combustible. Because the section 2270 includes the heater 2214 and the tobacco containing section 2274 includes the tobacco element 2279, the sections 2270 and 2274 may jointly be referred to as a non-combustible smoking element.

In one embodiment, the first section (the cartridge) 2270 and the tobacco containing section 2274 are disposable. The downstream section 2270 can be replaced when the pre-vapor formulation supply reservoir 2222 is used up.

In an embodiment, the at least one air inlet 44 includes one or two air inlets. Alternatively, there may be three, four, five or more air inlets. If there is more than one air inlet 44, the air inlets 44 are located at different locations along the non-combustible smoking device 2260. At least one additional air inlet 44 can be located adjacent and upstream of the seal 2215 or at any other desirable location. Altering the size and number of air inlets 44 can also aid in establishing the resistance to draw of the non-combustible smoking device 2260.

In an embodiment, the heater 2214 is arranged to communicate with the wick 2228 and to heat the pre-vapor formulation material contained in the wick 2228 to a temperature sufficient to vaporize the pre-vapor formulation material and form a vapor.

The heater 2214 may be a wire coil surrounding the wick 2228. Examples of suitable electrically resistive materials include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater 2214 comprises at least one material selected from the group consisting of stainless steel, copper, copper alloys, nickel-chromium alloys, superalloys and combinations thereof. In an embodiment, the heater 2214 is formed of nickel-chromium alloys or iron-chromium alloys. In one embodiment, the heater 2214 can be a ceramic heater having an electrically resistive layer on an outside surface thereof.

In another embodiment, the heater 2214 may be constructed of an iron-aluminide (e.g., FeAl or $Fe_3Al$), such as those described in commonly owned U.S. Pat. No. 5,595,706 to Sikka et al. filed Dec. 29, 1994, or nickel aluminides (e.g., $Ni_3Al$). FeAl exhibits a resistivity of approximately 180 micro-ohms, whereas stainless steel exhibits approximately 50 to 91 micro-ohms. The higher resistivity lowers current draw or load on the power supply (battery) 1.

In one embodiment, the heater 2214 comprises a wire coil which at least partially surrounds the wick 2228. In that embodiment, the wire may be a metal wire and/or the heater coil that extends partially along the length of the wick 2228. The heater coil may extend fully or partially around the circumference of the wick 2228. In another embodiment, the heater coil is not in contact with the wick 2228.

The heater 2214 heats the pre-vapor formulation in the wick 2228 by thermal conduction. Alternatively, heat from the heater 2214 may be conducted to the pre-vapor formulation by means of a heat conductive element or the heater 2214 may transfer heat to the incoming ambient air that is drawn through the non-combustible smoking device 2260 during use, which in turn heats the pre-vapor formulation by convection.

In one embodiment, the wick 2228 comprises a ceramic material or ceramic fibers and may include any material described with respect to the wick 28. As noted above, the wick 2228 is at least partially surrounded by the heater 2214. Moreover, in an embodiment, the wick 2228 extends through opposed openings in the inner tube 2262 such that end portions 2229, 2231 of the wick 2228 are in contact with the pre-vapor formulation supply reservoir 2222.

The wick 2228 may comprise a plurality or bundle of filaments. In one embodiment, the filaments may be generally aligned in a direction transverse to the longitudinal direction of the non-combustible smoking device 2260 at the inner tube 2262 and generally in the longitudinal direction in the channel 2209, but example embodiments are not limited to this orientation. In one embodiment, the structure of the wick 2228 is formed of ceramic filaments capable of drawing the pre-vapor formulation via capillary action via interstitial spacing between the filaments to the heater 2214. The wick 2228 can include filaments having a cross-section which is generally cross-shaped, clover-shaped, Y-shaped or in any other suitable shape.

Instead of using a wick, the heater 2214 can be a porous material of sufficient capillarity and which incorporates a resistance heater formed of a material having a high electrical resistance capable of generating heat quickly.

In one embodiment, the wick 2228 and the pre-vapor formulation storage medium 2221 of the pre-vapor formulation supply reservoir 2222 are constructed from an alumina ceramic. In another embodiment, the wick 2228 includes glass fibers and the pre-vapor formulation storage medium 2221 includes a cellulosic material or polyethylene terephthalate.

In an embodiment, the power supply 1 may include a battery arranged in the non-combustible smoking device

2260 such that the anode is downstream of the cathode. The anode connector 4 contacts the downstream end of the battery. The heater 2214 is connected to the battery by two spaced apart electrical leads.

Figure 25:
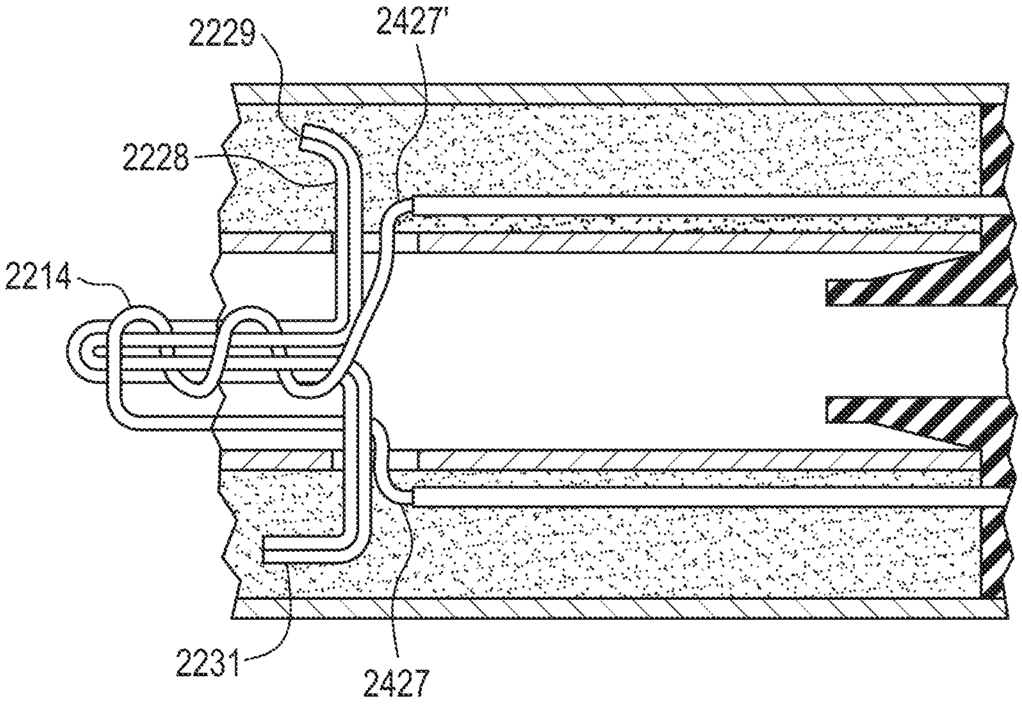
FIG. 25 is an enlarged view of a heater of the non-combustible smoking device of FIG. 22.

The connection between the uncoiled, end portions 2427, 2427' (see FIG. 25) of the heater 2214 and the electrical leads are highly conductive and temperature resistant while the heater 2214 is highly resistive so that heat generation occurs primarily along the heater 2214 and not at the contacts. The end portion 2427 is connected to the anode connector 4 and the end portion 2427' is connected to the cathode through the outer tube 6.

The non-combustible smoking device 2260 also includes control circuitry including the sensor 16. The sensor 16 is operable to sense an air pressure drop and initiate application of voltage from the power supply 1 to the heater 2214.

When activated, the heater 2214 heats a portion of the wick 2228 surrounded by the heater for less than about 10 seconds, more preferably less than about 7 seconds. Thus, the power cycle can range in period from about 2 seconds to about 10 seconds (e.g., about 3 seconds to about 9 seconds, about 4 seconds to about 8 seconds or about 5 seconds to about 7 seconds).

In an embodiment, the pre-vapor formulation supply reservoir 2222 includes the pre-vapor formulation storage medium 2221 containing pre-vapor formulation material. In FIG. 22, the pre-vapor formulation supply reservoir 2222 is contained in an outer annulus between inner tube 2262 and outer tube 6 and between gasket 2262 and the seal 2215. Thus, the pre-vapor formulation supply reservoir 2222 at least partially surrounds the central air passage 2220 and the heater 2214 and the wick 2228 extend between portions of the pre-vapor formulation supply reservoir 2222.

The pre-vapor formulation storage medium 2221 may be a fibrous material comprising cotton, polyethylene, polyester, rayon and combinations thereof. The fibers may have a diameter ranging in size from about 6 microns to about 15 microns (e.g., about 8 microns to about 12 microns or about 9 microns to about 11 microns). The pre-vapor formulation storage medium 2221 may be a sintered, porous or foamed material. Also, the fibers may be sized to be irrespirable and can have a cross-section which has a y shape, cross shape, clover shape or any other suitable shape.

In another example embodiment, the pre-vapor formulation storage medium 2221 may be a tobacco filler or tobacco slurry.

Also, the pre-vapor formulation material has a boiling point suitable for use in the non-combustible smoking device 2260. If the boiling point is too high, the heater 2214 will not be able to vaporize the pre-vapor formulation in the wick 2228. However, if the boiling point is too low, the pre-vapor formulation may vaporize without the heater 2214 being activated.

In operation, with non-combustible smoking device 2260 in an assembled configuration, a negative pressure may be applied on the end 2201. This may cause an internal pressure drop inside non-combustible smoking device 2260 that may cause an inlet air flow to enter device 2260 via air inlets 44/44*a*. The internal pressure drop may also cause an internal pressure drop within section 72 as air is drawn through air inlet 44*a* (via an air flow path traveling through section 72). The internal pressure drop formed in section 72 may be sensed by sensor 16. The sensor 16 may then operate to close an electrical circuit that includes the power supply 1. In turn, electrical leads carry an electrical current to heater 2214 in order to energize the heater 2214. The energized heater 2214 in turn heats and vaporizes the pre-vapor formulation material that is drawn toward the heater 2214 via the wick 2228.

The pre-vapor formulation material is transferred from the pre-vapor formulation supply reservoir 2222 and/or pre-vapor formulation storage medium 2221 in proximity of the heater 2214 by capillary action in the wick 2228. In one embodiment, the wick 2228 has a first end portion 2229 and a second opposite end portion 2231. The first end portion 2229 and the second end portion 2231 extend into opposite sides of the pre-vapor formulation storage medium 2221 for contact with pre-vapor formulation material contained therein. The heater 2214 at least partially surrounds a central portion of the wick 2228 such that when the heater 2214 is activated, the pre-vapor formulation in the central portion of the wick 2228 is vaporized by the heater 2214 to vaporize the pre-vapor formulation material and form vapor. Due to a negative pressure being applied, the vapor flows from the heater 2214, through the tobacco element 2279 and out of the end 2201.

The vapor may elute tobacco elements into the flow stream. Some thermal reactions may also be present between the vapor and the tobacco element.

One advantage of an embodiment is that the pre-vapor formulation material in the pre-vapor formulation supply reservoir 2222 is protected from oxygen (because oxygen cannot generally enter the pre-vapor formulation storage portion via the wick) so that the risk of degradation of the pre-vapor formulation material is significantly reduced. Moreover, in some embodiments in which the outer tube 6 is not clear, the pre-vapor formulation supply reservoir 2222 is protected from light so that the risk of degradation of the pre-vapor formulation material is significantly reduced. Thus, a high level of shelf-life and cleanliness can be maintained.

The arrangement of the section 2270 is not limited to the embodiment shown in FIG. 22 and may include other modifications such as those described in U.S. patent application Ser. No. 14/572,360, the entire contents of which are hereby incorporated by reference.

The inner tube 2262 may be formed of any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK), ceramic, and polyethylene. In one embodiment, the material is light and non-brittle.

While FIG. 22 illustrates the tobacco containing section 2274 having a singular annular sleeve, example embodiments are not limited thereto.

Figure 23A:
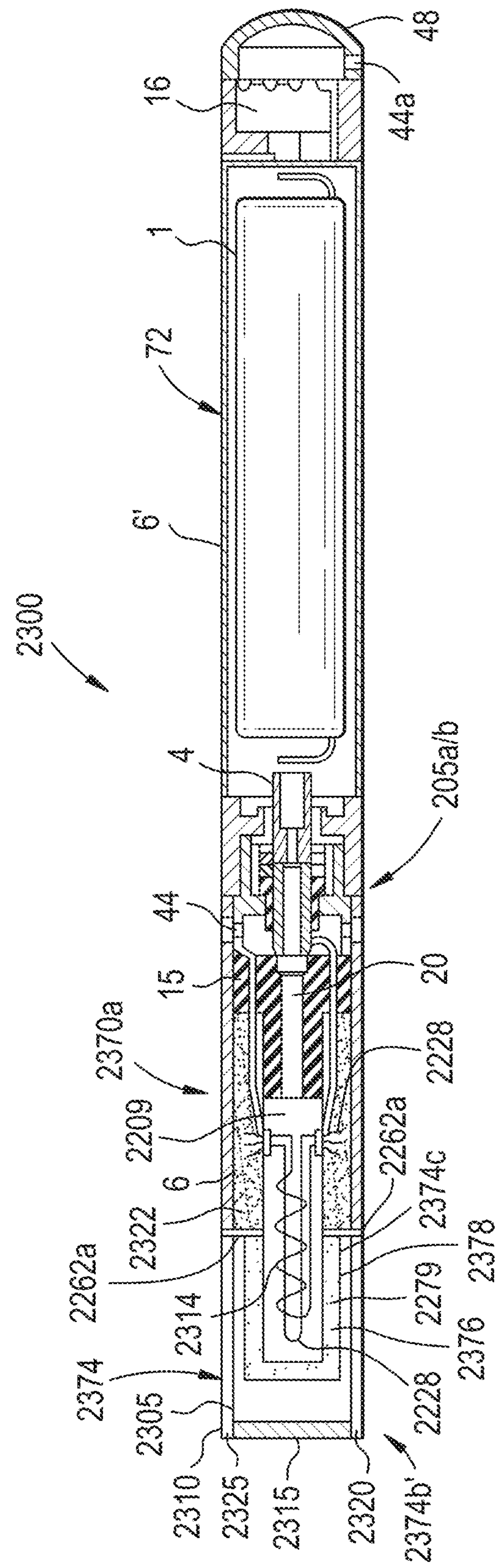
FIG. 23A illustrates an example embodiment of a non-combustible smoking device including a tobacco containing section having annular sleeves.

FIG. 23A illustrates an example embodiment of a non-combustible smoking device including a tobacco containing section 2374 having annular sleeves 2374*a* and 2374*b*. A non-combustible smoking device 2300 is similar to the non-combustible smoking device 2260. Thus, for the sake of brevity, only the differences will be described.

In FIG. 23A, a tobacco containing section 2374 includes annular sleeves 2374*a* and 2374*b*.

The annular sleeve 2374*a* includes an inner tube 2376 and an outer wall 2378. The inner tube 2376 defines another portion of the outer air passage 2209. The outer wall 2378 and the inner tube 2376 define a space (annulus) therebetween. The outer wall 2378 and the inner tube 2376 may be made of the same materials of the outer wall 2278 and inner tube 2276, respectively.

Within the space between the outer wall 2378 and the inner tube 2376 is the tobacco element 2279.

Figure 24:
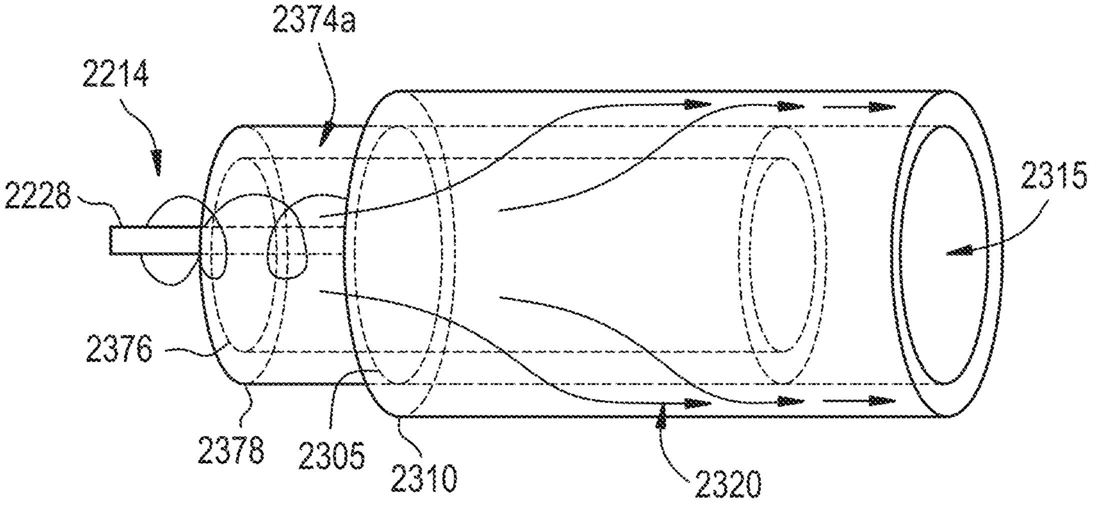
FIG. 24 illustrates an air flow pattern of the non-combustible smoking device shown in FIG. 23A.

The annular sleeve 2374*b* includes an inner tube 2305 and an outer wall 2310. As shown in FIG. 23A, the annular sleeve 2374*b* encompasses the annular sleeve 2374*a*. The inner tube 2305 is permeable and the outer wall 2310 is impermeable. An end 2315 of the annular sleeve 2374*b* is closed to air flow. The end 2315 may be made of any material that acts as a plug to block airflow such as a plastic (e.g., polyethalane) or a metal. Thus, air flows from the air passage 2209, through the annular sleeve 2374*a* through the inner tube 2305 and into air channels 2320, 2325 upon applying a negative pressure to the tobacco containing section 2374, as shown in FIG. 24.

The inner tube 2305 is a permeable material such as a membrane, mesh, perforated plastic or paper. The inner tube 305 is made of a material that maintains the structural integrity of the annular sleeve 2374*b*. The outer wall 2310 is an impermeable material such as a plastic.

Figure 23B:
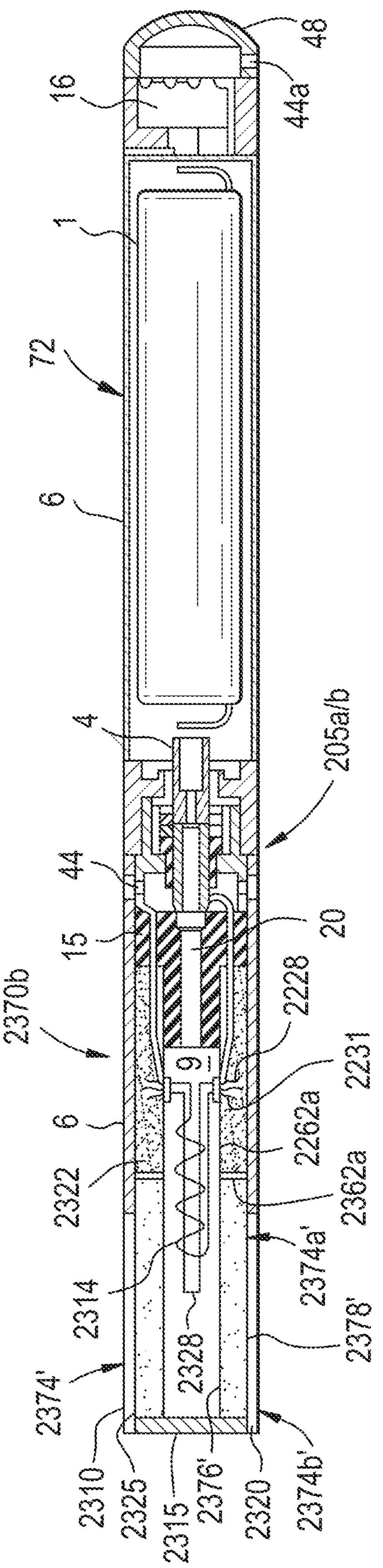
FIG. 23B illustrates an example embodiment of a non-combustible smoking device including a tobacco containing section having annular sleeves.

FIG. 23B illustrates another example embodiment of a non-combustible smoking device including a tobacco containing section 2374' having annular sleeves 2374*a*' and 2374*b'*.

The tobacco containing section 2374' is similar to the tobacco containing section 2374. Thus, only the differences will be described.

In FIG. 23B, an annular sleeve 2374*b*' does not include the inner tube 2305. Instead, an outer wall 2378' of the annular sleeve 2374*a*' is also part of the annular sleeve 2374*b*'. With an inner tube 2376', the outer wall 2378' and the inner tube 2376' define a space (annulus) therebetween. Within the space between the outer wall 2378' and the inner tube 2376' is the tobacco element 2279.

As shown in FIG. 23B, the outer wall 2378' and the inner tube 2376' extend to the end 2315. The outer wall 2378' and the inner tube 2376' may be made of the same materials as the outer wall 2378 and the inner tube 2376, respectively.

Figure 23C:
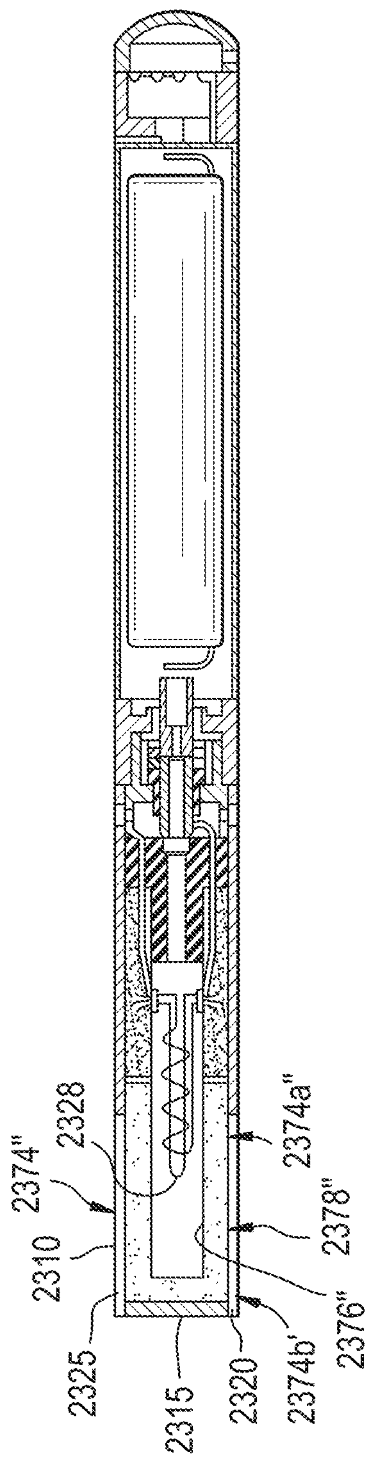
FIG. 23C illustrates an example embodiment of a non-combustible smoking device including a tobacco containing section having annular sleeves.

FIG. 23C illustrates another example embodiment of a non-combustible smoking device including a tobacco containing section 2374".

The tobacco containing section 2374" is similar to the tobacco containing section 2374'. Thus, only the differences will be described.

In FIG. 23B, an inner tube 2376" of an annular sleeve 2374*a*" is closed off before the end 2315. A space is then defined between the end 2315 and the inner tube 2376". Tobacco element 2279 is also between the end 2315 and the inner tube 2376".

The non-combustible smoking devices according to example embodiments are effective in heating the tobacco and distilling and eluting tobacco specific flavors because of their flow pattern and proximity of the tobacco element to the heater 2214 (vapor forming area). The perpendicular flow, shown in FIG. 24, of the vapor from the heater 2214 to the tobacco element and the closeness of the tobacco to the heater 2214 allow for effective heating of the tobacco and subsequent distillation and elution of volatile tobacco flavors.

While example embodiments illustrate that vapor can exit the non-combustible smoking device in an annular fashion, it should be understood that the vapor may exit in a concentric fashion.

FIG. 26 illustrates an example embodiment of an end of the tobacco containing section 2274 being a plastic mouthpiece. As shown in FIG. 26, an end 2201*a* has at least two off-axis, diverging outlets 2600. The end 2201*a* is in fluid communication with the central air passage 2209, which extends through the gasket 10. The gasket 10 is at a downstream end of the tobacco containing section 2274 so as to prevent leakage of the tobacco material into the end 2201*a*.

A portion of the outer wall 2278*a* fits within a circumference of the end 2201*a*.

Due to a negative pressure being applied to the tobacco containing section 2274, the vapor flows from the heater 2214, through the tobacco containing section 2274 and out of the end 2201*a*.

FIG. 27 illustrates an example embodiment of an end of the tobacco containing section 2274.

An end 2201*b* fits over a portion of the outer wall 2278*b*. A negative pressure may be applied on the end 2201*b*. Due to the negative pressure, the vapor flows from the heater 2214, out of the tobacco containing section 2274 through an air passage 2700.

FIG. 28 illustrates an example embodiment of an end of the tobacco containing section 2274.

An end 2201*c* includes a filter 2800. In example embodiments where the tobacco insert is an untipped cigar/cigarillo, the tobacco insert does not include a filter.

Tipping paper 2805 may overlap the filter 2800. Tipping paper may also be used as the wall 2278. Thus, the tipping paper 2805 provides stiffness to the tobacco containing section 2274, permitting easier insertion to the cartridge 2270. An aluminum foil may also be used to contain the tobacco element, with or without additional tipping paper.

In the example shown in FIG. 28, the filter 2800 may be a cellulose acetate (CA) filter. CA filter elements, such as triacetin, can be eluted into vapor. Vapor phase nicotine and other volatile elements in vapor can be reduced by a presence of tobacco.

When a negative pressure is applied to the tobacco containing section 2274, the vapor flows from the heater 2214, through the tobacco containing section 2274 and out of the filter 2800.

Example embodiments provide a non-combustible smoking device having a heater that heats a pre-vapor formulation and may provide heat to a tobacco element. More specifically, the non-combustible smoke device according to example embodiments exposes a vapor to a tobacco element and/or exposes a pre-vapor formulation to a tobacco element. When the tobacco element is in the pre-vapor formulation the physical integrity of the tobacco element is preserved.

In other example embodiments, a non-combustible smoke device can be a pod device or tank device that exposes a vapor to a tobacco element and/or exposes a pre-vapor formulation to a tobacco element.

While a single heater is described with reference to FIGS. 22-28, example embodiments may include a multiple heater non-combustible smoking device. A first heater may be the heater 2214 to vaporize the pre-vapor formulation and a second heater may be used to heat the tobacco element. The second heater may penetrate the tobacco element.

In other example embodiments, a non-combustible smoking device includes more than two heaters.

Figure 29A:
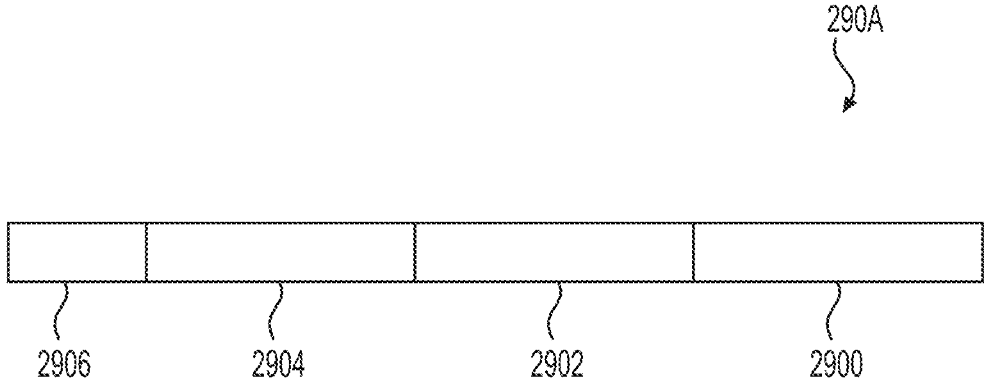
FIGS. 29A and 29B illustrate example configurations of non-combustible smoking elements (or devices) according to example embodiments.
Figure 29B:
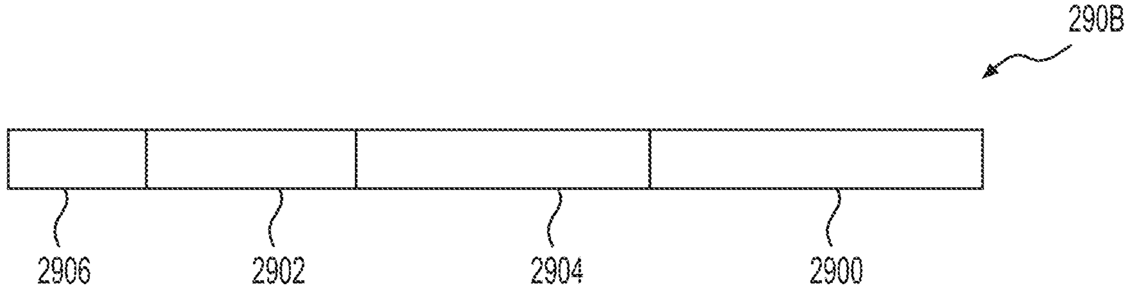

FIGS. 29A and 29B illustrate example configurations of a non-combustible smoking device according to example embodiments. In more detail, FIG. 29A illustrates a non-combustible smoking device 290A including a replaceable cartridge (or first section) 2902, a power section (also referred to as a reusable fixture or second section) 2900, a tobacco containing section (or third section) 2904, and a removable mouthpiece 2906. In this example, the mouthpiece 2906 is removeably attached to the tobacco containing section 2904, and the tobacco containing section 2904 is removeably attached to the replaceable cartridge 2902. The replaceable cartridge 2902 is removeably attached to the power section 2900. Each of the components of the non-combustible smoking device 290A is coupled together by, for example, a threaded connection, a snug-fit, detent, clamp and/or clasp.

The configuration of the non-combustible smoking device 290B shown in FIG. 29B is similar to the non-combustible smoking device 290A, except that the position of the replaceable cartridge 2902 and the tobacco containing section 2904 are changed. In the example shown in FIG. 29B, the mouthpiece 2906 is removeably attached to the replaceable cartridge 2902, which is removeably attached to the tobacco containing section 2904. The tobacco containing section 2904 is removeably attached to the power section 2900. As with the configuration shown in FIG. 29A, each of the components of the non-combustible smoking device 290B shown in FIG. 29B are coupled together by, for example, a threaded connection, a snug-fit, detent, clamp and/or clasp.

Each of the components of the non-combustible smoking devices 290A and 290B will be discussed in more detail below. For example purposes example embodiments will be described, in some instances, with regard to the non-combustible smoking device shown in FIG. 29A. It should be understood, however, that similar or the same descriptions apply to the configuration shown in FIG. 29B.

As discussed herein, the components of the non-combustible smoking devices 290A and 290B shown in FIGS. 29A and 29B, or the devices themselves, may be collectively referred to as a non-combustible smoking system, or alternatively, a non-combustible smoking kit. In this regard, the components of the non-combustible smoking devices 290A and 290B may be considered as part of a non-combustible smoking system, or alternatively, a non-combustible smoking kit.

Figure 30:
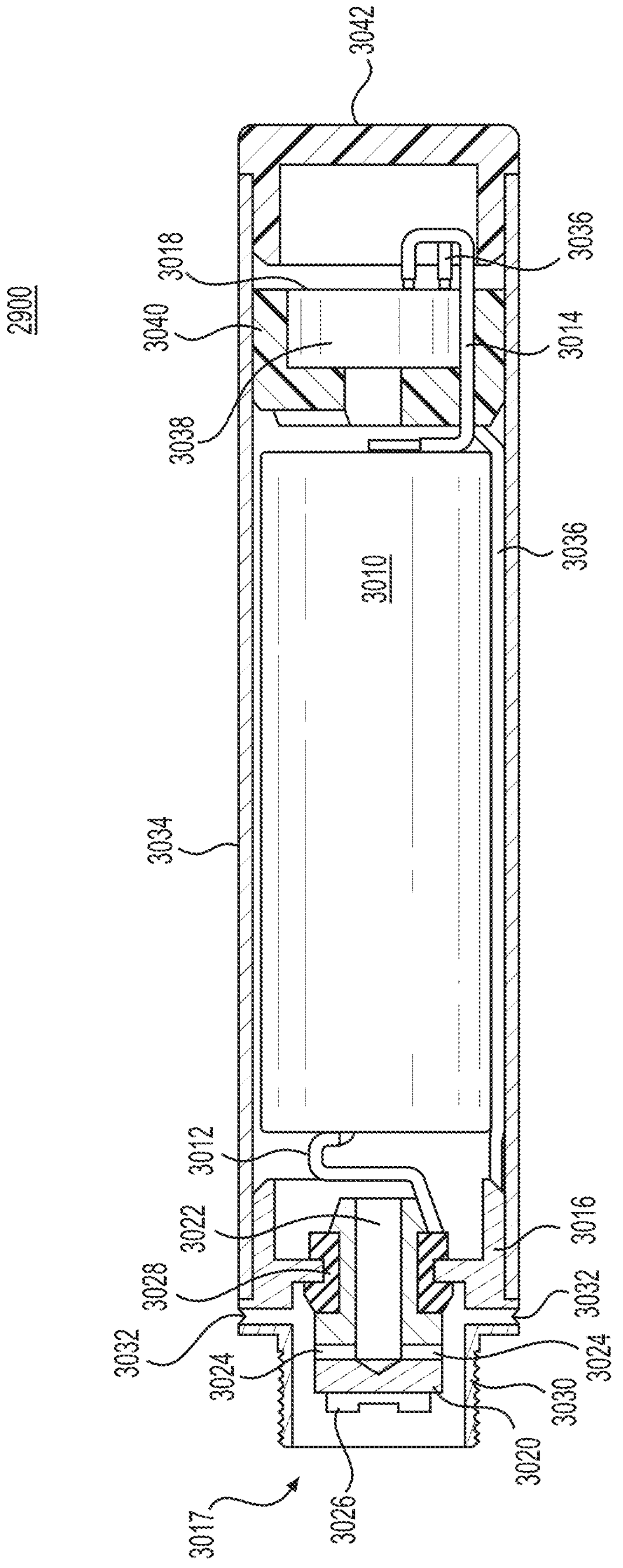
FIG. 30 is a cross-sectional view of an example embodiment of the power section shown in FIGS. 29A and 29B.

FIG. 30 is a cross-sectional view of an example embodiment of the power section 2900 shown in FIG. 29A. The power section 2900 may be a reusable section of the non-combustible smoking device, wherein the reusable section may be capable of being recharged by an external charging device. Alternatively, the power section 2900 may be disposable. In this example, the power section 2900 may be used until the energy from a power supply 3010 (described below) is depleted.

Referring to FIG. 30, the power supply 3010 within the power section 2900 may be a battery. For instance, the power supply 3010 may be a Lithium-ion battery, or a variant of a Lithium-ion battery, such as a Lithium-ion polymer battery. The battery may either be disposable or rechargeable. The power supply 3010 may include an anode connection 3012 and a cathode connection 3014. Each of the anode connection 3012 and the cathode connection 3014 may be in the form of one or more electrical leads or wires.

The power section 2900 includes a connector 3017 at a first end. The connector 3017 may be a male connector capable of connecting to a female connector on another section of the non-combustible smoking device, such as the replaceable cartridge 2902 or the tobacco containing section 2904. Alternatively, the connector 3017 may be a female connector capable of connecting to a male connector of another element. The connector 3017 includes threads 3030 configured to mate with threads on another section of the non-combustible smoking device. Although illustrated as a threaded connection, according to at least some other example embodiments, the connector 3017 may be, for example, snug-fit connectors, detent connectors, clamp connectors, clasp connectors, etc.

Still referring to FIG. 30, the cathode connection 3014 terminates at the control circuitry 3018 for the power section 2900. The control circuitry 3018 will be discussed in more detail later.

The anode connection 3012 is electrically connected to a post 3020. The post 3020 may define a central passage 3022 that allows air to flow and/or communicate through the end of the power section 2900. The post 3020 may also include one or more side vents 3024 in fluid communication with the central passage 3022.

The post 3020 further includes an upper connector 3026 having an indentation allowing air to flow and/or communicate through the end of the power section 2900 into another section such as the replaceable cartridge 2902 that may be connected to the power section 2900. The upper connector 3026 will be described in more detail later with regard to FIGS. 36 and 37.

Still referring to FIG. 30, a gasket insulator 3028 holds the post 3020 within the connector 3017 of the power section 2900. The gasket insulator 3028 electrically insulates the post 3020 from a cathode portion 3016.

The connector 3017 further includes one or more air vents 3032 configured to communicate ambient air through the vents 3032 into the connector 3017. The ambient air may combine and/or mix with air flowing from the central passage 3022 and flow into another section as discussed herein. In at least one example embodiment, the air vents 3032 may be bored into the connector 3017 just below the threads 3030 at an angle perpendicular or substantially perpendicular to the longitudinal centerline of the connector 3017.

The sidewalls of the vents 3032 may be beveled in order to cause the sidewalls to slope inwards (in essence, in order to "countersink" the sidewalls at the rim of the vent holes 3032). By beveling the sidewalls at the rim of the air vents 3032 (as opposed to using relatively sharp edges at the rim of the air vent 3032), the air vents 3032 may be less likely to become clogged or partially blocked (due to a reduction in the effective cross-sectional area of the vents 3032 near the rim of the vents 3032). In an embodiment, the sidewalls of the rim of the vents 3032 may be beveled (inclined) to be about 38 degrees relative to a longitudinal length (or, the longitudinal centerline) of the connector 3017 and the housing 3034 of the power section 2900.

Referring still to FIG. 30, the control circuitry 3018 may be a part of an electrical circuit that is powered by the power supply 3010 to provide an electrical current to another element of the non-combustible smoking device, such as the replaceable cartridge 2902 and/or the tobacco containing section 2904. To that end, the control circuitry 3018 is electrically connected to the cathode portion 3016 of the connector 3017. In at least this example, the control circuitry wiring 3036 acts as a cathode electrode for the electrical circuit.

A sensor (e.g., a puff sensor) 3038 may be capable of sensing an internal pressure drop within the power section 2900, where the sensor 3038 and control circuitry 3018 may work together to open and close the control circuit that includes the power supply 3010 and one or more heaters (not shown) of the elements connected either directly or indirectly to the power section 2900. The sensor 3038 may be cradled within a sensor holder 3040 at an end of the power section 2900. A heat activation light 3042 may also be at an end of the power section 2900, where the light 3042 may be an light-emitting diode (LED) light, for instance, configured to glow when the electrical circuit is closed and the power supply 3010 is sending electrical current to the one or more heaters of the non-combustible smoking device. Because sensors such as the sensor 3038 are generally well-known, a detailed discussion is omitted.

Figure 31:
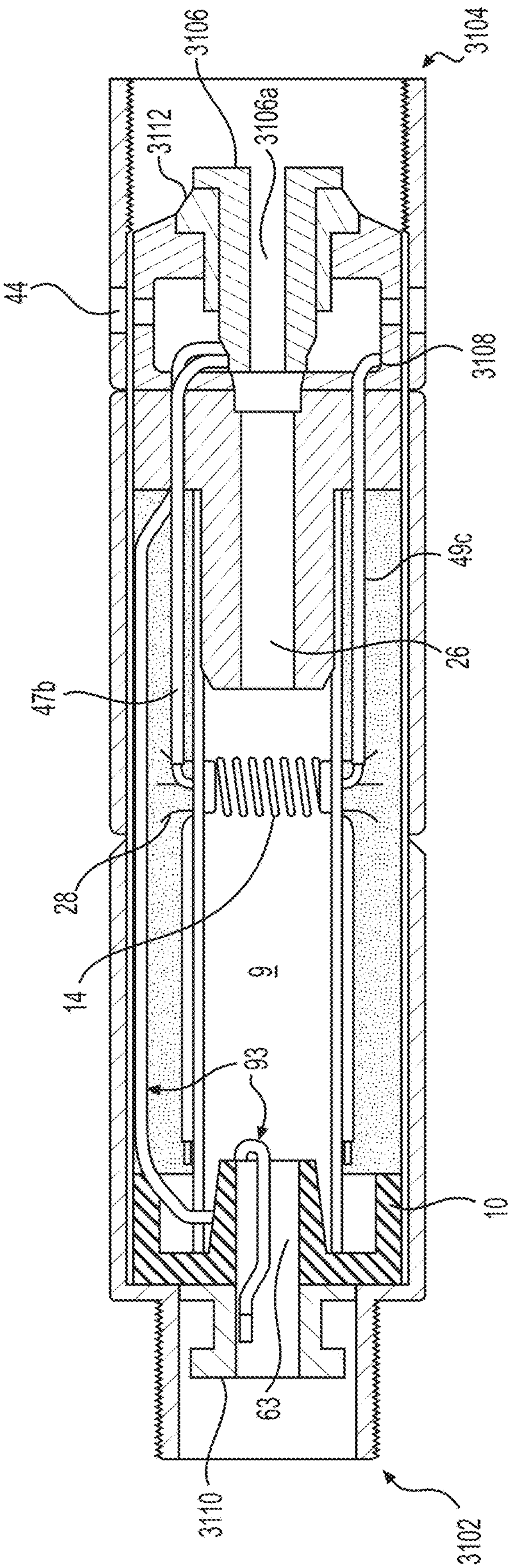
FIG. 31 illustrates a cross-sectional view of an example embodiment of the replaceable cartridge shown in FIGS. 29A and 29B.

FIG. 31 illustrates a cross-sectional view of an example embodiment of the replaceable cartridge 2902 shown in FIGS. 29A and 29B.

The replaceable cartridge 2902 is similar to the first section 70 shown in FIG. 1B, except that the replaceable cartridge 2902 does not include the tobacco element 23, and further includes an additional electrical lead 93 connected between the anode portion 3110 at the first end and an anode connector 3106 at the second end of the replaceable cartridge 2902. Also unlike the first section 70 in FIG. 1B, the replaceable cartridge 2902 includes a male connector 3102 at the first end and a female connector 3104 at the second end. The replaceable cartridge 2902 may also be shorter in length than the first section 70 shown in FIG. 1B.

Because the replaceable cartridge 2902 is similar to the first section 70 shown in FIG. 1B, only a relatively brief discussion will be provided.

Referring to FIG. 31, as mentioned above, the replaceable cartridge 2902 includes a male connector 3102 at a first end and a female connector 3104 at a second end of the replaceable cartridge. In the example embodiment shown in FIG. 31, the male and female connectors 3102 and 3104 are threaded connections. However, example embodiments are not limited to this example embodiment. Rather, the connectors may be, for example, snug-fit connectors, detent connectors, clamp connectors, clasp connectors, etc. Moreover, the positioning of the male and female connectors 3102 and 3104 may be reversed as desired such that the male connector 3102 is positioned at the second end and the female connector 3104 is positioned at the first end of the replaceable cartridge 2902.

Within the female connector 3104, the anode connector 3106 is in the form of a post 3106. The post 3106 defines a central air passage 3106*a*. The central air passage 3106*a* is in fluid communication with the central air passage 20 and the channel 9, such that air flows through the central air passage 3106*a* into the central passage 20 and then the channel 9 when negative pressure is applied to the mouthpiece 2906. A gasket insulator 3112 holds the post 3106 within the female connector 3104. The gasket insulator 3112 also electrically insulates the post 3106 from a cathode connector portion of the female connector 3104.

As mentioned similarly above, the post 3106 serves as an anode portion of the female connector 3104. An outer portion 3108 of the female connector 3104 serves as the cathode connector portion of the female connector 3104, and the cathode portion 3108 is electrically insulated from the post 3106 by the gasket insulator 3112.

In the example embodiment shown in FIG. 31, the heater 14 is electrically connected to the post 3106 via a first electrical lead 47*b*, and to the cathode portion 3108 via a second electrical lead 49*c*. Additionally, as mentioned above, the post 3106 is electrically connected to the anode portion 3110 of the male connector 3102 via electrical lead 93.

A central passage 63 extends through a gasket 10 at the first end of the replaceable cartridge 2902. The central passage 63 is in fluid communication with the channel 9, and allows for air to flow and/or communicate through the male connector 3102 to another section of the non-combustible smoking device (e.g., the mouthpiece 2906 or the tobacco containing section 2904).

Figure 32:
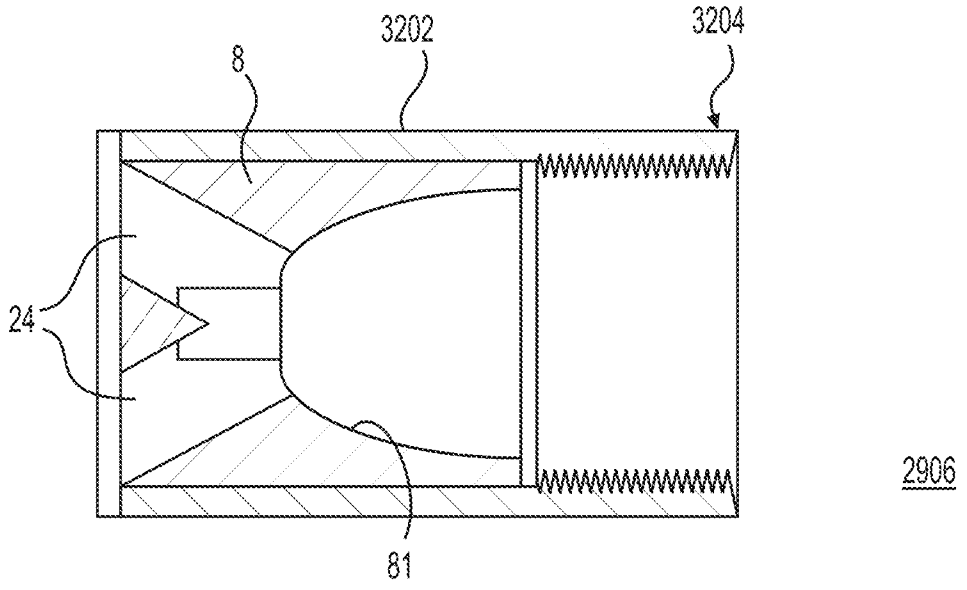
FIG. 32 illustrates an example embodiment of the removable mouthpiece shown in FIGS. 29A and 29B.

FIG. 32 illustrates an example embodiment of the removable mouthpiece 2906 shown in FIGS. 29A and 29B.

Referring to FIG. 32, the removable mouthpiece includes a mouth-end insert 8, which is essentially the same as that discussed above with regard to, for example, FIGS. 2A and 2B. In the example embodiment shown in FIG. 32, the mouth-end insert 8 is integrally affixed within an outer tube 3202. The outer tube 3202 may have the same or substantially the same shape and diameter as the replaceable cartridge 2902 and the tobacco containing section 2904. Because the mouth-end insert 8 is the same or substantially the same as the mouth-end insert 8 discussed above with regard to, for example, FIGS. 2A and 2B, further detailed discussion is omitted.

The removable mouthpiece 2906 further includes a threaded female connector 3204 at an end opposite the diverging outlets 24. The threaded female connector 3204 is reciprocal to the threaded male connectors of the replaceable cartridge 2902 and the tobacco containing section 2904 such that the removable mouthpiece is configured to be removeably attached to either the replaceable cartridge 2902 or the tobacco containing section 2904.

In the example embodiment shown in FIG. 32, the female connector 3204 is a threaded connection. However, example embodiments are not limited to this example embodiment. Rather, the connector may be, for example, a snug-fit connector, a detent connector, a clamp connector, a clasp connector, etc. Moreover, the female connector 3204 may be formed as a male connector when the positioning of the corresponding connectors at the replaceable cartridge and/or the tobacco containing section is reversed.

The female connector 3204 may be integrally formed with the outer tube 3202, such that the outer tube 3202 and the female connector 3204 are formed from a single piece of material such as brass. Alternatively, the female connector 3204 may be formed separately from the outer tube 3202 and attached to the outer tube 3202 after being formed.

When the removable mouthpiece 2906 is attached to the replaceable cartridge 2902, interior surface 81 and the diverging outlets 24 are in fluid communication with the central channel 9 via the central passage 63.

When the removable mouthpiece 2906 is attached to the tobacco containing section 2904, the interior surface 81 and the diverging outlets 24 are in fluid communication with the channel of the tobacco containing section 2904, example embodiments of which will be discussed in more detail later.

Figure 33:
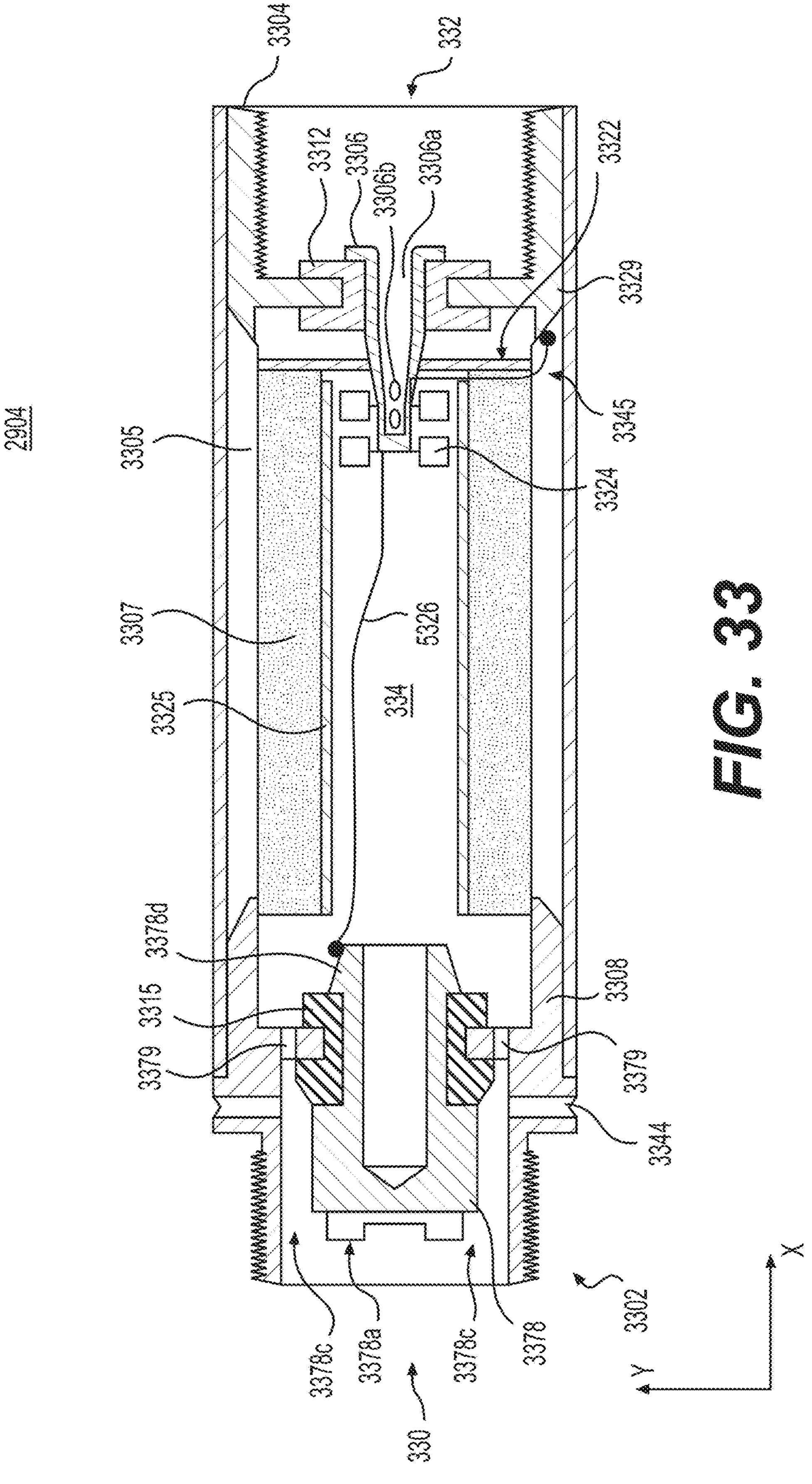
FIG. 33 illustrates a cross-sectional view of an example embodiment of the tobacco containing section shown in FIGS. 29A and 29B.

FIG. 33 illustrates a cross-sectional view of an example embodiment of the tobacco containing section 2904 shown in FIGS. 29A and 29B.

Referring to FIG. 33, the tobacco containing section 2904 includes a male connector 3302 at a first end 330 and a female connector 3304 at a second end 332. In the example embodiment shown in FIG. 33, the male and female connectors 3302 and 3304 are threaded connections. However, example embodiments are not limited to this example embodiment. Rather, the connectors may be, for example, snug-fit connectors, detent connectors, clamp connectors, clasp connectors, etc. Moreover, the positioning of the male and female connectors 3302 and 3304 may be reversed as desired such that the male connector 3302 is positioned at the second end 332 and the female connector 3304 is positioned at the first end 330 of the tobacco containing section 2904.

Within the male connector 3302, a post 3378 defines a post-side channel 3378*c* that allows air to communicate from a channel 334 into another section (e.g., the replaceable cartridge 2902 or the removable mouthpiece 2906) connected to the tobacco containing section 2904 as shown in FIGS. 29A and 29B. A gasket insulator 3315 holds the post 3378 within the male connector 3302. The gasket insulator 3315 also electrically insulates the post 3378 from a cathode connector portion of the male connector 3302.

A lower or distal portion 3378*d* of the post 3378, relative to the threaded portion of the male connector 3302, serves as an anode connector portion of the male connector 3302. The male connector 3302 also includes a cathode portion 3308. As mentioned above, the cathode portion 3308 is electrically insulated from the anode portion 3378*d* by the gasket insulator 3315.

The male connector 3302 further includes a plurality of holes 3379 that allow air to communicate from the channel 334 to the post-side channel 3378*c*.

The post 3378 includes an end connector portion 3378*a* at the upper or proximal end of the post 3378. The end connector portion 3378*a* includes an indentation, which allows air to flow and/or communicate from the post-side channel 3378*c* into another section (e.g., the replaceable cartridge 2902 or the removable mouthpiece 2906) connected to the tobacco containing section 2904 as shown in FIGS. 29A and 29B.

Figure 36:
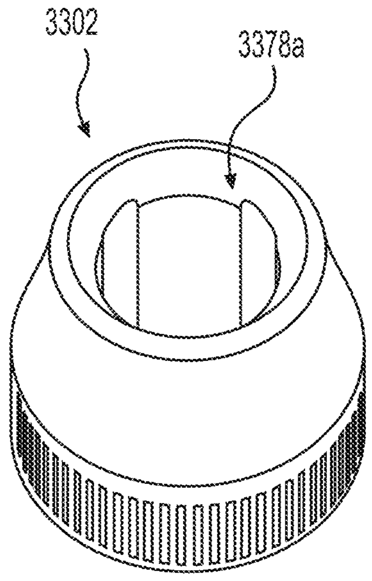
FIG. 36 is a perspective view of an example embodiment of the male connector.
Figure 37:
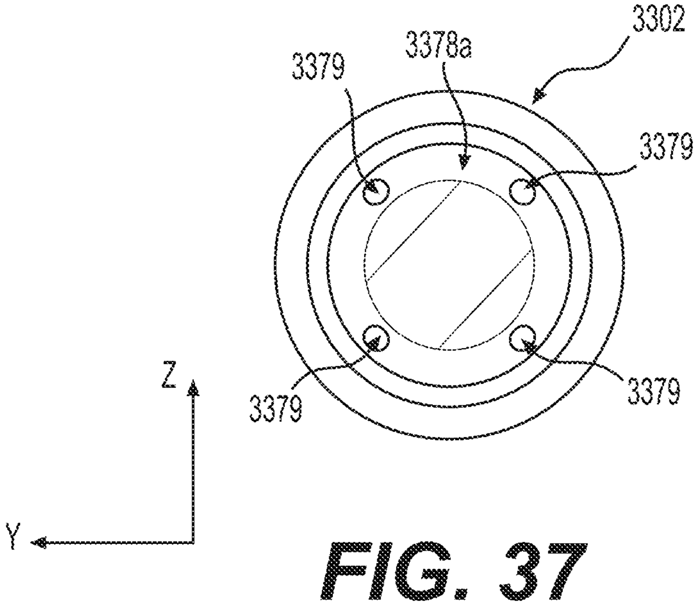
FIG. 37 is a top view of the male connector shown in FIG. 36.

FIG. 36 is a perspective view of an example embodiment of the male connector 3302, and FIG. 37 is a top view of the male connector 3302 shown in FIG. 36.

Referring to FIGS. 36 and 37, in this example embodiment, the male connector 3302 includes four holes 3379, which are spaced apart from one another by about 90 degrees. Although the example embodiment shown in FIG. 37 includes four holes, example embodiments should not be limited to this example. Rather, the connector 3302 may have any number of holes. Moreover, the holes may be spaced apart uniformly or non-uniformly as desired.

Still referring to FIGS. 36 and 37, the end connector portion 3378*a* of the post 3378 includes an indentation. The indentation defines a portion of the air passage that allows air to flow and/or communicate from the inner channel 334 through the holes 3379 and the post-side channel 3378*c* into another section (e.g., the replaceable cartridge 2902 or the removable mouthpiece 2906) connected to the tobacco containing section 2904 as shown in FIGS. 29A and 29B.

Returning to FIG. 33, the male connector 3302 also includes one or more air vents 3344 configured to communicate ambient air through the vents 3344 into the male connector 3302. The ambient air may combine and/or mix with air flowing into the post-side channel 3378*c* through the holes 3379 before flowing into another section as discussed herein.

Within the female connector 3304, a post 3306 defines a central passage 3306*a*. The central passage 3306*a* is in fluid communication with the channel 334, such that air flows through the central passage 3306*a* into the channel 334 when negative pressure is applied to the mouthpiece 2906. A gasket insulator 3312 holds the post 3306 within the female connector 3304. The gasket insulator 3312 also electrically insulates the post 3306 from the cathode connector portion of the female connector 3304.

The post 3306 serves as an anode portion of the female connector 3304. An outer portion 3329 of the female connector 3304 serves as the cathode connector portion of the female connector 3304. The cathode portion 3329 is electrically insulated from the post 3306 by the gasket insulator 3312.

A filter 3322 is arranged at the end of the channel 334 between the female connector 3304 and a tobacco housing 3305. The filter 3322 suppresses and/or prevents tobacco 3307 from exiting the tobacco housing 3305 and entering the female connector 3304. The filter 3322 may include cellulous acetate, glass fiber, ceramic, cotton, or any chemically inert porous material. The post 3306 passes through the filter 3322 and protrudes at least partially into the channel 334.

The portion of the post 3306 protruding into the inner channel 334 includes at least two holes 3306*b*, whereas the tip edge of the portion of the post 3306 protruding into the channel 334 is sealed. The tip edge of the protruding portion of the post 3306 may be sealed using solder. The holes 3306*b* enable fluid communication through the post 3306 into the channel 334.

The tobacco containing section 2904 further includes a plurality of ceramic coil heaters 3324. An example embodiment of a ceramic coil heater will be discussed in more detail later with regard to FIG. 35.

The plurality of ceramic coil heaters 3324 are electrically connected to the post 3306. The post 3306 is electrically connected to the anode connector portion 3378*d* of the post 3378 via an electrical lead 3326. In this example, the electrical lead 3326 passes through the inner channel 334. The plurality of ceramic coil heaters 3324 are also electrically connected to the cathode portion 3329 via electrical lead 3345.

The tobacco containing section 2904 further includes the tobacco housing 3305 that houses tobacco 3307, and is configured to allow an aroma from the tobacco 3307 to flow out through the first end 330.

A fibrous sleeve 3325 creates an outer annulus to retain the tobacco 3307 at the outer portion of the tobacco housing 3305. The fibrous sleeve 3325 may be a cellulosic material or polyethylene terephthalate and extends between the filter 3322 and the post 3378. The fibrous sleeve 3325 may be fiber glass or any material that is chemically inert and not electrically conductive.

The fibrous sleeve 3325 also defines an inner tube that provides the channel 334 between the filter 3322 and the post 3378.

Figure 35:
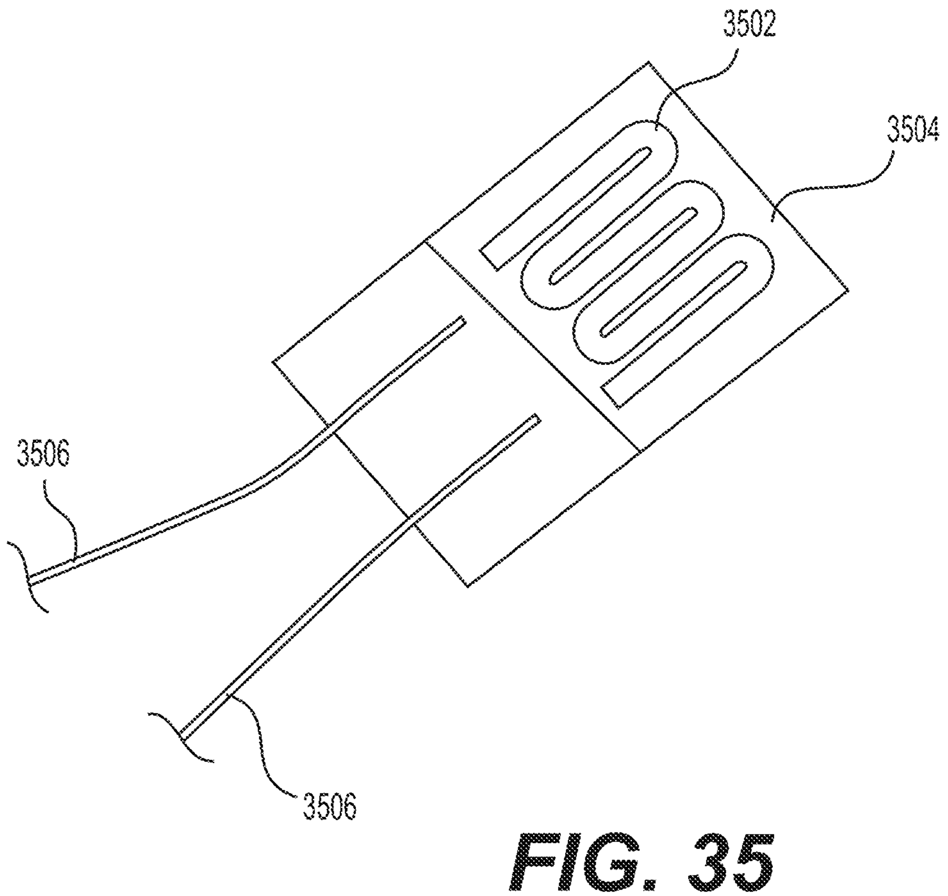
FIG. 35 is a perspective view of an example embodiment of a ceramic coil heater.

FIG. 35 is a perspective view of an example embodiment of a ceramic coil heater 3324.

Referring to FIG. 35, the ceramic coil heater 3324 includes a flat conductive coil 3502 encased in a ceramic material 3504. Each end of the conductive coil 3502 is connected to a respective conductive or electrical lead 3506. According to at least some example embodiments, the flat conductive coil may be formed of a conductive metal, such as platinum, titanium, or the like. Because ceramic coil heaters such as that shown in FIG. 35 are generally well-known, a more detailed discussion is omitted.

Example electrical connections for the example embodiment of the tobacco containing section 2904 shown in FIG. 33 will now be described with regard to FIG. 34.

Figure 34:
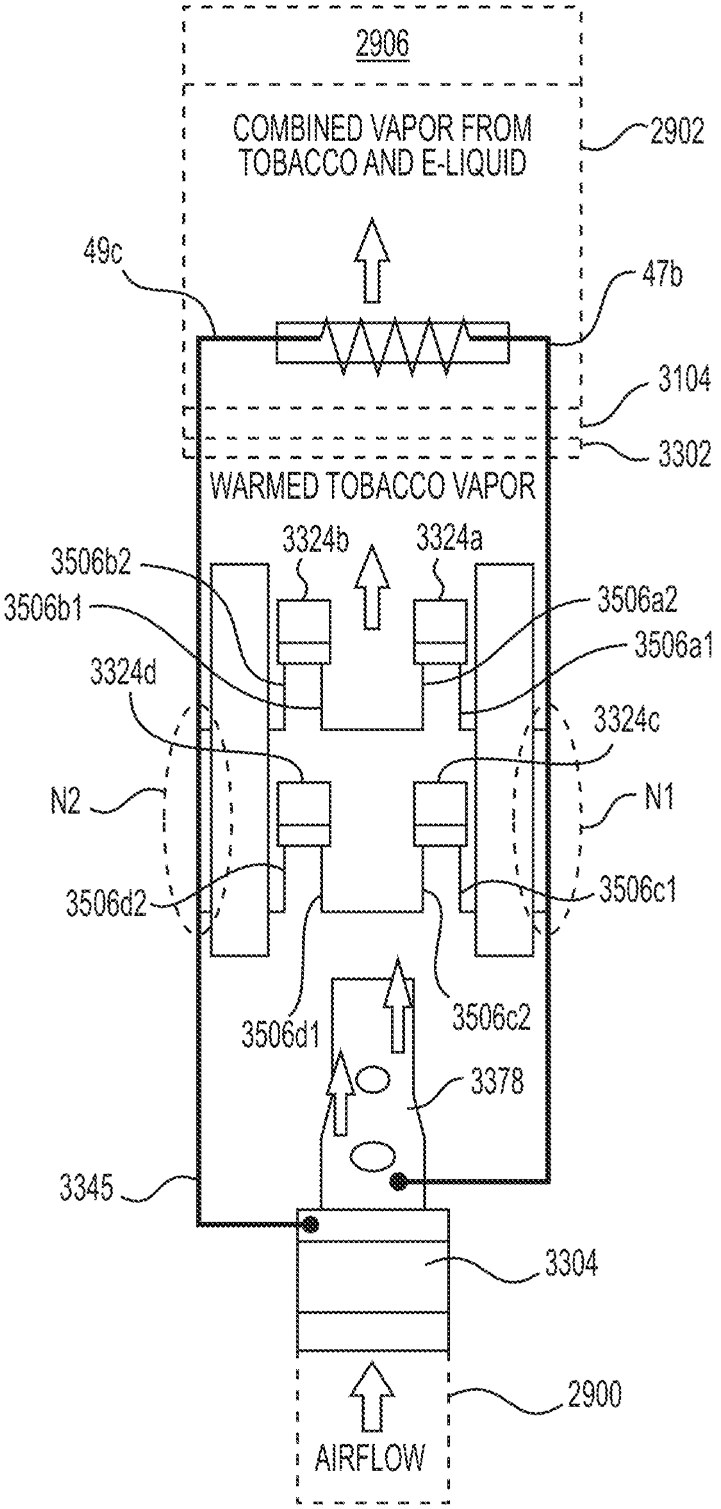
FIG. 34 is a circuit diagram illustrating example electrical connections between the ceramic coil heaters and the heater in FIG. 31 when the power section, the replaceable cartridge, the tobacco containing section and the removable mouthpiece are arranged as shown in FIG. 29B.

FIG. 34 is a circuit diagram illustrating example electrical connections between the ceramic coil heaters 3324 and the heater 14 in FIG. 31 when the power section 2900, the replaceable cartridge 2902, the tobacco containing section 2904 and the removable mouthpiece 2906 are arranged as shown in FIG. 29B.

In the example embodiment shown in FIG. 34, pairs of ceramic coil heaters 3324 are electrically connected in series, and the pairs of ceramic coil heaters 3324 are electrically connected in parallel with one another between the nodes N1 and N2. When the tobacco containing section 2904 is connected to the replaceable cartridge 2902, the pairs of ceramic coil heaters 3324 are also connected in parallel with the heater 14. In at least one example, the two pairs of ceramic coil heaters 3324 are connected in parallel for a total impedance of about 3.2 Ohms.

As shown in FIG. 34, the post 3378 is electrically connected to a first electrical lead **3506*a*1 of a ceramic coil heater 3324*a* and to a first electrical lead 3506*cl* of the ceramic coil heater 3324*c* at the first node N1**.

A second electrical lead **3506*a*2 of the ceramic coil heater 3324*a* is electrically connected to a first electrical lead 3506*b*1 of a ceramic coil heater 3324*b*, and a second electrical lead 3506*b*2 of the ceramic coil heater 3324*b* is electrically connected to the second node N2 such that the ceramic coil heaters 3324*a* and 3324*b* are connected in series between the first node N1 and the second node N2**.

A second electrical lead **3506*c*2 of the ceramic coil heater 3324*c* is electrically connected to a first electrical lead 3506*d*1 of a ceramic coil heater 3324*d*, and a second electrical lead 3506*d*2 of the ceramic coil heater 3324*d* is electrically connected to the second node N2 such that the ceramic coil heaters 3324*c* and 3324*d* are also connected in series between the first node N1 and the second node N2**.

The heater 14 is also electrically connected between the first node N1 and the second node N2. The cathode portion of the female connector 3304 is also connected to the second node N2 via electrical lead 3345, such that the first set of ceramic coil heaters **3324*a* and 3324*b*, the second set of ceramic coil heaters 3324*c* and 3324*d*, and the heater 14** are electrically connected in parallel with one another.

The leads discussed with regard to FIGS. 33 through 37 may be connected to the anode and/or cathode portions by, for example, spot welding or soldering. It should be understood that connections should not be limited to soldering or spot welding. And, where soldering is used welding may be used instead and vice versa.

Although not shown in FIGS. 33 and 34, when the power section 2900, the replaceable cartridge 2902, the tobacco containing section 2904 and the removable mouthpiece 2906 are arranged as shown in FIG. 29B, the anode connection 3012 of the power supply 3010 is electrically connected to the post 3378 via the post 3020. In addition, the cathode portion 3016 is electrically connected to the cathode portion 3329 of the female connector 3304.

Figure 38:
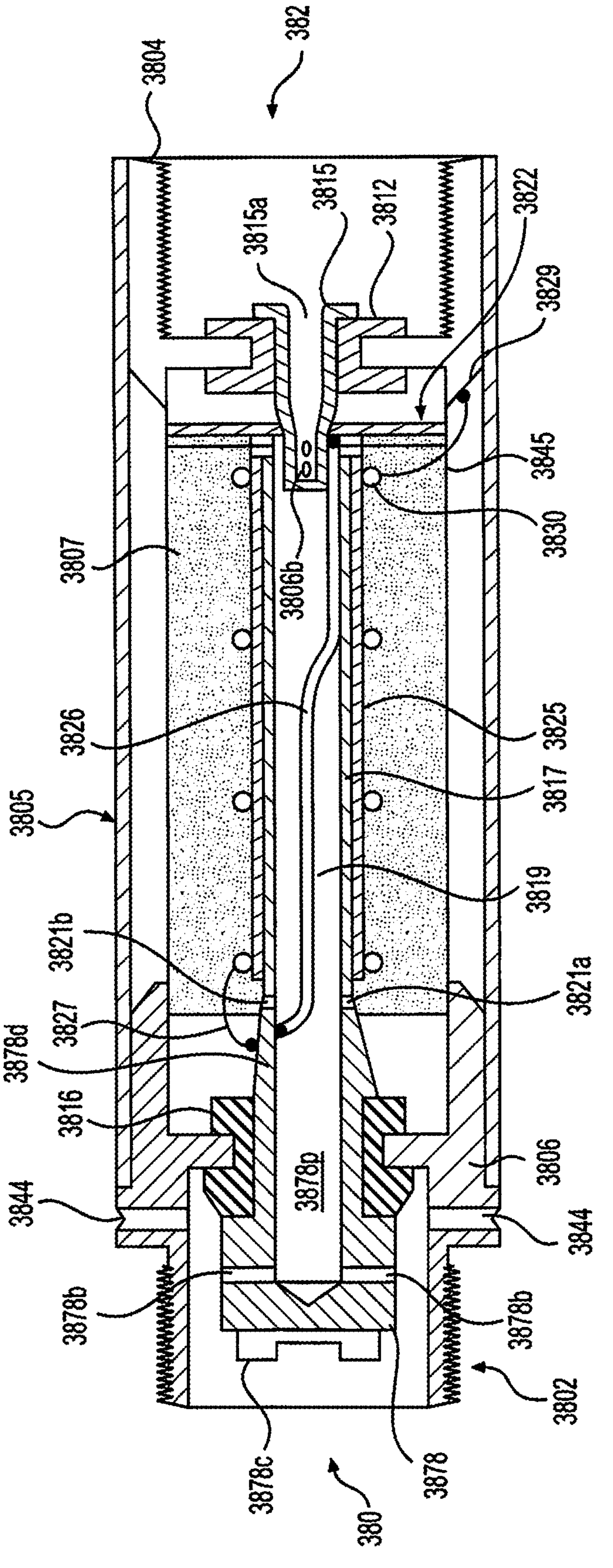
FIG. 38 is a cross-sectional view of another example embodiment of the tobacco containing section shown in FIGS. 29A and 29B.
Figure 39:
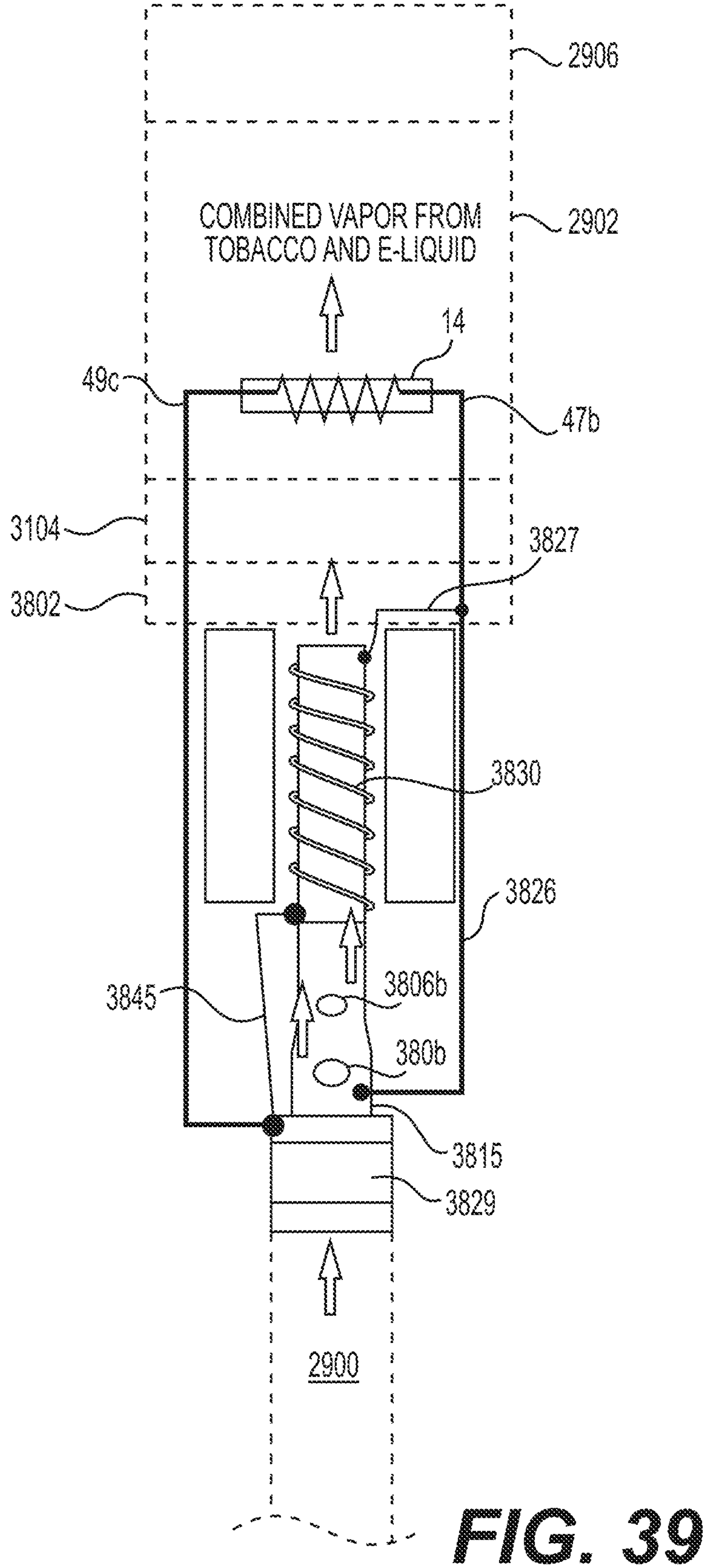
FIG. 39 is a circuit diagram illustrating example electrical connections between the coil heater in FIG. 38 and the heater in FIG. 31 when the power section, the replaceable cartridge, the tobacco containing section and the removable mouthpiece are arranged as shown in FIG. 29B.

FIG. 38 is a cross-sectional view of another example embodiment of the tobacco containing section 2904 shown in FIGS. 29A and 29B. FIG. 39 is a circuit diagram illustrating example electrical connections between the coil heater 3830 in FIG. 38 and the heater 14 in FIG. 31 when the power section 2900, the replaceable cartridge 2902, the tobacco containing section 2904 and the removable mouthpiece 2906 are arranged as shown in FIG. 29B.

Referring to FIG. 38, the tobacco containing section 2904 includes a male connector 3802 at a first end 380 and a female connector 3804 at a second end 382. In the example embodiment shown in FIG. 38, the male and female connectors 3802 and 3804 are threaded connections. However, example embodiments are not limited to this example embodiment. Rather, the connectors may be, for example, snug-fit connectors, detent connectors, clamp connectors, clasp connectors, etc. Moreover, the positioning of the male and female connectors 3802 and 3804 may be reversed as desired such that the male connector 3802 is positioned at the second end 382 and the female connector 3804 is positioned at the first end 380 of the tobacco containing section 2904.

The tobacco containing section 2904 further includes a tobacco housing 3805 that houses tobacco 3807. As will be discussed later, similar to the tobacco housing 1505 shown in FIG. 15A, the tobacco housing 3805 is configured to allow an aroma from the tobacco 3807 to flow through the male connector 3802.

Within the male connector 3802, a post 3878 defines a post-side channel (or central passage) **3878*p*. The central passage 3878*p* allows air to flow and/or communicate from the channel 3819 into the male connector 3802 and then into another section (e.g., the replaceable cartridge 2902 or the removable mouthpiece 2906) connected to the tobacco containing section 2904 as shown in FIGS. 29A and 29B. A gasket insulator 3816 holds the post 3878 within the male connector 3802. The gasket insulator 3816 also electrically insulates the post 3878 from the cathode portion of the male connector 3802**.

A lower (or distal) portion **3878*d* of the post 3878, relative to the threaded portion of the male connector 3802, serves as an anode connector portion of the male connector 3802. The male connector 3802 also includes a cathode portion 3806. As mentioned above, the cathode portion 3806 is electrically insulated from the anode connector portion 3878*d* by the gasket insulator 3816**.

The post 3878 further includes a plurality of holes **3878*b* at an upper (or proximal) portion of the post 3878. In at least one example embodiment, the post 3878 may include four holes, spaced apart by about 90 degrees. However, example embodiments should not be limited to this example. Rather, the post 3878** may have any number of holes, and the holes may be spaced apart uniformly or non-uniformly as desired.

An end connector portion **3878*c* of the post 3878 is also arranged at the upper or proximal end of the post 3878. The end connector portion 3878*c* includes an indentation, and is essentially the same as the connector portion 3378*a* discussed above with regard to the example embodiment shown in FIG. 33**.

The plurality of holes **3878*b* and the indentation in the connector portion 3878*c* form a channel that allows air to flow and/or communicate from the central passage 3878*p* into another section (e.g., the replaceable cartridge 2902 or the removable mouthpiece 2906) connected to the tobacco containing section 2904 as shown in FIGS. 29A and 29**B.

The male connector 3802 also includes one or more air vents 3844 configured to communicate ambient air through the vents 3844 into the male connector 3802. The ambient air may combine and/or mix with air flowing from the central passage **3878*p*** and flow into another section as discussed herein.

Still referring to FIG. 38, the anode connector portion **3878*d* includes an annular section 3817 that extends longitudinally into the tobacco housing 3805 to at least partially define the channel 3819. The anode connector portion 3878*d* further includes at least two holes 3821*a* and 3821*b* to allow air to flow into and/or out of the tobacco 3807 from and/or to the channel 3819 when negative pressure is applied to the mouth-end insert 2906. As a result, the channel 3819 provides a path for air to flow into and/or out of the tobacco 3807. Both the post 3878 and the cathode portion 3806** include an electrically conductive material such as plated brass or stainless steel.

Toward the first end 380, the channel 3819 is open, and in fluid communication with, the central passage **3878*p***.

A fibrous sleeve 3825 covers at least a portion of the annular portion 3817 of the anode connector portion **3878*d*. A coil heater 3830 wraps around the fibrous sleeve 3825 in the longitudinal direction. The coil heater 3830 is configured to heat the tobacco 3807 when power is supplied to the coil heater 3830 from the power supply 3010. The coil heater 3830 may heat the tobacco and not burn it. For example, the coil heater 3830 may operate at around 190° C. or may be varied based on a power supply control. The heater 3830 heats the tobacco 3807 to generate a tobacco aroma. The coil heater 3830** may be a nickel-chromium (NiCr) wire with an impedance of about 1.0 Ohms. However, example embodiments should not be limited to this example.

The fibrous sleeve 3825 may be fiber glass or any material that is chemically inert and not electrically conductive. The fibrous sleeve 3825 may extend from ends of the holes 3821*a* and 3821*b* to the filter 3822 at an opposite end of the channel 3819, and aids in controlling the temperature by absorbing heat emitted from the coil heater 3830. The fibrous sleeve 3825 electrically separates the coil heater 3830 and the anode connector portion 3878*d*.

Still referring to FIG. 38, within the female connector 3804, a post 3815 defines a central passage 3815*a*. The central passage 3815*a* is in fluid communication with the channel 3819, such that air flows through the central passage 3815*a* into the channel 3819 when negative pressure is applied to the mouthpiece 2906. A gasket insulator 3812 holds the post 3815 within the female connector 3804. The gasket insulator 3812 also electrically insulates the post 3815 from the cathode portion of the female connector 3804.

The post 3815 serves as an anode portion of the female connector 3804. An outer portion 3829 of the female connector 3804 serves as the cathode portion of the female connector 3804, and is electrically insulated from the post 3815 by the gasket insulator 3812.

The filter 3822 is arranged at the end of the channel 3819 between the female connector 3804 and the tobacco housing 3805. The filter 3822 suppresses and/or prevents tobacco 3807 from exiting the tobacco housing 3805 and entering the female connector 3804. The filter 3822 may include cellulous acetate, glass fiber, ceramic, cotton, or any chemically inert porous material.

The post 3815 passes through the filter 3822 and protrudes at least partially into the channel 3819. The portion of the post 3815 protruding into the channel 3819 includes at least two holes 3806*b*. According to at least some example embodiments, the tip edge of the portion of the post 3815 protruding into the channel 3819 may be sealed. In this example embodiment, the holes 3806*b* enable fluid communication between the central passage 3815*a* and the channel 3819. Alternatively, however, the holes 3806*b* may be omitted and the end of the post 3815 may be open to enable fluid communication between the central passage 3815*a* and the channel 3819.

As discussed above, FIG. 39 is a circuit diagram illustrating example electrical connections between the coil heater 3830 in FIG. 38 and the heater 14 in FIG. 31 when the power section 2900, the replaceable cartridge 2902, the tobacco containing section 2904 and the removable mouthpiece 2906 are arranged as shown in FIG. 29B. Example electrical connections of the tobacco containing section 2904 will now be described with regard to FIGS. 38 and 39. As shown in FIG. 39, in this example, the heater 14 is electrically connected in parallel with the coil heater 3830.

Referring to FIGS. 38 and 39, the post 3815 is electrically connected to the anode connector portion 3878*d* via first electrical lead 3826. The anode connector portion 3878*d* is electrically connected to the coil heater 3830 via second electrical lead 3827. In this example, the anode connector portion 3878*d* is also electrically connected to the post 3306 of the replaceable cartridge 2902.

The cathode portion 3806 is electrically connected to the cathode portion 3329 of the replaceable cartridge 2902. The coil heater 3830 is electrically connected to the cathode portion 3829 via fourth electrical lead 3845.

The electrical leads discussed with regard to FIGS. 38 and 39 may be connected to the anode and/or cathode portions by, for example, spot welding or soldering. It should be understood that connections should not be limited to soldering or spot welding. And, where soldering is used welding may be used instead and vice versa.

Although not shown in FIGS. 38 and 39, when the power section 2900, the replaceable cartridge 2902, the tobacco containing section 2904 and the removable mouthpiece 2906 are arranged as shown in FIG. 29B, the anode connection 3012 of the power supply 3010 is electrically connected to the post 3815 via the post 3020. In addition, the cathode portion 3016 is electrically connected to the cathode portion 3829 of the female connector 3804.

Figure 40:
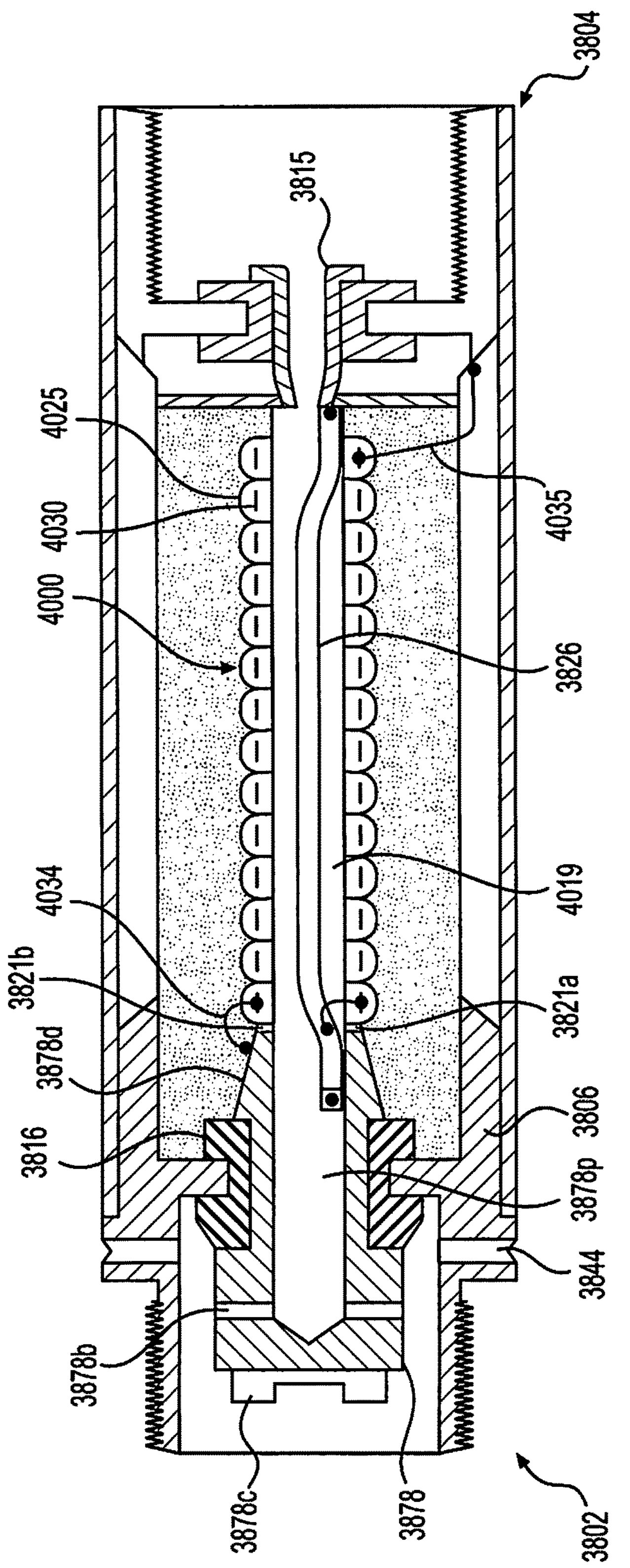
FIG. 40 is a cross-sectional view of another example embodiment of the tobacco containing section shown in FIGS. 29A and 29B.
Figure 41A:
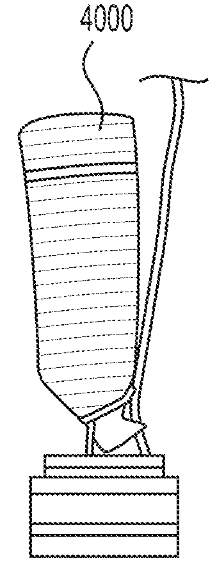
FIG. 41A is a top view of a portion of the example embodiment shown in FIG. 40.
Figure 41B:
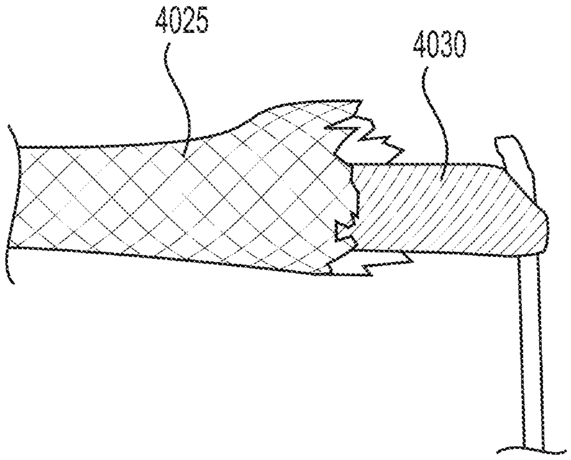
FIG. 41B is a close up view of a portion of an example embodiment of the mesh heater assembly shown in FIGS. 40 and 41A.
Figure 41C:
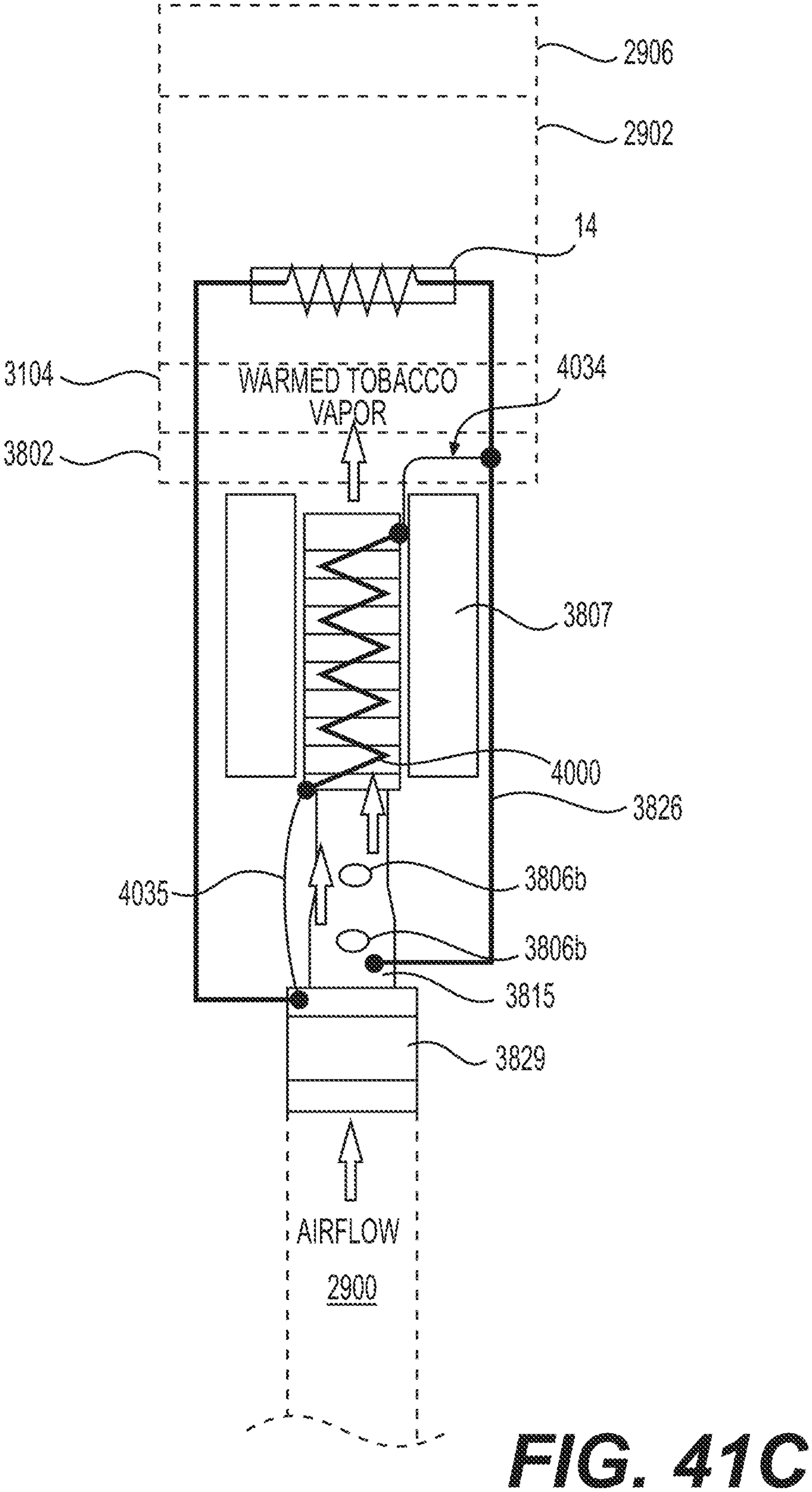
FIG. 41C is a circuit diagram illustrating example electrical connections between the mesh heater and the heater in FIG. 31 when the power section, the replaceable cartridge, the tobacco containing section and the removable mouthpiece are arranged as shown in FIG. 29B.

FIG. 40 is a cross-sectional view of another example embodiment of the tobacco containing section 2904 shown in FIGS. 29A and 29B. FIG. 41A is a top view of a portion of the example embodiment shown in FIG. 40, and FIG. 41B is a close up view of a portion of an example embodiment of the mesh heater assembly shown in FIGS. 40 and 41A. FIG. 41C is a circuit diagram illustrating example electrical connections between the mesh heater 4030 and the heater 14 in FIG. 31 when the power section 2900, the replaceable cartridge 2902, the tobacco containing section 2904 and the removable mouthpiece 2906 are arranged as shown in FIG. 29B.

The example embodiment shown in FIG. 40 is similar to the example embodiment shown in FIG. 38, and thus, only the differences will be described for the sake of brevity.

Referring to FIGS. 40, 41A and 41B, unlike the example embodiment shown in FIG. 38, the example embodiments shown in FIG. 40 includes a mesh heater assembly 4000, rather than a coil heater. The mesh heater assembly 4000 includes a mesh heater 4030 wrapped in a fibrous sleeve 4025. The fibrous sleeve 4025 may be fiber glass or any material that is chemically inert and not electrically conductive. The fibrous sleeve 4025 electrically insulates and/or separates the heater 4030 from the annular section 3817 (not shown in FIG. 40) of the anode connector portion 3878*d* of the post 3878. Because the mesh heater 4030 is wrapped in the fibrous sleeve 4025, the fibrous sleeve 3825 shown in FIG. 38 may be omitted.

Similar to the coil heater 3830, the mesh heater assembly 4000 is wrapped around the annular section 3817 extending longitudinally in the tobacco housing 3805, thereby creating a channel 4019 between the post 3815 and the central passage 3878*p* of the post 3878. The channel 4019 provides a path for air to flow between the post 3815 and the central passage 3878*p* and further downstream when negative pressure is applied to the mouthpiece 2906 as discussed above with regard to FIG. 38.

As mentioned above, FIG. 41C is a circuit diagram illustrating example electrical connections between the mesh heater 4030 and the heater 14 in FIG. 31 when the power section 2900, the replaceable cartridge 2902, the tobacco containing section 2904 and the removable mouthpiece 2906 are arranged as shown in FIG. 29B. Electrical connections of the example embodiment shown in FIG. 40 will now be described with regard to FIGS. 40 and 41C.

Referring to FIGS. 40 and 41C, the post 3815 is electrically connected to the anode connector portion 3878*d* via first electrical lead 3826 as discussed above with regard to FIGS. 38 and 39. The anode connector portion 3878*d* is electrically connected to a first end of the mesh heater assembly 4000 via second electrical lead 4034.

In the example embodiment shown in FIG. 41C, the heater 14 is electrically connected in parallel with the mesh heater assembly 4000. A second end of the mesh heater assembly 4000 is connected to the cathode portion 3829 of the female connector 3804 via electrical lead 4035.

When the power section 2900, the replaceable cartridge 2902, the tobacco containing section 2904 and the removable mouthpiece 2906 are arranged as shown in FIG. 29B, the anode connection 3012 of the power supply 3010 is electrically connected to the post 3815 (in FIG. 40) via the post 3020. In addition, the cathode portion 3016 is electrically connected to the cathode portion of the female connector 3804.

The electrical leads discussed with regard to FIGS. 40 and 41C may be connected to the anode and/or cathode portions by, for example, spot welding or soldering. It should be understood that connections should not be limited to soldering or spot welding. And, where soldering is used welding may be used instead and vice versa.

FIGS. 42A through 42D illustrate a tobacco-containing and e-vaping cartridge according to example embodiments. The example embodiments shown in FIGS. 42A through 42D are similar to the example embodiment shown in FIG. 33, but is an all-in-one design in which the heating element (e.g., a single ceramic heating element) for the tobacco-containing portion and the heating element for the vaporizer portion are electrically connected in parallel with one another, and contained in the same single (e.g., stainless steel) housing. As discussed herein, example embodiments of the all-in-one design illustrated in FIGS. 42A through 42D may be referred to as a tobacco-containing and e-vaping cartridge, or in some cases, simply a cartridge.

Figure 42A:
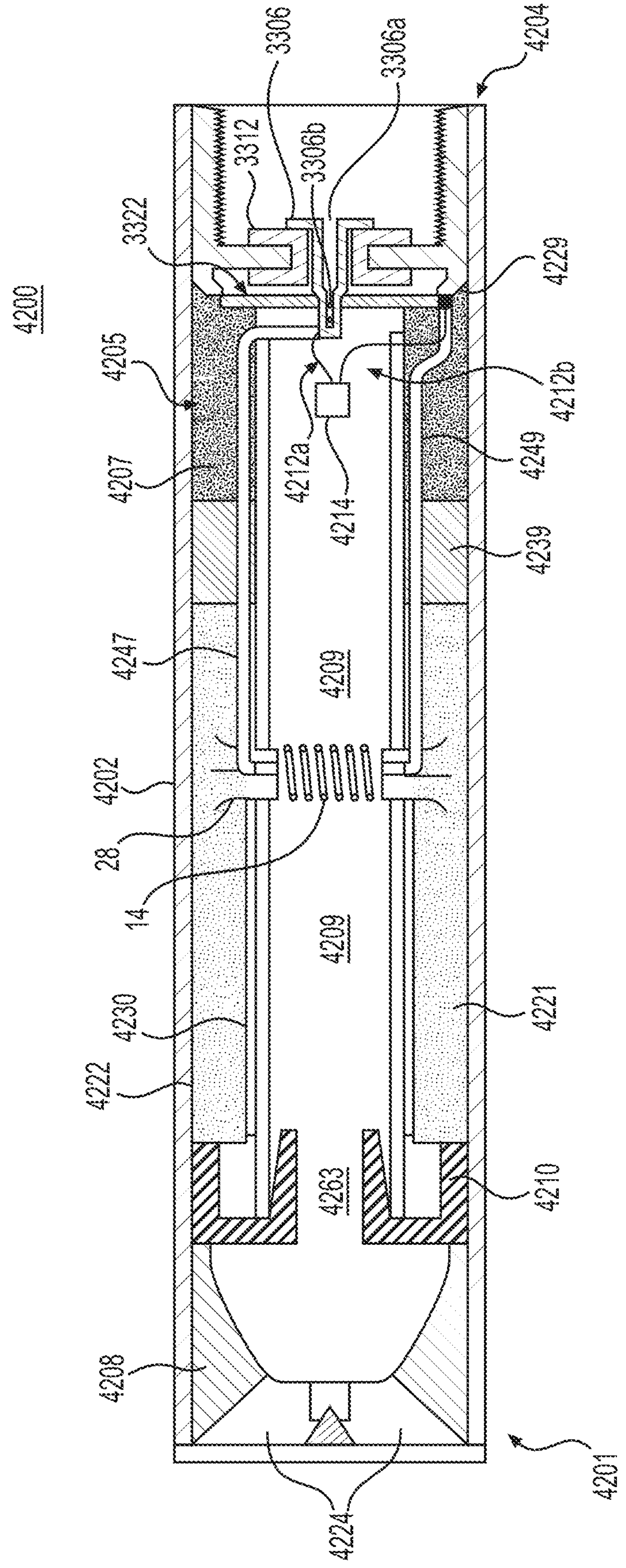
FIGS. 42A through 42D illustrate a tobacco-containing and e-vaping cartridge according to example embodiments.
Figure 42B:
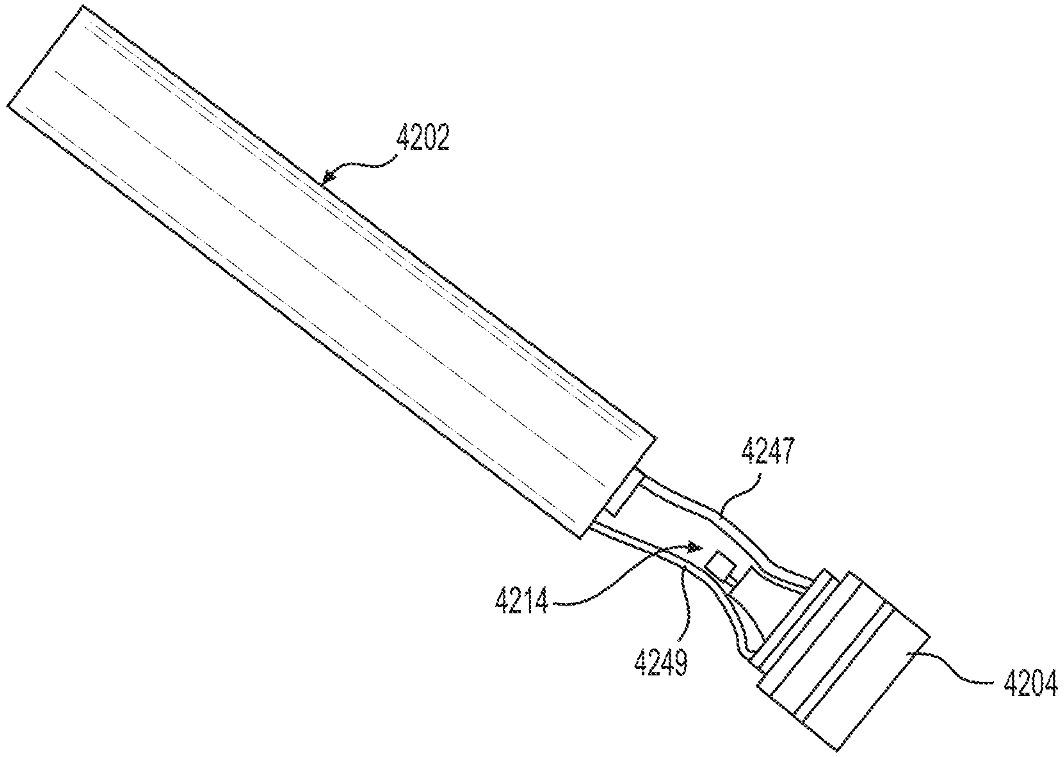
Figure 42C:
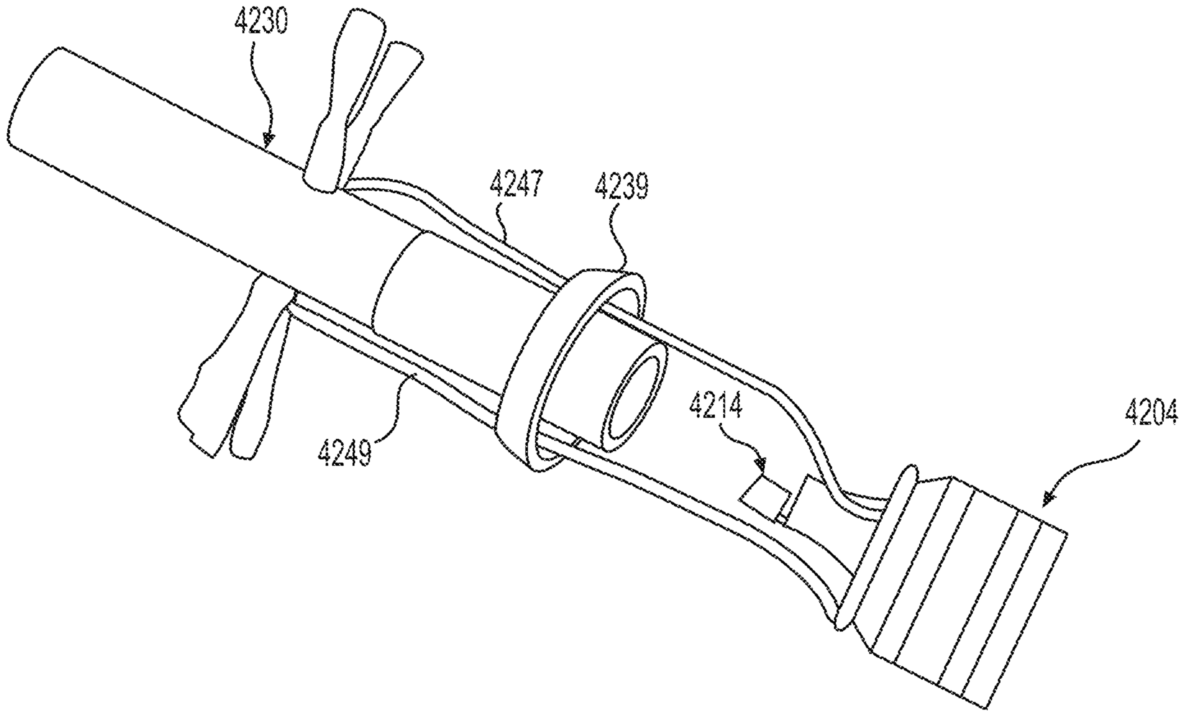
Figure 42D:
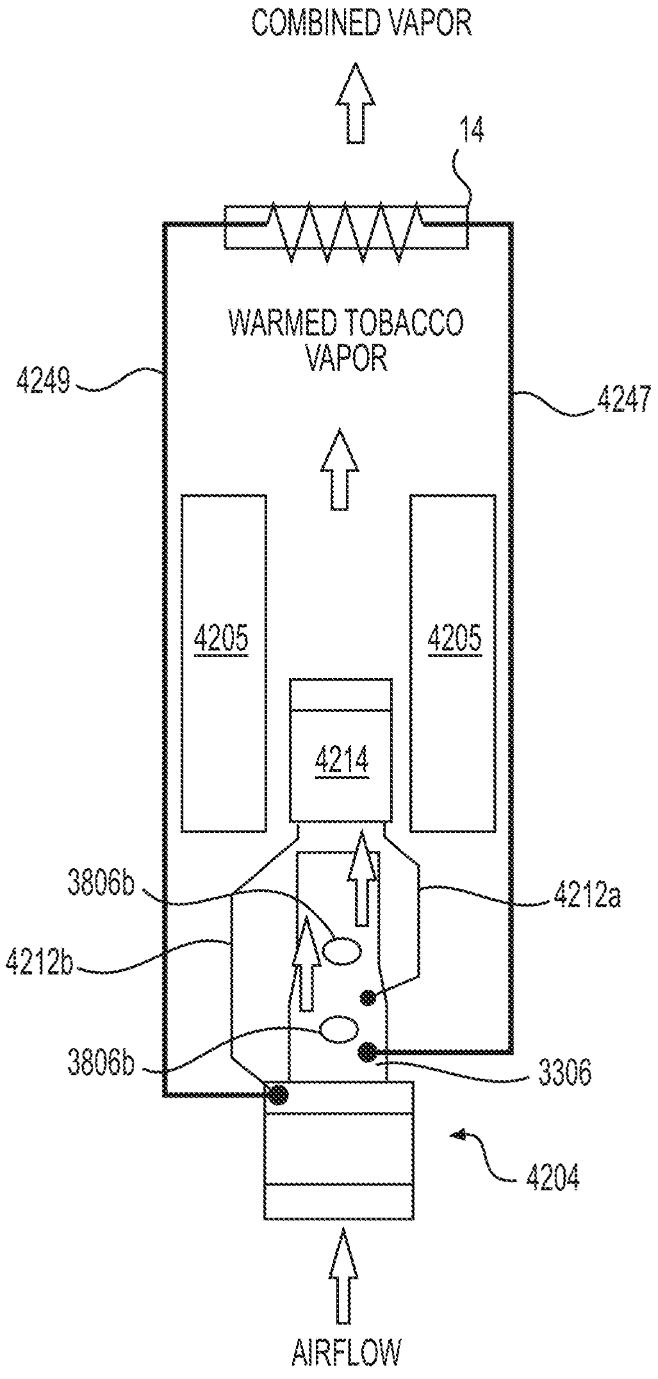

In more detail, FIG. 42A is a cross-sectional view of an example embodiment of a tobacco-containing and e-vaping cartridge; FIG. 42B is a perspective view of the example embodiment of the tobacco-containing and e-vaping cartridge including the housing; FIG. 42C is a perspective view of the example embodiment of the tobacco-containing and e-vaping cartridge with the housing removed; and FIG. 42D is a circuit diagram illustrating example electrical connections of the tobacco-containing and e-vaping cartridge according to example embodiments.

The tobacco-containing and e-vaping cartridge 4200 shown in FIGS. 42A through 42D is configured to be detachably coupled to, or engaged with, a power section 2900, such as the power section shown in FIG. 30. However, example embodiments should not be limited to this example configuration.

Referring to FIGS. 42A through 42C, the cartridge 4200 includes a mouthpiece 4201 (not shown in FIG. 42B or 42C) at a first end of a housing 4202 and a female connector 4204 at a second end of the housing 4202. The mouthpiece 4201 will be discussed in more detail later. The housing 4202 may be composed of stainless steel and may have the same or substantially the same shape and diameter as, for example, the power section 2900 shown in FIG. 30.

In the example embodiments shown in FIGS. 42A through 42D, the female connector 4204 is a threaded connection. However, example embodiments are not limited to this example embodiment. Rather, the female connector 4204 may be, for example, snug-fit connectors, detent connectors, clamp connectors, clasp connectors, etc. Moreover, the female connector 4204 may be a male connector.

According to at least this example embodiment, the female connector 4204 is formed separately from the housing 4202, and attached or fitted into the housing 4202 after being formed. The female connector 4204 shown in FIGS. 42A through 42D is similar to the female connector 3304 shown in FIG. 33, and thus, only a brief discussion will be provided. Moreover, like reference characters refer to like elements.

Within the female connector 4204, a post 3306 passes through a filter 3322 and protrudes at least partially into a channel (also sometimes referred to as a central air passage) 4209. The portion of the post 3306 protruding into the inner channel 4209 includes at least two holes 3306*b*, whereas the tip edge of the portion of the post 3306 protruding into the channel 4209 is sealed. The tip edge of the protruding portion of the post 3306 may be sealed using, for example, solder. A gasket insulator 3312 holds the post 3306 within the female connector 4204. The gasket insulator 3312 also electrically insulates the post 3306 from an outer portion 4229, which serves as the cathode connector portion of the female connector 4204.

A central passage 3306*a* through the post 3306 is in fluid communication with the channel 4209, such that air flows through the central passage 3306*a* and the holes 3306*b* into the channel 4209 when negative pressure is applied to the mouthpiece 4201.

A filter 3322 is arranged at the end of the channel 4209 between the female connector 4204 and a tobacco housing (also referred to as a tobacco column) 4205. As with the example embodiment shown in FIG. 33, the filter 3322 suppresses and/or prevents tobacco 4207 from exiting the tobacco housing 4205 and entering the female connector 4204. The tobacco 4207 is essentially the same as the tobacco 3307 shown in FIG. 33, and thus, a detailed discussion is omitted for the sake of brevity.

The cartridge 4200 further includes a single ceramic heater (or, alternatively, a ceramic coil heater) 4214. An example embodiment of the ceramic heater is discussed above with regard to FIG. 35, and will not be repeated here. The impedance of the ceramic heater 4214 may be selected based on the specific type of tobacco surrounding the element. In one example, the ceramic heater 4214 may have an application specific impedance between about 1.0 and about 5.0 Ohms.

The ceramic heater 4214 is electrically connected to the post 3306 via electrical lead 4212*a* and to the cathode connector portion 4229 of the female connector 4204 via electrical lead 4212*b*.

The tobacco housing 4205 houses the tobacco 4207, and is configured to allow an aroma from the tobacco 4207 to flow into the channel 4209.

A fibrous sleeve 4230 creates an outer annulus to retain the tobacco 4207 at the outer portion of the housing 4202. The fibrous sleeve 4230 is essentially the same as the fibrous sleeve 3325 discussed above with regard to FIG. 33, and thus, a more detailed discussion is omitted. The fibrous sleeve 4230 also defines an inner tube that provides the channel 4209 between the filter 3322 and a central passage 4263.

A silicon gasket 4239 is fitted around the fibrous sleeve 4230 and positioned within the housing 4202 between the tobacco housing 4205 and a pre-vapor formulation 4222 to prevent the tobacco 4207 from mixing with the pre-vapor formulation contained in the pre-vapor formulation supply reservoir 4222.

In this example, the pre-vapor formulation supply reservoir 4222 is positioned closer to the mouthpiece 4201 than the tobacco housing 4205. That is, for example, the pre-vapor formulation supply reservoir 4222 is positioned downstream of the tobacco housing 4205. However, example embodiments should not be limited to this example configuration.

The pre-vapor formulation supply reservoir 4222 is configured to hold a pre-vapor formulation material. In the example embodiment shown in FIGS. 42A through 42C, the pre-vapor formulation supply reservoir 4222 includes a pre-vapor formulation storage medium 4221 configured to store the pre-vapor formulation material therein. The pre-vapor formulation supply reservoir 4222 and the pre-vapor formulation storage medium 4221 are similar to the pre-vapor formulation supply reservoir 22 and the pre-vapor formulation supply storage medium 21 discussed earlier, and thus, only a brief discussion will be provided.

The pre-vapor formulation supply reservoir 4222 is contained in an outer annulus between the housing 4202 and the fibrous sleeve 4230. The outer annulus is sealed at a first end by a gasket (e.g., seal gasket) 4210 and by the silicon gasket 4239 at an opposite end.

As mentioned above, the cartridge 4200 further includes the heater 14. The heater 14 is positioned in the channel 4209 between the single ceramic heater 4214 and the mouthpiece 4201. In at least this example embodiment, the heater 14 extends in a direction transverse to the longitudinal direction, and is positioned downstream and spaced apart from the single ceramic heater 4214 along the longitudinal axis of the cartridge 4200. In other example embodiments, the heater 14 may be arranged in another manner such as in the longitudinal direction. As shown in FIGS. 42A through 42C, a first terminal or end of the heater 14 is electrically connected to the post 3306 via electrical lead 4247, and a second terminal or end of the heater 14 is electrically connected to the cathode connector portion 4229 of the female connector 4204.

The wick 28 is in communication with the pre-vapor formulation material in the pre-vapor formulation supply reservoir 4222 and the heater 14 such that the wick 28 disposes pre-vapor formulation material in proximate relation to the heater 14.

As mentioned above, the cartridge 4200 includes the mouthpiece 4201 at the first end. The mouthpiece 4201 includes a mouth-end insert 4208, which is essentially the same as that discussed above with regard to, for example, FIGS. 2A and 2B. In the example embodiment shown in FIG. 42A, the mouth-end insert 4208 is fitted (or, alternatively, fixed, or further alternatively, integrally affixed) within the housing 4202.

The mouth-end insert 4208 has at least two off-axis, diverging outlets 4224, and is in fluid communication with the channel 4209 via the central passage 4263, which extends through the gasket 4210. The gasket 4210 is essentially the same as the gasket 10 discussed above with regard to, for example, FIG. 1B. Thus, a detailed discussion of the gasket 4210 will be omitted for the sake of brevity.

Referring now to FIGS. 30 and 42A through 42C, when the tobacco-containing and e-vaping cartridge is coupled to, or engaged with, the power section 2900 shown in FIG. 30, and an adult tobacco consumer applies negative pressure (or, alternatively, negative pressure above a threshold) to the mouthpiece 4201, the sensor 3038 (FIG. 30) senses the change in pressure in the power section 2900, and the control circuitry 3018 (FIG. 30) causes power to be supplied to the heater 14 and the ceramic heater 4214. The electrified ceramic heater 4214 heats and warms the tobacco 4207 contained in the tobacco housing 4205. While the electrified ceramic heater 4214 warms the tobacco 4207, the electrified heater 14 vaporizes pre-vapor formulation drawn from the pre-vapor formulation supply reservoir 4222 to generate a vapor.

Also, when negative pressure is applied to the mouthpiece 4201, air enters the connector 3017 of the power section 2900 through the vents 3032. The air passes through connector 3017 and the central passage 3306*a* into the channel 4209 through the holes 3306*b*. The warmed tobacco air mixes with the vapor generated when the heater 14 is heated to a temperature sufficient to vaporize pre-vapor formulation drawn from the pre-vapor formulation supply reservoir 4222 to create a warmed tobacco vapor mixture. The warmed tobacco vapor mixture passes through the central passage 4263 and is drawn through the diverging outlets 4224 of the mouthpiece 4201.

As mentioned above, FIG. 42D is a circuit diagram illustrating example electrical connections of a tobacco-containing and e-vaping cartridge according to example embodiments.

In the example embodiment shown in FIG. 42D, the ceramic heater 4214 is connected in parallel with the heater 14. As mentioned above, in one example, the ceramic heater 4214 may have an application specific impedance between about 1.0 and about 5.0 Ohms. The heater 14 may be a NiCr wire with an impedance of about 3.5 Ohms.

As shown in FIG. 42D, the post 3306 is electrically connected to the electrical lead 4212*a* of the ceramic heater 4214 and to the first terminal or end of the heater 14 via the electrical lead 4247.

The ceramic heater 4214 is also electrically connected to the cathode connector portion 4229 of the female connector 4204 via the electrical lead 4212*b*. The cathode connector portion 4229 of the female connector 4204 is also electrically connected to the second terminal or end of the heater 14 via the electrical lead 4249.

The electrical leads 4247 and 4249 are essentially the same as the electrical leads 47*b* and 49*c* discussed above, and thus, a detailed discussion is omitted.

As with FIGS. 33 through 37, the leads discussed with regard to FIGS. 42A through 42D may be connected to the anode and/or cathode portions by, for example, spot welding or soldering. It should be understood that connections should not be limited to soldering or spot welding. And, where soldering is used welding may be used instead and vice versa.

In an example embodiment of a method of manufacturing the tobacco-containing and e-vaping cartridge shown in FIGS. 42A through 42D, the pre-vapor formulation supply reservoir 4222 is inserted into the housing 4202, and pushed upward in the housing 4202. The housing 4202 is then inverted and loose tobacco 4207 is dispersed around the interior of the housing 4202 until full. The female connector 4204 with the ceramic heater 4214 is then pressed into the housing in contact with the tobacco housing 4205. The pre-vapor formulation is then filled from the end of the device opposite to the female connector 4204. The gasket 4210 is inserted to retain the pre-vapor formulation and the mouthpiece 4201 is pressed into the housing 4202.

Figure 43:
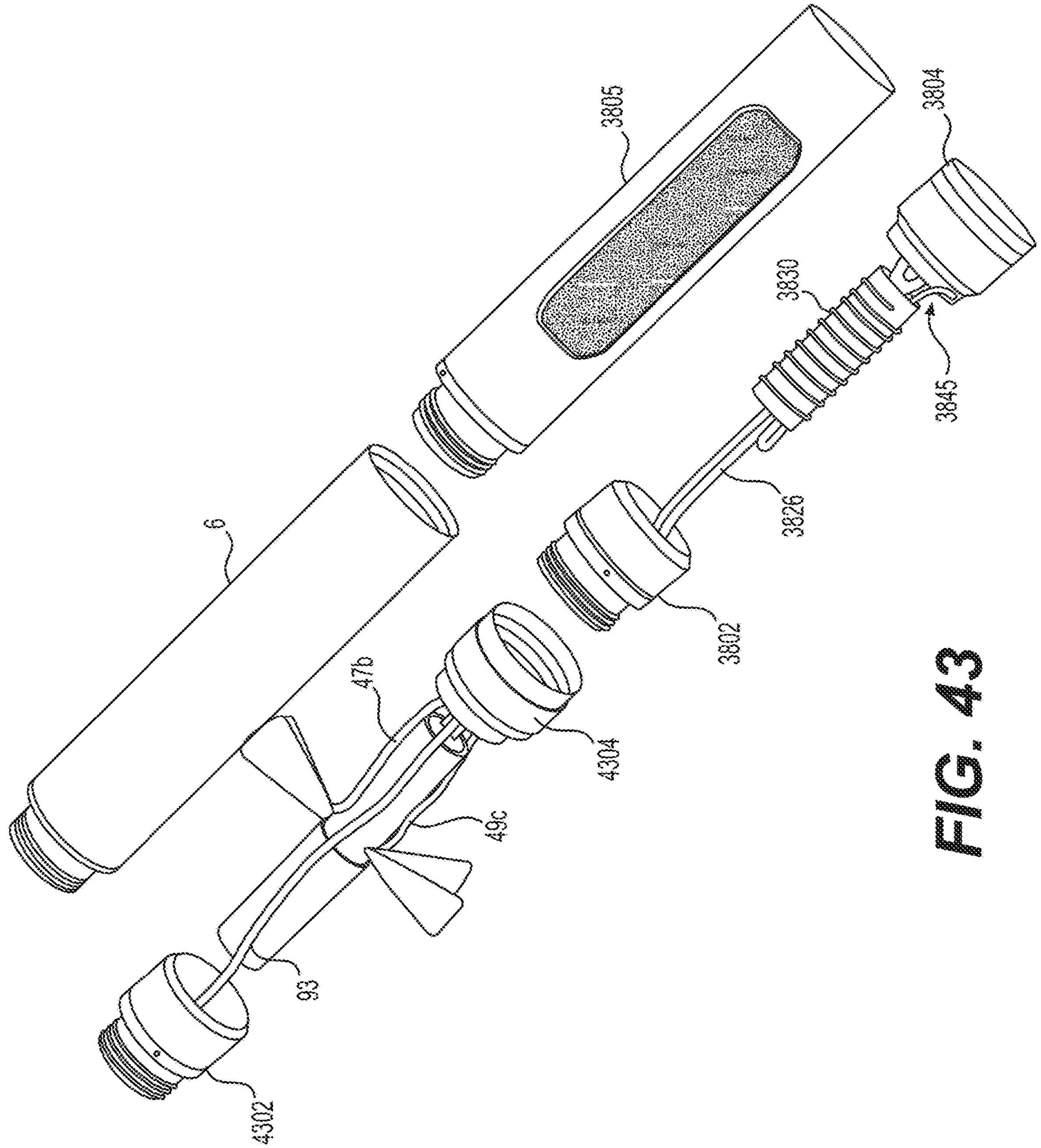
FIG. 43 is a perspective view of an example embodiment of a replaceable cartridge and an example embodiment of the tobacco containing section shown in FIG. 38.

FIG. 43 is a perspective view of an example embodiment of the replaceable cartridge 2902 and an example embodiment of the tobacco containing section 2904 shown in FIG. 38.

Referring to FIG. 43, the tobacco containing section 2904 shown in FIG. 43 is the same as the tobacco containing section 2904 shown in FIG. 38, and thus, a detailed discussion is omitted.

The replaceable cartridge 2902 is similar to the replaceable cartridge 2902 shown in FIG. 31, except that the replaceable cartridge 2902 shown in FIG. 31 includes different male and female connectors 4302 and 4304. The male connector 4302 shown in FIG. 43 is the same as the male connector 3802 described with regard to FIG. 38, and the female connector 4304 is the same as the female connector 3804 described with regard to FIG. 38. Since additional components of the replaceable cartridge 2402 shown in FIG. 43 are the same as those discussed above with regard to the example embodiment shown in FIG. 31, further detailed discussion will be omitted.

According to one or more example embodiments, when the non-combustible electronic smoking device is configured as shown in FIG. 29A, and the tobacco containing section shown in FIG. 33 is implemented as the tobacco containing section 2904, the anode connection 3012 of the power supply 3010 is electrically connected to the anode connector (or post) 3106 of the replaceable cartridge 2902. The anode connector (or post) 3106 is electrically connected to the anode portion 3110 via the electrical lead 93, and the anode portion 3110 is electrically connected to the post 3306 of the tobacco containing section 2904 shown in FIG. 33. Within the tobacco containing section 2904, the post 3306 is electrically connected to the post 3378 via the electrical lead 3326.

Still referring to the configuration shown in FIG. 29A, when negative pressure is applied to the removable mouthpiece 2906, the sensor 3038 senses the change in pressure in the power section 2900, the control circuitry 3018 causes power to be supplied to the heater 14 and the ceramic coil heaters 3324 shown in FIG. 33.

When negative pressure is applied to the removable mouthpiece 2906, warmed vapor exits the replaceable cartridge 2902 through the channel 9 and the central passage 63. The warmed vapor enters the female connector 3304, passes through the central passage 3306*a*, and enters the channel 334 via the holes 3306*b*. The warmed vapor passes through the channel 334 and into the post-side channel 3378*c* via the holes 3379. While passing through the channel 334, the warmed vapor may obtain a tobacco aroma as the tobacco 3507 is heated by the plurality of ceramic heaters 3324, thereby resulting in warmed tobacco vapor.

The warmed tobacco vapor then exits the tobacco containing section 2904 through the male connector 3302 and into the removable mouthpiece 2906 and exits through the diverging outlets 24.

According to one or more example embodiments, when the non-combustible electronic smoking device is configured as shown in FIG. 29B, and the tobacco containing section shown in FIG. 33 is implemented as the tobacco containing section 2904, the anode connection 3012 of the power supply 3010 is electrically connected to the post 3306 of the tobacco containing section 2904. The post 3306 is electrically connected to the post 3378 via the electrical lead 3326. The post 3378 is electrically connected to the anode connector (or post) 3106 of the replaceable cartridge 2902 shown in FIG. 31. Within the replaceable cartridge 2902, the anode connector (or post) 3106 is electrically connected to the anode portion 3110 via the electrical lead 93.

Still referring to the configuration shown in FIG. 29B, when negative pressure is applied to the removable mouthpiece 2906, the sensor 3038 senses the change in pressure in the power section 2900, the control circuitry 3018 causes power to be supplied to the heater 14 and the ceramic coil heaters 3324 shown in FIG. 33.

Further, when negative pressure is applied to the removable mouthpiece 2906, air enters the connector 3017 of the power section 2900 through the vents 3032. The air passes through the central passage 3306*a* and into the channel 334 through the holes 3306*b*. While passing through the channel 334, the air may obtain a tobacco aroma as the tobacco 3507 is heated by the plurality of ceramic heaters 3324.

The air with tobacco aroma exits the tobacco containing section 2904 post-side channel 3378*c*, and enters the replaceable cartridge 2902.

The tobacco aroma air passes through central passages 3106*a* and 20, through the channel 9 and exits the replaceable cartridge 2902 through the central passage 63. While passing through the channel 9, the tobacco aroma mixes with warmed vapor, thereby creating warmed tobacco vapor.

The warmed tobacco vapor exits the replaceable cartridge 2902 through the male connector 3102, into the removable mouthpiece 2906 and exits the removable mouthpiece 2906 through the diverging outlets 24.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A non-combustible smoking element comprising:

an outer housing having at least a first connector at a first end;

a tobacco container within the outer housing, the tobacco container configured to hold a tobacco element and to provide an aroma to a channel within the non-combustible smoking element; and a heating element electrically connected to the first connector, the heating element configured to heat at least a portion of the tobacco element to generate the aroma, the heating element including a heater structure arranged around or within the channel, wherein the non-combustible smoking element is configured to combine the aroma with a vapor generated upstream or downstream of the channel.

2. The non-combustible smoking element of claim 1, further comprising:

an inner tube in the outer housing, the inner tube extending in the longitudinal direction of the outer housing to define at least a portion of the channel, the outer housing and the inner tube defining at least part of the tobacco container.

3. The non-combustible smoking element of claim 2, wherein the heater structure is arranged within the channel and separated from the tobacco element by the inner tube.

4. The non-combustible smoking element of claim 3, wherein the heater structure includes a plurality of ceramic coil heaters arranged within the channel.

5. The non-combustible smoking element of claim 3, wherein the heater structure includes a single ceramic coil heater arranged within the channel.

6. The non-combustible smoking element of claim 2, wherein the heater structure is a coil that extends around the inner tube.

7. The non-combustible smoking element of claim 2, wherein the heater structure is a mesh heater assembly extending around the inner tube.

8. The non-combustible smoking element of claim 7, wherein the mesh heater assembly includes a mesh heater covered in a fiber glass shield.

9. The non-combustible smoking element of claim 1, wherein the heater structure is arranged around the channel and in contact with the tobacco element in the tobacco container.

10. The non-combustible smoking element of claim 9, wherein the heater structure is a coil that extends around the channel.

11. The non-combustible smoking element of claim 9, wherein the heater structure is a mesh heater assembly extending around the channel.

12. The non-combustible smoking element of claim 11, wherein the mesh heater assembly includes a mesh heater covered in a fiber glass shield.

13. The non-combustible smoking element of claim 1, wherein the heating element is electrically connected to a first electrode portion of the first connector, and to a second electrode portion of the first connector.

14. The non-combustible smoking element of claim 1, further comprising:

a power section configured to be connected to the outer housing via the first connector, the power section configured to supply power to the heating element.

15. The non-combustible smoking element of claim 1, wherein the first connector includes a first electrode portion, and the outer housing includes a second connector at a second end, the first electrode portion of the first connector being electrically connected to a third electrode portion of the second connector via an electrical lead.

16. The non-combustible smoking element of claim 15, further comprising:

a mouthpiece connected to the outer housing via the second connector.

17. The non-combustible smoking element of claim 1, further comprising:

a mouthpiece arranged at a second end of the outer housing.

18. The non-combustible smoking element of claim 15, further comprising:

a cartridge;

a power section;

a mouthpiece; and wherein the power section, the outer housing, the cartridge and the mouthpiece are configured to be connected in series with one another; and wherein the outer housing is configured to be selectively positioned (i) between the power section and the cartridge or (ii) between the cartridge and the mouthpiece.

19. The non-combustible smoking element of claim 1, wherein the heater structure includes a plurality of ceramic coil heaters arranged within the channel.

20. The non-combustible smoking element of claim 1, wherein the heater structure includes a single ceramic coil heater arranged within the channel.

21. The non-combustible smoking element of claim 1, wherein the heater structure is a coil that extends around the channel.

22. The non-combustible smoking element of claim 1, wherein the heater structure is a mesh heater assembly extending around the channel.

23. The non-combustible smoking element of claim 22, wherein the mesh heater assembly includes a mesh heater covered in a fiber glass shield.

24. The non-combustible smoking element of claim 1, wherein the heater structure is arranged within the channel and spaced apart from the tobacco element in the tobacco container.

25. A non-combustible smoking element comprising:

an outer housing having at least a first connector at a first end;

a tobacco container within the outer housing, the tobacco container configured to hold a tobacco element and to provide an aroma to a channel within the non-combustible smoking element;

a heating element electrically connected to the first connector, the heating element configured to heat at least a portion of the tobacco element to generate the aroma; and an inner tube in the outer housing, the inner tube extending in the longitudinal direction of the outer housing to define at least a portion of the channel, the outer housing and the inner tube defining at least part of the tobacco container, wherein the heating element includes a heater structure arranged around the inner tube.

* * * * *